(12) United States Patent
Shimizu et al.

(10) Patent No.: US 11,866,608 B2
(45) Date of Patent: *Jan. 9, 2024

(54) WEATHER-RESISTANT HARD COAT COMPOSITION FOR METAL, CURED PRODUCT, AND COATED METAL SUBSTRATE

(71) Applicant: DAICEL CORPORATION, Osaka (JP)

(72) Inventors: Kunio Shimizu, Tokyo (JP); Hiroshi Takahashi, Tokyo (JP); Akihiro Shibamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/295,741

(22) PCT Filed: Nov. 20, 2019

(86) PCT No.: PCT/JP2019/045486
§ 371 (c)(1),
(2) Date: May 20, 2021

(87) PCT Pub. No.: WO2020/105684
PCT Pub. Date: May 28, 2020

(65) Prior Publication Data
US 2022/0017777 A1     Jan. 20, 2022

(30) Foreign Application Priority Data
Nov. 21, 2018   (JP) ................................. 2018-218304

(51) Int. Cl.
*C09D 183/06* (2006.01)
*C08G 77/14* (2006.01)
(Continued)

(52) U.S. Cl.
CPC ............ *C09D 183/06* (2013.01); *C08G 77/14* (2013.01); *C08G 77/20* (2013.01); *C08G 77/70* (2013.01);
(Continued)

(58) Field of Classification Search
CPC C09D 183/06; C09D 163/00; C09D 151/085; C09D 183/04; C09D 5/00;
(Continued)

(56) References Cited

U.S. PATENT DOCUMENTS

2013/0331476 A1* 12/2013 Bae .................... C08G 59/42
523/435
2015/0275043 A1* 10/2015 Kikuchi .................. C09D 5/00
428/447
(Continued)

FOREIGN PATENT DOCUMENTS

CN   106459370 A   2/2017
CN   107735253 A   2/2018
(Continued)

OTHER PUBLICATIONS

U.S. Appl. No. 17/295,527, filed May 20, 2021.
(Continued)

*Primary Examiner* — Michael B Nelson
(74) *Attorney, Agent, or Firm* — Birch, Stewart, Kolasch & Birch, LLP

(57) ABSTRACT

The purpose of the present invention is to provide a weather-resistant hard coat composition for a metal, the composition being capable of efficiently forming a coating film excelling in weather resistance, scratch resistance, and flexibility. The present invention provides: a weather-resistant hard coat composition for a metal, the composition containing a polyorganosilsesquioxane having a constituent unit represented by Formula (1); a cured product thereof; and a coated
(Continued)

metal substrate having a metal substrate and a coating film formed on at least one surface of the metal substrate. The coating film is a layer of a cured product of the weather-resistant hard coat composition for a metal. [In Formula (1), $R^1$ represents a group containing an active energy ray-curable functional group.]

$$[R^1SiO_{3/2}] \quad (1)$$

18 Claims, 10 Drawing Sheets

(51) Int. Cl.
    *C08G 77/20* (2006.01)
    *C08G 77/00* (2006.01)

(52) U.S. Cl.
    CPC ............ *Y10T 428/26* (2015.01); *Y10T 428/31* (2015.01); *Y10T 428/31663* (2015.04)

(58) Field of Classification Search
    CPC .......... C09D 7/48; C08G 77/14; C08G 77/20; C08G 77/70; C08G 77/38; C08G 77/04; C08G 59/20; C08G 59/32; C08G 59/3281; C08G 59/68; C08G 77/80; C08F 290/068; C08F 299/08; C08F 290/06; C08F 290/08; B05D 1/26; B05D 3/0209; B05D 3/0272; B05D 3/067; B05D 2518/12; B05D 7/24; B05D 2202/10; B32B 27/00; B32B 27/18; B32B 27/30; B32B 15/08; B32B 27/16; Y10T 428/26; Y10T 428/31; Y10T 428/31663
    See application file for complete search history.

(56) References Cited

U.S. PATENT DOCUMENTS

| | | | | |
|---|---|---|---|---|
| 2016/0297933 | A1* | 10/2016 | Kuwana | ................ B32B 27/30 |
| 2018/0142127 | A1* | 5/2018 | Park | ..................... C08G 59/22 |
| 2018/0282485 | A1 | 10/2018 | Kuwana et al. | |
| 2018/0361719 | A1 | 12/2018 | Kikuchi | |
| 2020/0102456 | A1 | 4/2020 | Kikuchi | |

FOREIGN PATENT DOCUMENTS

| | | |
|---|---|---|
| EP | 0 877 068 A2 | 11/1998 |
| JP | 58-25365 A | 2/1983 |
| JP | 9-143426 A | 6/1997 |
| JP | 11-43646 A | 2/1999 |
| JP | 2010-59229 A | 3/2010 |
| JP | 2011-208043 A | 10/2011 |
| JP | 2012-219102 A | 11/2012 |
| JP | 2014-801 A | 1/2014 |
| JP | 2015-524855 A | 8/2015 |
| JP | 5954257 B2 | 7/2016 |
| JP | 2017-218545 A | 12/2017 |
| KR | 10-2016-0063421 A | 6/2016 |
| KR | 10-2016-0066917 A | 6/2016 |
| WO | WO 2007/067800 A2 | 6/2007 |
| WO | WO 2013/146477 A1 | 10/2013 |
| WO | WO 2016/203957 A1 | 4/2018 |
| WO | WO 2018/189945 A1 | 10/2018 |

OTHER PUBLICATIONS

International Search Report dated Feb. 18, 2020, in PCT/JP2019/045484.
International Search Report dated Feb. 18, 2020, in PCT/JP2019/045486.
Written Opinion of the International Searching Authority dated Feb. 18, 2020, in PCT/JP2019/045484.
Written Opinion of the International Searching Authority dated Feb. 18, 2020, in PCT/JP2019/045486.
Extended European Search Report for European Application No. 19887307.7, dated Jul. 19, 2022.
Extended European Search Report for corresponding European Application No. 19887704.5, dated Jul. 19, 2022.
Chinese Office Action and Search Report for Chinese Application No. 201980076970.0, dated Mar. 30, 2023.
Japanese Third Party Submission for Japanese Application No. 2018-218303, dated Feb. 7, 2023.
Japanese Third Party Submission for Japanese Application No. 2018-218304, dated Feb. 7, 2023.
Korean Office Action for Korean Application No. 10-2021-7018529, dated Mar. 21, 2023.

* cited by examiner

WEATHER-RESISTANT HARD COAT COMPOSITION FOR METAL, CURED PRODUCT, AND COATED METAL SUBSTRATE

TECHNICAL FIELD

The present invention relates to a weather-resistant hard coat composition for a metal, the composition being capable of forming, on a surface of a metal substrate used in construction members, automotive components, and electrical products, a coating film excelling in weather resistance, scratch resistance, and flexibility, and to a cured product of the weather-resistant hard coat composition for a metal, and a coated metal substrate having a surface coated with a coating film formed from a layer of the cured product of the weather-resistant hard coat composition for a metal. The present application claims priority to JP 2018-218304 filed in Japan on 21 Nov. 2018, the content of which is incorporated herein.

BACKGROUND ART

Coating agents for protecting the surface of metal substrates used in construction members, automotive components, electrical products, and the like require not only the imparting of design properties to various metal substrates, but also durability that can prevent degradation of metal substrates or coating films. Thus, for particularly metal substrates of products used outdoors such as construction members and automotive components, the industry is strongly demanding a coating agent capable of forming a coating film that excels in weather resistance without causing discoloration, a reduction in glossiness, peeling of the coating film, or the occurrence of cracking or the like due to sunlight or acid rain, and that also excels in surface hardness and scratch resistance such that damage resulting from impact or the like does not easily occur.

In addition, metal substrates are shaped according to the application by various machining processes such as punching or press molding, and are then used in the final product. However, to improve production efficiency, these machining processes are desirably implemented after forming a coating film using a coating agent. However, when the flexibility and pliability of the coating film are insufficient, deformation of the metal substrate cannot be tracked, and as a result, cracks may occur on the surface of the coating film, and rust or the like may be generated in the crack portion.

In particular, the surface hardness and flexibility of the coating film are generally in a trade-off relationship, and currently there are no coating agents for metals that satisfy both.

In the related art, solvent-based paints in which a fluororesin, polyurethane resin, polyester resin, polyolefin resin, or the like is blended, and paints in which a UV curable resin or a thermosetting resin such as an acrylic resin or an epoxy resin is blended have been used as coating agents for imparting properties such as weather resistance to a surface of a substrate such as a metal (for example, see Patent Documents 1 to 3).

CITATION LIST

Patent Document

Patent Document 1: JP 2011-208043 A
Patent Document 2: JP 9-143426 A
Patent Document 3: JP 58-025365 A

SUMMARY OF INVENTION

Technical Problem

However, the weather resistance and scratch resistance of the above-mentioned solvent-based paint is insufficient. Paints in which a thermosetting resin is blended excel in scratch resistance, but the weather resistance and flexibility thereof are insufficient. In addition, such paints also require heating and curing for a long period of time at a high temperature, and thus productivity is poor, and costs are high. Meanwhile, paints containing a UV curable resin excel in productivity and scratch resistance, but exhibit insufficient weather resistance and flexibility.

Therefore, an object of the present invention is to provide a weather-resistant hard coat composition for a metal, the composition being capable of efficiently forming a coating film excelling in weather resistance, scratch resistance, and flexibility.

Another object of the present invention is to provide a cured product (coating film) of a weather-resistant hard coat composition for a metal, the composition being capable of efficiently forming a coating film excelling in weather resistance, scratch resistance, and flexibility.

Yet another object of the present invention is to provide a coated metal substrate excelling in weather resistance, scratch resistance, and flexibility, and also exhibiting excellent production efficiency, the coated metal substrate having a surface coated with a coating film made from a layer of a cured product of the weather-resistant hard coat composition for a metal.

Solution to Problem

The present inventors discovered that a coating film excelling in weather resistance, scratch resistance, and flexibility can be efficiently formed using a composition containing a polyorganosilsesquioxane having a silsesquioxane constituent unit (unit structure) having an active energy ray-curable functional group, and in particular, that the composition thereof is very suited as a weather-resistant hard coat composition for a metal used to protect a metal substrate of a product used outdoors such as construction members and automotive components. The present invention was completed based on these findings.

That is, as a first aspect, the present invention provides a weather-resistant hard coat composition for a metal, the composition containing a polyorganosilsesquioxane having a constituent unit represented by Formula (1) below.

[Chem. 1]

$$[R^1 SiO_{3/2}] \quad (1)$$

[In Formula (1), $R^1$ represents a group containing an active energy ray-curable functional group.]

In the above-mentioned weather-resistant hard coat composition for a metal, the polyorganosilsesquioxane preferably further contains:

a constituent unit represented by Formula (I) below:

[Chem. 2]

$$[R^a SiO_{3/2}] \quad (I)$$

[where $R^a$ represents a group containing an active energy ray-curable functional group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom]; and a constituent unit represented by Formula (II) below:

[Chem. 3]

$$[R^b SiO_{2/2}(OR^c)] \quad (II)$$

[where $R^b$ represents a group containing an active energy ray-curable functional group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom, and $R^c$ represents a hydrogen atom or an alkyl group having 1 to 4 carbons]; and a molar ratio [(constituent unit represented by Formula (I))/(constituent unit represented by Formula (II))] of the constituent unit represented by Formula (I) to the constituent unit represented by Formula (II) is from 5 to 500.

In the weather-resistant hard coat composition for a metal, the number average molecular weight of the polyorganosilsesquioxane is preferably from 1000 to 50000.

In the weather-resistant hard coat composition for a metal, the polyorganosilsesquioxane preferably further includes a constituent unit represented by Formula (4) below:

[Chem. 4]

$$[R^1 SiO_{2/2}(OR^c)] \quad (4)$$

[where $R^1$ is the same as in Formula (1), and $R^c$ is the same as in Formula (II)], and a ratio of the constituent unit represented by Formula (1) and the constituent unit represented by Formula (4) with respect to a total amount (100 mol %) of siloxane constituent units is from 55 to 100 mol %.

In the weather-resistant hard coat composition for a metal, a molecular weight dispersity (weight average molecular weight/number average molecular weight) of the polyorganosilsesquioxane is preferably from 1.0 to 4.0.

In the weather-resistant hard coat composition for a metal, the polyorganosilsesquioxane may further contain a constituent unit represented by Formula (2) below:

[Chem. 5]

$$[R^2 SiO_{3/2}] \quad (2)$$

[where $R^2$ represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group.]

In the weather-resistant hard coat composition for a metal, $R^2$ may be a substituted or unsubstituted aryl group.

In the weather-resistant hard coat composition for a metal, the active energy ray-curable functional group may be an epoxy group.

In the weather-resistant hard coat composition for a metal, the $R^1$ may be:

a group represented by Formula (1a) below:

[Chem. 6]

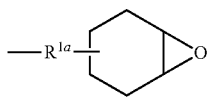

(1a)

[where $R^{1a}$ represents a linear or branched alkylene group];

a group represented by Formula (1b) below:

[Chem. 7]

(1b)

[where $R^{1b}$ represents a linear or branched alkylene group];

a group represented by Formula (1c) below:

[Chem. 8]

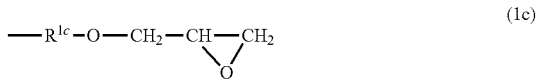

(1c)

[where $R^{1c}$ represents a linear or branched alkylene group]; or a group represented by Formula (1d) below:

[Chem. 9]

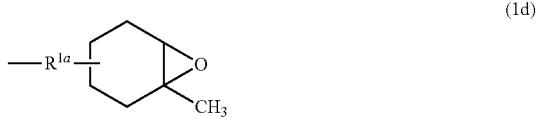

(1d)

[where $R^{1d}$ represents a linear or branched alkylene group].

In the weather-resistant hard coat composition for a metal, the active energy ray-curable functional group may be a (meth)acryloxy group.

The weather-resistant hard coat composition for a metal may further contain a photocuring catalyst.

In the weather-resistant hard coat composition for a metal, the photocuring catalyst may be a photocationic polymerization initiator.

In the weather-resistant hard coat composition for a metal, the photocuring catalyst may be a photoradical polymerization initiator.

The weather-resistant hard coat composition for a metal may further contain a compound having one or more (meth)acryloxy groups per molecule.

The weather-resistant hard coat composition for a metal may further contain at least one type selected from the group consisting of ultraviolet absorbers and antioxidants.

The weather-resistant hard coat composition for a metal may further contain a compound having one or more thermally-polymerizable functional groups and one or more photopolymerizable functional groups per molecule.

The weather-resistant hard coat composition for a metal may further contain a fluorine-containing photopolymerizable resin.

The weather-resistant hard coat composition for a metal may be a clear hard coat paint.

The present invention also provides a cured product of the weather-resistant hard coat composition for a metal.

Furthermore, the present invention also provides a coated metal substrate having a metal substrate and a coating film formed on at least one surface of the metal substrate, wherein the coating film is a layer of the above-mentioned cured product.

In the coated metal substrate, the thickness of the coating film may be from 1 to 200 μm.

As a second aspect, the present invention provides a weather-resistant hard coat composition for a metal substrate, wherein a below-defined pencil hardness of a cured product obtained by curing the composition under the following curing conditions is not less than H, a color difference (ΔE) as defined below is less than 20, and a glossiness retention rate as defined below is not less than 15%.

Curing Conditions
  Pre-baking: 5 minutes at 150° C.
  UV radiation: radiation dosage: 400 mJ/cm$^2$, radiation intensity: 260 mW/cm$^2$
  Aging: at 120° C. for 0.5 hours
Pencil Hardness
  Measured in accordance with JIS K5600-5-4 (750 g load).
Color Difference (ΔE)
  The color difference (ΔE) is determined from an initial hue value and the hue of the sample after 3000 hours of radiation in a high luminance xenon weatherometer test under the following conditions.
Glossiness Retention Rate (%)
  The glossiness retention rate is calculated from the following equation by measuring the glossiness before radiation and the glossiness after radiation for 3000 hours in the high luminance xenon weatherometer test under the following conditions.

Glossiness Retention Rate (%)=(Glossiness after radiation for 3000 hours)/(Glossiness before radiation)×100

High Luminance Xenon Weatherometer Test
  Test temperature: 63° C.
  Test humidity: RH 50%
  Rain: 18 minutes of rain per 120 minutes
  Radiation illuminance: 100 W/m$^2$ (300 to 400 nm)
  Filter: inside/outside=borosilicate type S/borosilicate type S
  Radiation time: 3000 hours The weather-resistant hard coat composition for a metal of the second aspect may contain a polyorganosilsesquioxane having a constituent unit represented by Formula (1) below.

[Chem. 10]

$$[R^1SiO_{3/2}] \quad (1)$$

[In Formula (1), R$^1$ represents a group containing an active energy ray-curable functional group.]

As a third aspect, the present invention provides a cured product of the weather-resistant hard coat composition for a metal substrate according to the second aspect, wherein a pencil hardness as defined below is not less than H, a color difference (ΔE) as defined below is less than 20, and a glossiness retention rate as defined below is not less than 15%.

Pencil Hardness
  Measured in accordance with JIS K5600-5-4 (750 g load).
Color Difference (ΔE)
  The color difference (ΔE) is determined from an initial hue value and the hue of the sample after 3000 hours of radiation in a high luminance xenon weatherometer test under the following conditions.

Glossiness Retention Rate (%)
  The glossiness retention rate is calculated from the following equation by measuring the glossiness before radiation and the glossiness after radiation for 3000 hours in the high luminance xenon weatherometer test under the following conditions. Glossiness Retention Rate (%)=(Glossiness after radiation for 3000 hours)/(Glossiness before radiation)×100

High Luminance Xenon Weatherometer Test
  Test temperature: 63° C.
  Test humidity: RH 50%
  Rain: 18 minutes of rain per 120 minutes
  Radiation illuminance: 100 W/m$^2$ (300 to 400 nm)
  Filter: inside/outside=borosilicate type S/borosilicate type S
  Radiation time: 3000 hours As a fourth aspect, the present invention provides a coated metal substrate having a metal substrate and a coating film formed on at least one surface of the metal substrate, wherein the coating film is a layer of the cured product of the third aspect.

Advantageous Effects of Invention

The weather-resistant hard coat composition for a metal of the present invention contains, as an essential component, a polyorganosilsesquioxane having a silsesquioxane constituent unit having an active energy ray-curable functional group, and therefore a coating film (cured product) excelling in weather resistance, scratch resistance, and flexibility can be efficiently formed. Accordingly, the coated metal substrate of the present invention, of which a surface is covered by a coating film that is obtained by applying the weather-resistant hard coat composition for a metal onto the metal substrate used in a product that is used outdoors such as in a construction member or automotive component and curing the composition, excels in surface hardness and scratch resistance and is thus less prone to discoloration, a decrease in glossiness, detachment of the coating film, and cracking due to factors such as sunlight or acid rain, and is less prone to damage from impact or the like.

Furthermore, even when the coated metal substrate of the present application is subjected to various machining processes such as punching or press molding, the coating film has flexibility and pliability that allow it to track the deformation of the metal substrate, and cracks do not occur, and thus production efficiency can be greatly improved.

DESCRIPTION OF EMBODIMENTS

Figure 1:
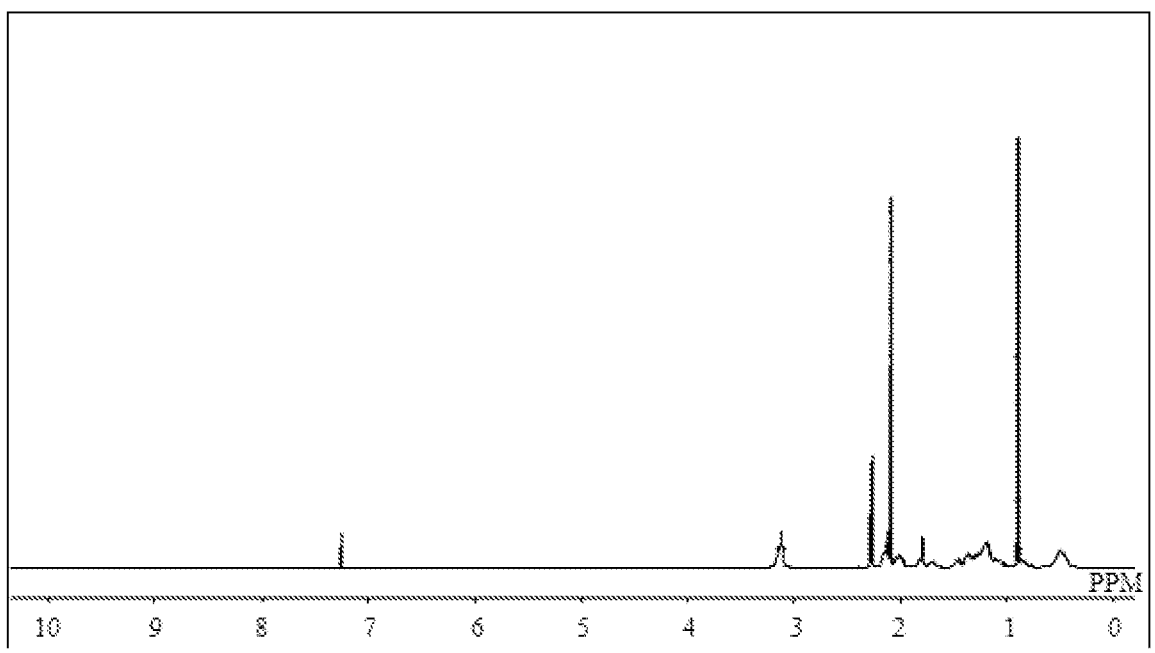
FIG. 1 is a $^1$H-NMR spectrum of an epoxy group-containing low-molecular weight polyorganosilsesquioxane obtained in Production Example 1.

[Weather-Resistant Hard Coat Composition for a Metal]

The weather-resistant hard coat composition for a metal according to an embodiment of the present invention is a curable composition (hereinafter, may be referred to as a "curable composition according to an embodiment of the present invention" or a "hard coat agent according to an embodiment of the present invention") that includes a polyorganosilsesquioxane (hereinafter, also referred to as a "polyorganosilsesquioxane according to an embodiment of the present invention") having a constituent unit represented by Formula (1) below. As described below, the curable composition (hard coat agent) according to an embodiment of the present invention may further contain other components such as a photocuring catalyst (in particular, a photocationic polymerization initiator or a photoradical polymerization initiator), an ultraviolet absorber, and an antioxidant.

[Chem. 11]

$$[R^1SiO_{3/2}] \quad (1)$$

[In Formula (1), $R^1$ represents a group containing an active energy ray-curable functional group.]

The polyorganosilsesquioxane according to an embodiment of the present invention is an essential component of the curable composition according to an embodiment of the present invention, and has a constituent unit represented by Formula (1) above.

Additionally, the polyorganosilsesquioxane according to an embodiment of the present invention preferably has a constituent unit (may be referred to as a "T3 form") represented by Formula (I) below and a constituent unit (may be referred to as a "T2 form") represented by Formula (II) below.

The polyorganosilsesquioxane according to an embodiment of the present invention preferably further includes a constituent unit represented by Formula (4) below.

[Chem. 12]

$$[R^aSiO_{3/2}] \quad (I)$$

[Chem. 13]

$$[R^bSiO_{2/2}(OR^c)] \quad (II)$$

The constituent unit represented by Formula (1) above is a silsesquioxane constituent unit (so-called T unit) generally represented by $[RSiO_{3/2}]$. Here, R in the formula described above represents a hydrogen atom or a monovalent organic group, the same applying to the following. The constituent unit represented by Formula (1) above is formed by a hydrolysis and condensation reaction of a corresponding hydrolyzable trifunctional silane compound (specifically, a compound represented by Formula (a) described later, for example).

$R^1$ in Formula (1) represents a group (monovalent group) containing an active energy ray-curable functional group. That is, the polyorganosilsesquioxane according to an embodiment of the present invention is a photocationically curable compound (photocationically polymerizable compound) or a photoradically curable compound (photoradically polymerizable compound), having at least an active energy ray-curable functional group in the molecule.

The "photocationically polymerizable functional group" of the group containing an active energy ray-curable functional group is not particularly limited as long as it is photocationically polymerizable, and examples thereof include an epoxy group, an oxetane group, a vinyl ether group, and a vinyl phenyl group.

The "photoradically polymerizable functional group" of the group containing an active energy ray-curable functional group is not particularly limited as long as it is photoradically polymerizable, and examples thereof include a (meth)acryloxy group, a (meth)acrylamide group, a vinyl group, and a vinylthio group.

From the perspective of surface hardness (for example, H or greater) of the cured product (coating film), the active energy ray-curable functional group is preferably an epoxy group, a (meth)acryloxy group, or the like, and is particularly preferably an epoxy group.

The group containing an epoxy group is not particularly limited, and examples thereof include well-known or commonly used groups having an oxirane ring. However, in terms of curability of the curable composition (hard coat agent), and the weather resistance, scratch resistance, and flexibility of the cured product (coating film), a group represented by Formula (1a) below, a group represented by Formula (1b) below, a group represented by Formula (1c) below, and a group represented by Formula (1d) below are preferred, a group represented by Formula (1a) below and a group represented by Formula (1c) below are more preferred, and a group represented by Formula (1a) below is even more preferred.

[Chem. 14]

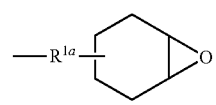

(1a)

[Chem. 15]

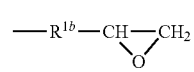

(1b)

[Chem. 16]

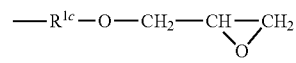

(1c)

[Chem. 17]

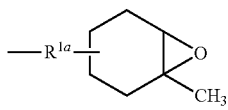

(1d)

In Formula (1a) above, $R^{1a}$ represents a linear or branched alkylene group. Examples of the linear or branched alkylene group include linear or branched alkylene groups having from 1 to 10 carbons, such as a methylene group, a methyl methylene group, a dimethyl methylene group, an ethylene group, a propylene group, a trimethylene group, a tetramethylene group, a pentamethylene group, a hexamethylene group, and a decamethylene group. Among these, in terms of the weather resistance, scratch resistance, and flexibility of the cured product (coating film), $R^{1a}$ is preferably a linear alkylene group having from 1 to 4 carbons or a branched alkylene group having 3 or 4 carbons, more preferably an ethylene group, a trimethylene group, or a propylene group, and even more preferably an ethylene group or a trimethylene group.

In Formula (1b) above, $R^{1b}$ represents a linear or branched alkylene group, and the same groups as those of $R^{1a}$ are exemplified. Among these, in terms of the weather resistance, scratch resistance, and flexibility of the cured product (coating film), $R^{1b}$ is preferably a linear alkylene group having from 1 to 4 carbons or a branched alkylene group having 3 or 4 carbons, more preferably an ethylene group, a trimethylene group, or a propylene group, and even more preferably an ethylene group or a trimethylene group.

In Formula (1c) above, $R^{1c}$ represents a linear or branched alkylene group, and the same groups as those of $R^{1a}$ are exemplified. Among these, in terms of the weather resistance, scratch resistance, and flexibility of the cured product (coating film), $R^{1c}$ is preferably a linear alkylene group having from 1 to 4 carbons or a branched alkylene group having 3 or 4 carbons, more preferably an ethylene group, a trimethylene group, or a propylene group, and even more preferably an ethylene group or a trimethylene group.

In Formula (1d) above, $R^{1d}$ represents a linear or branched alkylene group, and the same groups as those of $R^{1a}$ are exemplified. Among these, in terms of the weather resistance, scratch resistance, and flexibility of the cured product (coating film), $R^{1d}$ is preferably a linear alkylene group having from 1 to 4 carbons or a branched alkylene group having 3 or 4 carbons, more preferably an ethylene group, a trimethylene group, or a propylene group, and even more preferably an ethylene group or a trimethylene group.

From the perspectives of weather resistance, scratch resistance, and flexibility of the cured product (coating film), $R^1$ in Formula (1) is particularly preferably a group represented by Formula (1a) above, in which $R^{1a}$ is an ethylene group (among which a 2-(3',4'-epoxycyclohexyl)ethyl group is preferred).

The group containing an oxetane group is not particularly limited, and examples thereof include known or commonly used groups having an oxetane ring, including, for example, an oxetane group, and groups obtained by replacing a hydrogen atom (ordinarily one or more, preferably one hydrogen atom) of an alkyl group (alkyl group having preferably from 1 to 10 carbons, and more preferably from 1 to 5 carbons) with an oxetane group. From the perspectives of curability of the curable composition (hard coat agent) and weather resistance, scratch resistance, and flexibility of the cured product (coating film), a 3-oxetanyl group, an oxetan-3-yl methyl group, a 3-ethyloxetan-3-yl methyl group, a 2-(oxetan-3-yl) ethyl group, a 2-(3-ethyloxetan-3-yl) ethyl group, a 3-(oxetan-3-yl methoxy) propyl group, and a 3-(3-ethyloxetan-3-ylmethoxy) propyl group, and the like are preferable.

The group containing a vinyl ether group is not particularly limited, and examples thereof include well-known or commonly used groups having a vinyl ether group, including, for example, a vinyl ether group; and groups obtained by replacing a hydrogen atom (ordinarily one or more, preferably one hydrogen atom) of an alkyl group (alkyl group having preferably from 1 to 10 carbons, and more preferably from 1 to 5 carbons) with a vinyl ether group. From the perspectives of curability of the curable composition (hard coat agent) and weather resistance, scratch resistance, and flexibility of the cured product (coating film), a vinyloxy methyl group, a 2-(vinyloxy) ethyl group, and a 3-(vinyloxy) propyl group, and the like are preferable.

The group containing a vinyl phenyl group is not particularly limited, and examples thereof include well-known or commonly used groups having a vinyl phenyl group, including, for example, a vinyl phenyl group; and groups obtained by replacing a hydrogen atom (ordinarily one or more, preferably one hydrogen atom) of an alkyl group (alkyl group having preferably from 1 to 10 carbons, and more preferably from 1 to 5 carbons) with a vinyl phenyl group. From the perspectives of curability of the curable composition (hard coat agent) and weather resistance, scratch resistance, and flexibility of the cured product (coating film), a 4-vinylphenyl group, a 3-vinylphenyl group, a 2-vinylphenyl group, and the like, are preferable.

The group containing a (meth)acryloxy group is not particularly limited, and examples thereof include well-known or commonly used groups having a (meth)acryloxy group, including, for example, (meth)acryloxy groups; and groups obtained by replacing a hydrogen atom (ordinarily one or more, preferably one hydrogen atom) of an alkyl group (alkyl group having preferably from 1 to 10 carbons, and more preferably from 1 to 5 carbons) with a (meth)acryloxy group. From the perspectives of curability of the curable composition (coating film) and weather resistance, scratch resistance, and flexibility of the cured product (coating film), a 2-((meth)acryloxy)ethyl group, and a 3-((meth)acryloxy)propyl group, and the like are preferable.

The group containing a (meth)acrylamide group is not particularly limited, and examples thereof include well-known or commonly used groups having a (meth)acrylamide group, including, for example, a (meth)acrylamide group; and groups obtained by replacing a hydrogen atom (ordinarily one or more, preferably one hydrogen atom) of an alkyl group (alkyl group having preferably from 1 to 10 carbons, and more preferably from 1 to 5 carbons) with a (meth)acrylamide group. From the perspectives of curability of the curable composition (hard coat agent) and weather resistance, scratch resistance, and flexibility of the cured product (coating film), a 2-((meth)acrylamide) ethyl group, and a 3-((meth)acrylamide) propyl group, and the like are preferable.

The group containing a vinyl group is not particularly limited, and examples thereof include well-known or commonly used groups having a vinyl group, including, for example, a vinyl group; and groups obtained by replacing a hydrogen atom (ordinarily one or more, preferably one hydrogen atom) of an alkyl group (alkyl group having preferably from 1 to 10 carbons, and more preferably from 1 to 5 carbons) with a vinyl group. From the perspectives of curability of the curable composition (hard coat agent) and weather resistance, scratch resistance, and flexibility of the cured product (coating film), a vinyl group, a vinylmethyl group, a 2-vinylethyl group, and a 3-vinylpropyl group, and the like are preferable.

The group containing a vinylthio group is not particularly limited, and examples thereof include well-known or commonly used groups having a vinylthio group, including, for example, a vinylthio group; and groups obtained by replacing a hydrogen atom (ordinarily one or more, preferably one hydrogen atom) of an alkyl group (alkyl group having preferably from 1 to 10 carbons, and more preferably from 1 to 5 carbons) with a vinylthio group. From the perspectives of curability of the curable composition (hard coat agent) and weather resistance, scratch resistance, and flexibility of the cured product (coating film), a vinylthiomethyl group, a 2-(vinylthio)ethyl group, and a 3-(vinylthio)propyl group, and the like are preferable.

From the perspectives of weather resistance, scratch resistance, and flexibility of the cured product (coating film), $R^1$ in Formula (1) is preferably a group containing an epoxy group, or a group containing a (meth)acryloxy group, and is particularly preferably a group represented by Formula (1a) above in which $R^{1a}$ is an ethylene group (among which a 2-(3',4'-epoxycyclohexyl)ethyl group is preferable), a 3-(acryloxy)propyl group, or a 3-(methacryloxy)propyl group.

The polyorganosilsesquioxane according to an embodiment of the present invention may include only one type of constituent unit represented by Formula (1) above or may include two or more types of constituent units represented by Formula (1) above.

The polyorganosilsesquioxane according to an embodiment of the present invention may also include, as a silsesquioxane constituent unit [$RSiO_{3/2}$], a constituent unit represented by Formula (2) below, in addition to the constituent unit represented by Formula (1) above.

[Chem. 18]

(2)

The constituent unit represented by Formula (2) above is a silsesquioxane constituent unit (T unit) generally represented by [$RSiO_{3/2}$]. That is, the constituent unit represented by Formula (2) above is formed by a hydrolysis and condensation reaction of a corresponding hydrolyzable trifunctional silane compound (specifically, for example, a compound represented by Formula (b) described later).

$R^2$ in Formula (2) represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group. Examples of the aryl group include a phenyl group, a tolyl group, and a naphthyl group. Examples of the aralkyl group include a benzyl group and a phenethyl group. Examples of the cycloalkyl group include a cyclobutyl group, a cyclopentyl group, and a cyclohexyl group. Examples of the alkyl group include linear or branched alkyl groups, such as a methyl group, an ethyl group, a propyl group, an n-butyl group, an isopropyl group, an isobutyl group, an s-butyl group, a t-butyl group, and an isopentyl group. Examples of the alkenyl group include linear or branched alkenyl groups, such as a vinyl group, an allyl group, and an isopropenyl group.

Examples of the substituted aryl group, the substituted aralkyl group, the substituted cycloalkyl group, the substituted alkyl group, and the substituted alkenyl group described above include a group in which some or all of hydrogen atoms or a portion or the entirety of the skeleton in each of the aryl group, the aralkyl group, the cycloalkyl group, the alkyl group, and the alkenyl group described above are substituted with at least one type selected from the group consisting of an ether group, an ester group, a carbonyl group, a siloxane group, a halogen atom (such as a fluorine atom), an acryl group, a methacryl group, a mercapto group, an amino group, and a hydroxyl group (hydroxyl group).

Among these, $R^2$ is preferably a substituted or unsubstituted aryl group, a substituted or unsubstituted alkyl group, or a substituted or unsubstituted alkenyl group, more preferably a substituted or unsubstituted aryl group, and even more preferably a phenyl group.

A ratio of each silsesquioxane constituent unit described above (the constituent unit represented by Formula (1) and the constituent unit represented by Formula (2)) in the polyorganosilsesquioxane according to an embodiment of the present invention can be appropriately adjusted by a composition of the raw materials (hydrolyzable trifunctional silanes) for forming these constituent units.

The polyorganosilsesquioxane according to an embodiment of the present invention may further include, in addition to the constituent unit represented by Formula (1) above and the constituent unit represented by Formula (2) above, at least one type of siloxane constituent unit selected from the group consisting of a silsesquioxane constituent unit [$RSiO_{3/2}$] other than the constituent unit represented by Formula (1) above and the constituent unit represented by Formula (2) above; a constituent unit represented by [$R_3SiO_{1/2}$] ("M unit"); a constituent unit represented by [$R_2SiO_{2/2}$] ("D unit"); and a constituent unit represented by [$SiO_{4/2}$] ("Q unit"). Here, examples of the silsesquioxane constituent unit other than the constituent unit represented by Formula (1) above and the constituent unit represented by Formula (2) above include a constituent unit represented by Formula (3) below.

[Chem. 19]

(3)

When the polyorganosilsesquioxane according to an embodiment of the present invention has a constituent unit (T3 form) represented by Formula (I) above and a constituent unit (T2 form) represented by Formula (II) above, the ratio of [T3 form/T2 form] is not particularly limited, and for example, can be appropriately selected from a range of 5 or greater (for example, from 5 to 500). The lower limit of the above-mentioned [T3 form/T2 form] ratio is preferably 20, more preferably 21, even more preferably 23, and yet even more preferably 25 (for example, preferably 5, more preferably 6, and even more preferably 7). When the above [T3 form/T2 form] ratio is 5 or greater, the surface hardness, scratch resistance, and flexibility of the cured product (coating film) tend to be improved. On the other hand, the upper limit of the above-mentioned [T3 form/T2 form] ratio is preferably 500, more preferably 100, even more preferably 50, and yet even more preferably 40 (for example, preferably less than 20, more preferably 18, even more preferably 16, and yet even more preferably 14). When the above-mentioned [T3 form/T2 form] ratio is set to 500 or less (for example, preferably less than 20, and more preferably 18 or less), miscibility with other components in the curable composition (hard coat agent) is improved, and viscosity is suppressed, and therefore handling is simplified, and coating as a hard coat agent is facilitated.

The constituent unit represented by Formula (I) above is represented by Formula (I') below in more detail. Furthermore, the constituent unit represented by Formula (II) above is represented by Formula (II') below in more detail. Three oxygen atoms bonded to the silicon atom illustrated in the structure represented by formula (I') below are each bonded to another silicon atom (a silicon atom not illustrated in formula (I')). On the other hand, two oxygen atoms located above and below the silicon atom illustrated in the structure represented by Formula (II') below are each bonded to another silicon atom (a silicon atom not illustrated in Formula (II')). That is, both the T3 form and the T2 form are constituent units (T units) formed by a hydrolysis and condensation reaction of a corresponding hydrolyzable trifunctional silane compound.

[Chem. 20]

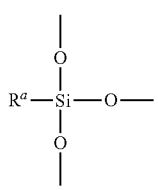

(I')

[Chem. 21]

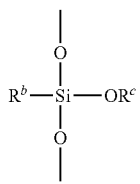

(II')

$R^a$ in Formula (I) above (likewise, $R^a$ in Formula (I')) and $R^b$ in Formula (II) above (likewise, $R^b$ in Formula (II')) each represent a group containing an active energy ray-curable functional group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom. Specific examples of $R^a$ and $R^b$ include the same examples as those given for $R^1$ in Formula (1) above and $R^2$ in Formula (2) above. Note that $R^a$ in Formula (I) and $R^b$ in Formula (II) are each derived from a group (a group other than an alkoxy group and a halogen atom; for example, $R^1$, $R^2$, a hydrogen atom, and the like in Formulae (a) to (c) described below) bonded to a silicon atom in the hydrolyzable trifunctional silane compound used as a raw material for the polyorganosilsesquioxane according to an embodiment of the present invention.

$R^c$ in Formula (II) above (also $R^c$ in Formula (II')) represents a hydrogen atom or an alkyl group having from 1 to 4 carbons. Examples of the alkyl group having from 1 to 4 carbons include linear or branched alkyl groups having from 1 to 4 carbons, such as a methyl group, an ethyl group, a propyl group, an isopropyl group, a butyl group, and an isobutyl group. The alkyl group in $R^c$ in Formula (II) is typically derived from an alkyl group that forms an alkoxy group (for example, an alkoxy group as $X^1$ to $X^3$ described later) in the hydrolyzable silane compound used as a raw material for the polyorganosilsesquioxane according to an embodiment of the present invention.

The above [T3 form/T2 form] ratio in the polyorganosilsesquioxane according to an embodiment of the present invention can be determined, for example, by $^{29}$Si-NMR spectroscopic measurements. In the $^{29}$Si-NMR spectrum, the silicon atom in the constituent unit represented by Formula (I) above (T3 form) and the silicon atom in the constituent unit represented by Formula (II) above (T2 form) exhibit signals (peaks) at different positions (chemical shifts), and thus the above [T3 form/T2 form] ratio is determined by calculating the integration ratio of these respective peaks. Specifically, for example, when the polyorganosilsesquioxane according to an embodiment of the present invention includes a constituent unit represented by Formula (1) above where R' is a 2-(3',4'-epoxycyclohexyl) ethyl group, the signal of the silicon atom in the structure (T3 form) represented by Formula (I) above appears at −64 to −70 ppm, and the signal of the silicon atom in the structure (T2 form) represented by Formula (II) above appears at −54 to −60 ppm. Thus, in this case, the above [T3 form/T2 form] ratio can be determined by calculating the integration ratio of the signal at −64 to −70 ppm (T3 form) and the signal at −54 to −60 ppm (T2 form). For a case in which $R^1$ is a group that includes an active energy ray-curable functional group other than the 2-(3',4'-epoxycyclohexyl) ethyl group, the [T3 form/T2 form] ratio can be determined in the same manner.

The $^{29}$Si-NMR spectrum of the polyorganosilsesquioxane according to an embodiment of the present invention can be measured, for example, with the following instrument and conditions.

Measurement instrument: "JNM-ECA500NMR" (trade name, available from JEOL Ltd.)
Solvent: Deuteriochloroform
Number of scans: 1800 scans
Measurement temperature: 25° C.

The [T3 form/T2 form] ratio of the polyorganosilsesquioxane according to an embodiment of the present invention that is within the above-mentioned range (for example, from 5 to 500) means that a certain amount of the T2 form are present relative to the amount of the T3 form in the polyorganosilsesquioxane according to an embodiment of the present invention. Examples of such a T2 form include a constituent unit represented by Formula (4) below, a constituent unit represented by Formula (5) below, and a constituent unit represented by Formula (6) below. $R^1$ in Formula (4) below and $R^2$ in Formula (5) below are the same as the $R^1$ in Formula (1) above and the $R^2$ in Formula (2) above, respectively. $R^c$ in Formulae (4) to (6) below represents a hydrogen atom or an alkyl group having from 1 to 4 carbons, similar to $R^c$ in Formula (II).

[Chem. 22]

$$[R^1SiO_{2/2}(OR^c)] \qquad (4)$$

[Chem. 23]

$$[R^2SiO_{2/2}(OR^c)] \qquad (5)$$

[Chem. 24]

$$[HSiO_{2/2}(OR^c)] \qquad (6)$$

The polyorganosilsesquioxane according to an embodiment of the present invention may have any of a cage-type, an incomplete cage-type, a ladder-type, or a random-type silsesquioxane structure, or may have a combination of two or more of these silsesquioxane structures.

If the polyorganosilsequioxane according to an embodiment of the present invention has a constituent unit represented by Formula (4) above, a ratio (total amount) of the constituent unit represented by Formula (1) above and the constituent unit represented by Formula (4) above to a total amount (100 mol %) of siloxane constituent units [all siloxane constituent units; total amount of M units, D units, T units, and Q units] is not particularly limited, but is preferably from 55 to 100 mol %, more preferably from 65 to 100 mol %, and even more preferably from 80 to 99 mol %. Setting the above-mentioned ratio to 55 mol % or higher improves the curability of the curable composition (hard coat agent), and increases the weather resistance, scratch resistance, and flexibility of the cured product (coating film). In addition, the ratio of each siloxane constituent unit in the polyorganosilsesquioxane according to an embodiment of the present invention can be calculated, for example, from the composition of the raw materials and NMR spectroscopic measurements.

The ratio (total amount) of the constituent unit represented by Formula (2) above and the constituent unit represented by Formula (5) above relative to a total amount (100 mol %) of siloxane constituent units [all siloxane constituent units; total amount of M unit, D unit, T unit, and Q unit] in the polyorganosilsesquioxane according to an embodiment of the present invention is not particularly limited, but is preferably from 0 to 70 mol %, more preferably from 0 to 60 mol %, even more preferably from 0 to 40 mol %, and particularly preferably from 1 to 15 mol %. When the above ratio is set to 70 mol % or less, the ratio of the constituent units represented by Formula (1) and the constituent units represented by Formula (4) can be relatively increased, and thus such a ratio tends to improve the curability of the curable composition (hard coat agent) and further increase the weather resistance, scratch resistance, and flexibility of the cured product (coating film).

The ratio (total amount) of the constituent unit represented by Formula (1) above, the constituent unit represented by Formula (2) above, the constituent unit represented by Formula (4) above, and the constituent unit represented by Formula (5) above relative to a total amount (100 mol %) of siloxane constituent units [all siloxane constituent units; total amount of M unit, D unit, T unit, and Q unit] in the polyorganosilsesquioxane according to an embodiment of the present invention is not particularly limited, but is preferably from 60 to 100 mol %, more preferably from 70 to 100 mol %, and even more preferably from 80 to 100 mol %. Setting the above ratio to 60 mol % or greater tends to further increase the weather resistance, scratch resistance, and flexibility of the cured product (coating film).

The number average molecular weight (Mn) of the polyorganosilsesquioxane according to an embodiment of the present invention, determined by gel permeation chromatography, calibrated with standard polystyrene, is not particularly limited, and for example, can be appropriately selected from a range from 1000 to 50000. The lower limit of the number average molecular weight is preferably 2500, more preferably 2800, and even more preferably 3000 (for example preferably 1000, and even more preferably 1100). When the number average molecular weight is set to 1000 or higher, the weather resistance, scratch resistance, and flexibility of the cured product (coating film) tend to be improved. On the other hand, the upper limit of the number average molecular weight is preferably 50000, more preferably 10000, and even more preferably 8000 (for example, preferably 3000, more preferably 2800, and even more preferably 2600). When the number average molecular weight is set to 50000 or less (for example, 3000 or less), the miscibility with other components in the curable composition (hard coat agent) tends to be improved, and the weather resistance, scratch resistance, and flexibility of the cured product (coating film) tend to be improved.

The molecular weight dispersity (Mw/Mn) of the polyorganosilsesquioxane according to an embodiment of the present invention, determined by gel permeation chromatography, calibrated with standard polystyrene, is not particularly limited, and can be appropriately selected from a range from 1.0 to 4.0. The lower limit of the molecular weight dispersity is preferably 1.0, more preferably 1.1, and even more preferably 1.2. When the molecular weight dispersity is set to 1.1 or higher, the curable composition (hard coat agent) easily becomes a liquid, and handleability tends to be improved. On the other hand, the upper limit of the molecular weight dispersity is preferably 4.0, more preferably 3.0, and even more preferably 2.5 (for example, preferably 3.0, more preferably 2.0, and even more preferably 1.9). When the molecular weight dispersity is set to not greater than 4.0 (for example, 3.0 or less), the weather resistance, scratch resistance, and flexibility of the cured product (coating film) tend to increase.

The number average molecular weight and the molecular weight dispersity of the polyorganosilsesquioxane according to an embodiment of the present invention can be measured with the following instruments and conditions.

Measurement instrument: "LC-20AD" (trade name, available from Shimadzu Corporation)

Column: Shodex KF-801×2, KF-802, and KF-803 (available from Showa Denko K.K.)

Measurement temperature: 40° C.

Eluent: THF, sample concentration of 0.1 to 0.2 wt. %

Flow rate: 1 mL/min

Detector: UV-VIS detector (trade name "SPD-20A", available from Shimadzu Corporation)

Molecular weight: calibrated with standard polystyrene

A 5% weight loss temperature ($T_{d5}$) of the polyorganosilsesquioxane according to an embodiment of the present invention in an air atmosphere is not particularly limited, but is preferably 330° C. or higher (for example, from 330 to 450° C.), more preferably 340° C. or higher, and even more preferably 350° C. or higher. Setting the 5% weight loss temperature to 330° C. or higher tends to further improve the weather resistance, scratch resistance, and flexibility of the cured product (coating film). In particular, when the polyorganosilsesquioxane according to an embodiment of the present invention has a [T3 form/T2 form] ratio from 5 to 500, a number average molecular weight from 1000 to 50000, and a molecular weight dispersity from 1.0 to 4.0, the 5% weight loss temperature thereof is controlled to 330° C. or higher. Here, the 5% weight loss temperature is a temperature at which the weight decreases by 5% compared to a weight prior to heating when heating is performed at a constant temperature increase rate, and is an indicator of heat resistance. The 5% weight loss temperature can be measured by thermogravimetric analysis (TGA) under conditions of a temperature increase rate of 5° C./min in an air atmosphere.

The method for producing the polyorganosilsesquioxane according to an embodiment of the present invention is not particularly limited, and the polyorganosilsesquioxane can be produced by a well-known or commonly used polysiloxane production method. Examples include a method of subjecting one or more types of hydrolyzable silane compounds to hydrolysis and condensation. As the hydrolyzable silane compound, however, a hydrolyzable trifunctional silane compound (compound represented by Formula (a) below) for forming the constituent unit represented by the Formula (1) described above needs to be used as an essential hydrolyzable silane compound.

More specifically, for example, the polyorganosilsesquioxane according to an embodiment of the present invention can be produced by a method of hydrolysis and condensation of a compound represented by Formula (a) below, which is a hydrolyzable silane compound for forming the silsesquioxane constituent unit (T unit) in the polyorganosilsesquioxane according to an embodiment of the present invention, and additionally as necessary, a compound represented by Formula (b) below and a compound represented by Formula (c) below.

[Chem. 25]

$$R^1Si(X^1)_3 \quad (a)$$

[Chem. 26]

$$R^2Si(X^2)_3 \quad (b)$$

[Chem. 27]

$$HSi(X^3)_3 \quad (c)$$

The compound represented by Formula (a) above is a compound that forms a constituent unit represented by Formula (1) in the polyorganosilsesquioxane according to an embodiment of the present invention. $R^1$ in Formula (a) represents a group containing an active energy ray-curable functional group, as in the case of $R^1$ in Formula (1) above. That is, $R^1$ in Formula (a) is preferably a group represented by Formula (1a) above, a group represented by Formula (1b) above, a group represented by Formula (1c) above, and a group represented by Formula (1d) above, more preferably a group represented by Formula (1a) above and a group represented by Formula (1c) above, even more preferably a group represented by Formula (1a) above, and particularly preferably a group represented by Formula (1a) above where $R^{1a}$ is an ethylene group (in particular, a 2-(3',4'-epoxycyclohexyl)ethyl group). As described above, the $R^1$ in Formula (a) is preferably a 3-(acryloxy) propyl group or a 3-(methacryloxy) propyl group.

$X^1$ in Formula (a) above represents an alkoxy group or a halogen atom.

Examples of the alkoxy group in $X^1$ include alkoxy groups having from 1 to 4 carbons, such as a methoxy group, an ethoxy group, a propoxy group, an isopropyloxy group, a butoxy group, and an isobutyloxy group. In addition, examples of the halogen atom in $X^1$ include a fluorine atom, a chlorine atom, a bromine atom, and an iodine atom. Among these, $X^1$ is preferably an alkoxy group, and more preferably a methoxy group and an ethoxy group. In addition, each of the three $X^1$ may be the same or different.

The compound represented by Formula (b) above is a compound that forms a constituent unit represented by Formula (2) in the polyorganosilsesquioxane according to an embodiment of the present invention. $R^2$ in Formula (b) represents, as in the case of $R^2$ in Formula (2) above, a substituted or unsubstituted aryl group, a substituted or unsubstituted aralkyl group, a substituted or unsubstituted cycloalkyl group, a substituted or unsubstituted alkyl group, or a substituted or unsubstituted alkenyl group. That is, $R^2$ in Formula (b) is preferably a substituted or unsubstituted aryl group, a substituted or unsubstituted alkyl group, or a substituted or unsubstituted alkenyl group, more preferably a substituted or unsubstituted aryl group, and even more preferably a phenyl group.

$X^2$ in Formula (b) above represents an alkoxy group or a halogen atom. Specific examples of $X^2$ include those exemplified as $X^1$. Among these, $X^2$ is preferably an alkoxy group, more preferably a methoxy group and an ethoxy group. In addition, each of the three $X^2$ may be the same or different.

The compound represented by Formula (c) above is a compound that forms a constituent unit represented by Formula (3) in the polyorganosilsesquioxane according to an embodiment of the present invention. $X^3$ in Formula (c) above represents an alkoxy group or a halogen atom. Specific examples of $X^3$ include those exemplified as $X^1$. Among these, $X^3$ is preferably an alkoxy group, and more preferably a methoxy group and an ethoxy group. In addition, each of the three $X^3$ each may be the same or different.

A hydrolyzable silane compound other than the compounds represented by Formulae (a) to (c) above may be used in combination as the hydrolyzable silane compound. Examples thereof include hydrolyzable trifunctional silane compounds other than the compounds represented by Formulae (a) to (c) above, hydrolyzable monofunctional silane compounds forming an M unit, hydrolyzable bifunctional silane compounds forming a D unit, and hydrolyzable tetrafunctional silane compounds forming a Q unit.

The usage amount and the composition of the hydrolyzable silane compound can be appropriately adjusted according to the desired structure of the polyorganosilsesquioxane according to an embodiment of the present invention. For example, the usage amount of the compound represented by Formula (a) above is not particularly limited but is preferably from 55 to 100 mol %, more preferably from 65 to 100 mol %, and even more preferably from 80 to 99 mol %, relative to a total amount (100 mol %) of the hydrolyzable silane compounds used.

In addition, the usage amount of the compound represented by Formula (b) above is not particularly limited but is preferably from 0 to 70 mol %, more preferably from 0 to 60 mol %, even more preferably from 0 to 40 mol %, and particularly preferably from 1 to 15 mol %, relative to a total amount (100 mol %) of the hydrolyzable silane compounds used.

Furthermore, the ratio (ratio of a total amount) of the compound represented by Formula (a) and the compound represented by Formula (b) relative to a total amount (100 mol %) of the hydrolyzable silane compounds used is preferably from 60 to 100 mol %, more preferably from 70 to 100 mol %, and even more preferably from 80 to 100 mol %.

In addition, in a case where two or more types of the hydrolyzable silane compounds are used in combination, the hydrolysis and condensation reaction of these hydrolyzable silane compounds can be performed simultaneously or sequentially. The order of the reactions when performed sequentially is not particularly limited.

The hydrolysis and the condensation reaction of the hydrolyzable silane compound may be performed in one step or may be performed in two or more steps. For example, to efficiently produce the polyorganosilsesquioxane according to an embodiment of the present invention with the above-described [T3 form/T2 form] ratio of less than 20 and/or a number average molecular weight of less than 2500 (hereinafter, may be referred to as a "low molecular weight polyorganosilsesquioxane"), the hydrolysis and condensation reaction is preferably performed in one step. To efficiently produce the polyorganosilsesquioxane according to an embodiment of the present invention with the above-described [T3 form/T2 form] ratio of 20 or higher and/or a number average molecular weight of 2500 or greater (hereinafter, may be referred to as a "high molecular weight polyorganosilsesquioxane"), the hydrolysis and condensation reaction is preferably performed in two or more steps (preferably two steps), that is, the hydrolysis and condensation reaction is preferably performed one or more times using the low molecular weight polyorganosilsesquioxane as a raw material. An aspect in which a low molecular weight polyorganosilsequioxane is obtained by carrying out the hydrolysis and condensation reaction of the hydrolyzable silane compound in one step, and then the low molecular weight polyorganosilsesquioxane is further subjected to the hydrolysis and condensation reaction to form a high molecular weight polyorganosilsesquioxane is described below, but the method for producing the polyorganosilsesquioxane according to an embodiment of the present invention is not limited thereto.

When the hydrolysis and condensation reaction according to an embodiment of the present invention is performed in two steps, preferably, in the hydrolysis and condensation reaction of the first step, a polyorganosilsesquioxane having a [T3 form/T2 form] ratio of 5 or greater and less than 20, and a number average molecular weight of 1000 or greater and less than 2500 is formed, and in the hydrolysis and condensation reaction of the second step, the low molecular weight polyorganosilsesquioxane is further subjected to hydrolysis and condensation reaction, and thereby a high molecular weight polyorganosilsequioxane having a [T3 form/T2 form] ratio from 20 to 500 and a number average molecular weight from 2500 to 50000 can be obtained.

The hydrolysis and condensation reaction of the first step can be performed in the presence or absence of a solvent. Among these, the hydrolysis and condensation reaction are preferably performed in the presence of a solvent. Examples of the solvent include aromatic hydrocarbons, such as benzene, toluene, xylene, and ethylbenzene; ethers, such as diethyl ether, dimethoxyethane, tetrahydrofuran, and dioxane; ketones, such as acetone, methyl ethyl ketone, and methyl isobutyl ketone; esters, such as methyl acetate, ethyl acetate, isopropyl acetate, and butyl acetate; amides, such as N,N-dimethylformamide and N,N-dimethylacetamide; nitriles, such as acetonitrile, propionitrile, and benzonitrile; and alcohols, such as methanol, ethanol, isopropyl alcohol, and butanol. Among these, the solvent is preferably a ketone or an ether. In addition, one type of the solvent can be used alone, or two or more types thereof can be used in combination.

The usage amount of the solvent in the hydrolysis and condensation reaction of the first step is not particularly limited and can be appropriately adjusted in a range from 0 to 2000 parts by weight relative to 100 parts by weight of a total amount of the hydrolyzable silane compound, according to a desired reaction time or the like.

The hydrolysis and condensation reaction of the first step are preferably carried out in the presence of a catalyst and water. The catalyst may be an acid catalyst or an alkali catalyst, but an alkali catalyst is preferable in order to suppress decomposition of the active energy ray-curable functional group, such as an epoxy group. Examples of the acid catalyst include mineral acids, such as hydrochloric acid, sulfuric acid, nitric acid, phosphoric acid, and boric acid; phosphate esters; carboxylic acids, such as acetic acid, formic acid, and trifluoroacetic acid; sulfonic acids, such as methanesulfonic acid, trifluoromethanesulfonic acid, and p-toluenesulfonic acid; solid acids, such as activated clay; and Lewis acids, such as iron chloride. Examples of the alkali catalyst include alkali metal hydroxides, such as lithium hydroxide, sodium hydroxide, potassium hydroxide, and cesium hydroxide; alkaline earth metal hydroxides, such as magnesium hydroxide, calcium hydroxide, and barium hydroxide; alkali metal carbonates, such as lithium carbonate, sodium carbonate, potassium carbonate, and cesium carbonate; alkaline earth metal carbonates, such as magnesium carbonate; alkali metal hydrogencarbonates, such as lithium hydrogencarbonate, sodium hydrogencarbonate, potassium hydrogencarbonate, and cesium hydrogencarbonate; alkali metal organic acid salts (for example, acetates), such as lithium acetate, sodium acetate, potassium acetate, and cesium acetate; organic acid salts (for example, acetates) of alkaline earth metal, such as magnesium acetate; alkali metal alkoxides, such as lithium methoxide, sodium methoxide, sodium ethoxide, sodium isopropoxide, potassium ethoxide, and potassium t-butoxide; alkali metal phenoxides, such as sodium phenoxide; amines (tertiary amines and the like), such as triethylamine, N-methylpiperidine, 1,8-diazabicyclo[5.4.0]undec-7-ene, and 1,5-diazabicyclo[4.3.0]non-5-ene; and nitrogen-containing heterocyclic aromatic compounds, such as pyridine, 2,2'-bipyridyl, and 1,10-phenanthroline. Here, one type of the catalyst can be used alone, or two or more types thereof can be used in combination. In addition, the catalyst can be used in a state of being dissolved or dispersed in water, a solvent, or the like.

The usage amount of the catalyst in the hydrolysis and condensation reaction of the first step is not particularly limited and can be appropriately adjusted in a range from 0.002 to 0.200 mol relative to a total amount of 1 mol of the hydrolyzable silane compounds.

The usage amount of water during the hydrolysis and condensation reaction of the first step is not particularly limited and can be appropriately adjusted in a range from 0.5 to 20 mol relative to a total amount of 1 mol of the hydrolyzable silane compounds.

The method for adding water in the hydrolysis and condensation reaction of the first step is not particularly limited, and the total amount (total usage amount) of water to be used may be added all at once or may be added sequentially. When the water is added sequentially, it may be added continuously or intermittently.

As the reaction conditions for the hydrolysis and condensation reaction of the first step, it is particularly important to select reaction conditions that allow the above [T3 form/T2 form] ratio in the low molecular weight polyorganosilsesquioxane to be 5 or greater and less than 20. The reaction temperature of the hydrolysis and condensation reaction of the first step is not particularly limited but is preferably from 40 to 100° C. and more preferably from 45 to 80° C. Controlling the reaction temperature to the above range tends to facilitate a more efficient control of the above [T3 form/T2 form] ratio to 5 or more and less than 20. In addition, the reaction time of the hydrolysis and condensation reaction of the first step is not particularly limited, but is preferably from 0.1 to 10 hours and more preferably from 1.5 to 8 hours. Furthermore, the hydrolysis and condensation reaction of the first step can be performed under normal pressure, or can be performed under increased pressure or reduced pressure. Here, the atmosphere when performing the hydrolysis and condensation reaction in the first step is not particularly limited, and for example, the reaction may be performed in any of an inert gas atmosphere such as a nitrogen atmosphere or an argon atmosphere, or in the presence of oxygen such as in the air. The hydrolysis and condensation reaction is preferably performed in an inert gas atmosphere.

The low molecular weight polyorganosilsesquioxane can be obtained by the hydrolysis and condensation reaction of the first step. After completion of the hydrolysis and condensation reaction of the first step, the catalyst is preferably neutralized to prevent degradation of the active energy ray-curable functional group, such as ring-opening of the epoxy group. Also, the low molecular weight polyorganosilsesquioxane may be separated and purified through, for example, a separation means such as rinsing with water, acid washing, alkali washing, filtration, concentration, distillation, extraction, crystallization, recrystallization, or column chromatography, or a separation means of a combination thereof.

The low molecular weight polyorganosilsesquioxane, formed in the hydrolysis and condensation reaction of the first step, is subjected to the hydrolysis and condensation reaction of the second step, whereby the high molecular weight polyorganosilsesquioxane can be produced.

The hydrolysis and condensation reaction of the second step can be performed in the presence or absence of a solvent. When the hydrolysis and condensation reaction of the second step is performed in the presence of a solvent, a solvent given as an example with regard to the hydrolysis and condensation reaction of the first step can be used. As the solvent of the hydrolysis and condensation reaction of the second step, the low molecular weight polyorganosilsesquioxane containing the reaction solvent and extraction solvent of the hydrolysis and condensation reaction of the first step may be used as is or may be partially distilled away and used. In addition, one type of the solvent can be used alone, or two or more types thereof can be used in combination.

In a case where the solvent is used in the hydrolysis and condensation reaction of the second step, the usage amount thereof is not particularly limited, and may be appropriately adjusted to a range from 0 to 2000 parts by weight relative to 100 parts by weight of the low molecular weight polyorganosilsesquioxane, according to a desired reaction time or the like.

The hydrolysis and condensation reaction of the second step is preferably carried out in the presence of a catalyst and water. As the catalyst in the second step, the catalyst of the hydrolysis and condensation reaction of the first step can be used. To suppress decomposition of active energy ray-curable functional groups such as an epoxy group, the catalyst is preferably an alkali catalyst, more preferably an alkali metal hydroxide such as sodium hydroxide, potassium hydroxide, or cesium hydroxide, or a carbonate of an alkali metal, such as lithium carbonate, sodium carbonate, potassium carbonate, or cesium carbonate. Here, one type of the catalyst can be used alone, or two or more types thereof can be used in combination. In addition, the catalyst can be used in a state of being dissolved or dispersed in water, a solvent, or the like.

The amount of the catalyst used in the hydrolysis and condensation reaction of the second step is not particularly limited, and may be appropriately adjusted to a range preferably from 0.01 to 10000 ppm, and more preferably from 0.1 to 1000 ppm, relative to the amount of the low molecular weight polyorganosilsesquioxane (1000000 ppm).

The amount of water used in the hydrolysis and condensation reaction of the second step is not particularly limited, and may be appropriately adjusted to a range preferably from 10 to 100000 ppm, and more preferably from 100 to 20000 ppm, relative to the amount of the low molecular weight polyorganosilsesquioxane (1000000 ppm). In a case where the amount of water used is greater than 100000 ppm, the [T3 form/T2 form] ratio and the number average molecular weight of the high molecular weight polyorganosilsesquioxane may not be easily controlled to the predetermined ranges.

The method for adding the water in the hydrolysis and condensation reaction of the second step is not particularly limited, and the total amount of the water to be used (total usage amount) may be added all at once or may be added sequentially. When the water is added sequentially, it may be added continuously or intermittently.

As the reaction conditions for the hydrolysis and condensation reaction of the second step, it is particularly important to select reaction conditions that allow the above [T3 form/T2 form] ratio in the high molecular weight polyorganosilsesquioxane to be from 20 to 500, and the number average molecular weight to be from 2500 to 50000. The reaction temperature of the hydrolysis and condensation reaction of the second step may vary depending on the catalyst that is used, and is not particularly limited, but is preferably from 5 to 200° C., and more preferably from 30 to 100° C. When the reaction temperature is controlled to the above range, the [T3 form/T2 form] ratio and the number average molecular weight tend to be more efficiently controlled to the desired ranges. In addition, the reaction time of the hydrolysis and condensation reaction of the second step is not particularly limited, but is preferably from 0.5 to 1000 hours, and more preferably from 1 to 500 hours.

Additionally, sampling may be performed at an appropriate time while the hydrolysis and condensation reaction are carried out within the reaction temperature range described above, and the reaction is carried out while the [T3 form/T2 form] ratio and the number average molecular weight are monitored, whereby the high molecular weight polyorganosilsesquioxane having the desired [T3 form/T2 form] ratio and number average molecular weight can be formed.

Furthermore, the hydrolysis and condensation reaction of the second step can be performed under normal pressure, or can be performed under increased pressure or reduced pressure. Here, the atmosphere when performing the hydrolysis and condensation reaction of the second step is not particularly limited, and, for example, the reaction may be performed in any of an inert gas atmosphere such as a nitrogen atmosphere or an argon atmosphere, or in the presence of oxygen such as in the air. The hydrolysis and condensation reaction is preferably performed in the inert gas atmosphere.

The high molecular weight polyorganosilsesquioxane can be obtained by the hydrolysis and condensation reaction of the second step. After completion of the hydrolysis and condensation reaction of the second step, the catalyst is preferably neutralized to prevent decomposition of the active energy ray-curable functional group, such as ring-opening of the epoxy group. The high molecular weight polyorganosilsesquioxane may be separated and purified through, for example, a separation means such as water washing, acid washing, alkali washing, filtration, concentration, distillation, extraction, crystallization, recrystallization, or column chromatography, or a separation means of a combination thereof.

The polyorganosilsesquioxane according to an embodiment of the present invention includes the configuration described above, and thus a cured product (coating film) having excellent weather resistance and scratch resistance, and also excelling in flexibility and pliability can be formed by applying and curing the curable composition (hard coat agent) that includes the polyorganosilsesquioxane as an essential component.

Note that in the curable composition (hard coat agent) according to an embodiment of the present invention, one type of the polyorganosilsesquioxane according to an embodiment of the present invention may be used alone, or two or more types may be used in combination.

The content (blended amount) of the polyorganosilsesquioxane according to an embodiment of the present invention in the curable composition (hard coat agent) according to an embodiment of the present invention is not particularly limited, but is preferably 70 wt. % or greater and less than 100 wt. %, more preferably from 80 to 99.8 wt. %, and even more preferably from 90 to 99.5 wt. %, relative to a total amount (100 wt. %) of the curable composition (hard coat agent) excluding the solvent. Setting the content of the polyorganosilsesquioxane according to an embodiment of the present invention to 70 wt. % or greater tends to further improve the weather resistance, scratch resistance, and flexibility of the cured product (coating film). On the other hand, when the content of the polyorganosilsesquioxane according to an embodiment of the present invention is set to less than 100 wt. %, a photocuring catalyst can be contained, and thereby curing of the curable composition (hard coat agent) tends to advance more efficiently.

The ratio of the polyorganosilsesquioxane according to an embodiment of the present invention relative to the total amount (100 wt. %) of a photocationically curable compound or a photoradically curable compound contained in the curable composition (hard coat agent) according to an embodiment of the present invention is not particularly limited, but is preferably from 70 to 100 wt. %, more preferably from 75 to 98 wt. %, and even more preferably from 80 to 95 wt. %. Setting the content of the polyorganosilsesquioxane according to an embodiment of the present invention to 70 wt. % or greater tends to further improve the weather resistance, scratch resistance, and flexibility of the cured product (coating film).

The curable composition (hard coat agent) according to an embodiment of the present invention preferably further includes a photocuring catalyst that promotes a curing reaction through radiation with active energy rays. From the perspective of being able to further shorten the curing time until the curable composition (hard coat agent) becomes tack free, it is particularly preferable that the curable composition (hard coat agent) contains a photocationic polymerization initiator or a photoradical polymerization initiator as the photocuring catalyst.

The photocationic polymerization initiator (photoacid generator) is a compound that can initiate or accelerate a photocationic polymerization reaction of a photocationically curable compound such as the polyorganosilsesquioxane according to an embodiment of the present invention.

Well-known or commonly used photocationic polymerization initiators can be used as the photocationic polymerization initiator, and examples thereof include a sulfonium salt (a salt of a sulfonium ion and an anion), an iodonium salt (a salt of an iodonium ion and an anion), a selenium salt (a salt of a selenium ion and an anion), an ammonium salt (a salt of an ammonium ion and an anion), a phosphonium salt (a salt of a phosphonium ion and an anion), and a salt of a transition metal complex ion and an anion. One of these compounds can be used alone or two or more in combination.

Examples of the sulfonium salt include a triarylsulfonium salt, such as [4-(4-biphenylylthio)phenyl]-4-biphenylylphenyl sulfonium tris(pentafluoroethyl) trifluorophosphate, a triphenylsulfonium salt, a tri-p-tolylsulfonium salt, a tri-o-tolylsulfonium salt, a tris(4-methoxyphenyl)sulfonium salt, a 1-naphthyldiphenylsulfonium salt, a 2-naphthyldiphenylsulfonium salt, a tris(4-fluorophenyl)sulfonium salt, a tri-1-naphthylsulfonium salt, a tri-2-naphthylsulfonium salt, a tris(4-hydroxyphenyl)sulfonium salt, a diphenyl[4-(phenylthio)phenyl]sulfonium salt, and a 4-(p-tolylthio)phenyl di-(p-phenyl) sulfonium salt; a diarylsulfonium salt, such as a diphenylphenacylsulfonium salt, a diphenyl 4-nitrophenacylsulfonium salt, a diphenylbenzylsulfonium salt, and a diphenylmethylsulfonium salt; a monoarylsulfonium salt, such as a phenylmethylbenzylsulfonium salt, a 4-hydroxyphenylmethylbenzylsulfonium salt, and a 4-methoxyphenylmethylbenzylsulfonium salt; and a trialkylsulfonium salt, such as a dimethylphenacylsulfonium salt, a phenacyltetrahydrothiophenium salt, and a dimethylbenzylsulfonium salt.

As the diphenyl [4-(phenylthio)phenyl]sulfonium salt, for example, diphenyl[4-(phenylthio)phenyl]sulfonium hexafluoroantimonate and (diphenyl[4-(phenylthio)phenyl] sulfonium hexafluorophosphate can be used.

Examples of the iodonium salt include "UV9380C" (trade name, a bis(4-dodecylphenyl) iodonium=hexafluoroantimonate 45% alkyl glycidyl ether solution, available from Momentive Performance Materials Japan LLC), "RHODORSIL PHOTOINITIATOR 2074" (trade name, tetrakis(pentafluorophenyl)borate=[(1-methylethyl)phenyl](methylphenyl)iodonium, available from Rhodia Japan Ltd.), "WPI-124" (trade name, available from Wako Pure Chemical Industries, Ltd.), a diphenyliodonium salt, a di-p-tolyliodonium salt, a bis(4-dodecylphenyl)iodonium salt, and a bis(4-methoxyphenyl)iodonium salt.

Examples of the selenium salt include a triarylselenium salt, such as a triphenylselenium salt, a tri-p-tolylselenium salt, a tri-o-tolylselenium salt, a tris(4-methoxyphenyl)selenium salt, and a 1-naphthyldiphenylselenium salt; a diarylselenium salt, such as a diphenylphenacylselenium salt, a diphenylbenzylselenium salt, and a diphenylmethylselenium salt; a monoarylselenium salt, such as a phenylmethylbenzylselenium salt; and a trialkylselenium salt, such as a dimethylphenacylselenium salt.

Examples of the ammonium salt include tetraalkyl ammonium salts, such as a tetramethyl ammonium salt, an ethyltrimethyl ammonium salt, a diethyldimethyl ammonium salt, a triethylmethyl ammonium salt, a tetraethyl ammonium salt, a trimethyl-n-propyl ammonium salt, and a trimethyl-n-butyl ammonium salt; pyrrolidium salts, such as an N,N-dimethylpyrrolidium salt and an N-ethyl-N-methylpyrrolidium salt; imidazolinium salts, such as an N,N'-dimethylimidazolinium salt and an N,N'-diethylimidazolinium salt; tetrahydropyrimidium salts, such as an N,N'-dimethyltetrahydropyrimidium salt and an N,N'-diethyltetrahydropyrimidium salt; morpholinium salts, such as an N,N-dimethylmorpholinium salt and an N,N-diethylmorpholinium salt; piperidinium salts, such as an N,N-dimethylpiperidinium salt and an N,N-diethylpiperidinium salt; pyridinium salts, such as an N-methylpyridinium salt and an N-ethylpyridinium salt; imidazolium salts, such as an N,N'-dimethylimidazolium salt; quinolium salts, such as an N-methylquinolium salt; isoquinolium salts, such as an N-methylisoquinolium salt; thiazonium salts, such as a benzylbenzothiazonium salt; and acrydium salts, such as a benzylacrydium salt.

Examples of the phosphonium salt include a tetraarylphosphonium salt, such as a tetra-phenylphosphonium salt, a tetra-p-tolylphosphonium salt, and a tetrakis(2-methoxyphenyl)phosphonium salt; a triarylphosphonium salt, such as a triphenylbenzylphosphonium salt; and a tetra-alkylphosphonium salt, such as a triethylbenzylphosphonium salt, a tributylbenzylphosphonium salt, a tetra-ethylphosphonium salt, a tetra-butylphosphonium salt, and a triethylphenacylphosphonium salt.

Examples of the salt of the transition metal complex ion include a salt of a chromium complex cation, such as (η5-cyclopentadienyl)(η6-toluene)Cr$^+$ and (η5-cyclopentadienyl)(η6-xylene)Cr$^+$; and a salt of an iron complex cation, such as (η5-cyclopentadienyl)(η6-toluene)Fe$^+$ and (η5-cyclopentadienyl)(η6-xylene)Fe$^+$.

Examples of the anion constituting the salt described above include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, a sulfonate anion (such as a trifluoromethanesulfonate anion, a pentafluoroethanesulfonate anion, a nonafluorobutanesulfonate anion, a methanesulfonate anion, a benzenesulfonate anion, and a p-toluenesulfonate anion), $(CF_3SO_2)_3C^-$, $(CF_3SO_2)_2N^-$, a perhalogenate ion, a halogenated sulfonate ion, a sulfate ion, a carbonate ion, an aluminate ion, a hexafluorobismuthate ion, a carboxylate ion, an arylborate ion, a thiocyanate ion, and a nitrate ion.

The photoradical polymerization initiator is a compound that can initiate or accelerate a photoradical polymerization reaction of a photoradically curable compound such as the polyorganosilsesquioxane according to an embodiment of the present invention.

Examples of the photoradical polymerization initiator include benzophenone, acetophenone benzyl, benzyldimethyl ketone, benzoin, benzoin methyl ether, benzoin ethyl ether, benzoin isopropyl ether, dimethoxyacetophenone, dimethoxy phenylacetophenone, diethoxyacetophenone, diphenyl disulfite, methyl o-benzoylbenzoate, ethyl 4-dimethylaminobenzoate (available from Nippon Kayaku Co., Ltd.; trade name "Kayacure EPA", etc.), 2,4-diethylthioxanthone (available from Nippon Kayaku Co., Ltd., trade name "Kayacure DETX", etc.), 2-methyl-1-[4-(methyl)phenyl]-2-morpholino-propanone-1 (available from IGM Resins B.V., trade name "Omnirad 907"), 1-hydroxycyclohexyl phenyl ketone (available from IGM Resins B.V., trade name "Omnirad", etc.), 2-dimethylamino-2-(4-morpholino) benzoyl-1-phenylpropane, and other such 2-amino-2-benzoyl-1-phenyl alkane compounds, tetra(t-butylperoxy carbonyl) benzophenone, benzil, 2-hydroxy-2-methyl-1-phenyl-propan-1-one, 4,4-bis diethylaminobenzophenone, and other such amino benzene derivatives, 2,2'-bis (2-chlorophenyl)-4,5,4',5'-tetraphenyl-1,2'-biimidazole (available from Hodagaya Chemical Co., Ltd., trade name "B-CIM", etc.), and other such imidazole compounds, 2,6-bis (trichloromethyl)-4-(4-methoxynaphthalen-1-yl)-1,3,5-triazine, and other such halomethylated triazine compounds, and 2-trichloromethyl-5-(2-benzofuran-2-yl-ethenyl)-1,3,4-oxadiazole, and other such halomethyl oxadiazole compounds. Photosensitizers can also be added as necessary.

Note that, in the curable composition (hard coat agent) according to an embodiment of the present invention, one type of the photocuring catalyst may be used alone, or two or more types may be used in combination.

The content (blended amount) of the photocuring catalyst in the curable composition (hard coat agent) according to an embodiment of the present invention is not particularly limited, but is preferably from 0.01 to 10.0 parts by weight, more preferably from 0.05 to 5.0 parts by weight, and even more preferably from 0.1 to 3.0 parts by weight (for example, from 0.3 to 3.0 parts by weight), relative to the total amount of the polyorganosilsesquioxane according to an embodiment of the present invention and other active energy ray-curable compounds described below (100 parts by weight; total amount of active energy ray-curable compounds). Setting the content of the photocuring catalyst to 0.01 parts by weight or greater allows the curing reaction to efficiently and sufficiently proceed, and tends to further improve the weather resistance, scratch resistance, and flexibility of the cured product (coating film). On the other hand, setting the content of the photocuring catalyst to 5.0 parts by weight or less tends to further improve the storage properties of the curable composition (hard coat agent), suppress coloration of the cured product (coating film), and improve its weather resistance.

The curable composition (hard coat agent) according to an embodiment of the present invention may further include an active energy ray-curable compound (which may be referred to as an "other active energy ray-curable compound") other than the polyorganosilsesquioxane according to an embodiment of the present invention. Examples of the other active energy ray-curable compound include a photocationically curable compound (sometimes referred to as an "other photocationically curable compound") other than the polyorganosilsesquioxane according to an embodiment of the present invention and/or a photoradically curable compound (sometimes referred to as an "other photoradically curable compound") other than the polyorganosilsesquioxane according to an embodiment of the present invention.

The other photocationically curable compound is not particularly limited, and a well-known or commonly used photocationically curable compound can be used. Examples thereof include an epoxy compound, an oxetane compound, and a vinyl ether compound, other than the polyorganosilsesquioxane according to an embodiment of the present invention. Here, in the curable composition (hard coat agent) according to an embodiment of the present invention, one type of the other photocationically curable compound may be used alone, or two or more types thereof may be used in combination.

For the epoxy compound described above, a well-known or commonly used compound having one or more epoxy groups (oxirane rings) per molecule can be used. The epoxy compound is not particularly limited, and the examples thereof include alicyclic epoxy compounds (alicyclic epoxy resins), aromatic epoxy compounds (aromatic epoxy resins), and aliphatic epoxy compounds (aliphatic epoxy resins).

For the alicyclic epoxy compound, examples include well-known or commonly used compounds that have one or more alicyclic rings and one or more epoxy groups in the molecule. Such an alicyclic epoxy compound is not particularly limited, and the examples include, for example, (1) a compound including an epoxy group (referred to as an "alicyclic epoxy group") constituted of two adjacent carbon atoms and an oxygen atom that constitute an alicyclic ring in the molecule; (2) a compound in which an epoxy group is directly bonded to an alicyclic ring via a single bond; and (3) a compound including an alicyclic ring and a glycidyl ether group in the molecule (a glycidyl ether type epoxy compound).

Examples of the compound (1) having an alicyclic epoxy group in the molecule include a compound represented by Formula (i) below.

[Chem. 28]

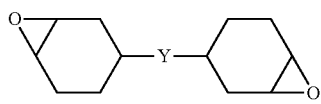

(i)

In Formula (i) above, Y represents a single bond or a linking group (a divalent group having one or more atoms). Examples of the linking group include a divalent hydrocarbon group, an epoxidized alkenylene group in which some or all of carbon-carbon double bonds are epoxidized, a carbonyl group, an ether bond, an ester bond, a carbonate group, an amide group, and a linked group in which a plurality of the above groups are linked.

Examples of the divalent hydrocarbon group include linear or branched alkylene groups having from 1 to 18 carbons and divalent alicyclic hydrocarbon groups. Examples of the linear or branched alkylene group having from 1 to 18 carbons include a methylene group, a methyl methylene group, a dimethyl methylene group, an ethylene group, a propylene group, and a trimethylene group. Examples of the divalent alicyclic hydrocarbon group include a divalent cycloalkylene group (including a cycloalkylidene group), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the alkenylene group in the alkenylene group in which some or all of the carbon-carbon double bonds are epoxidized (which may be referred to as an "epoxidized alkenylene group") include linear or branched alkenylene groups having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, the epoxidized alkenylene group is preferably an epoxidized alkenylene group in which all of the carbon-carbon double bond(s) is/are epoxidized and more preferably an epoxidized alkenylene group having from 2 to 4 carbon atoms in which all of the carbon-carbon double bond(s) is/are epoxidized.

Representative examples of the alicyclic epoxy compound represented by Formula (i) above include (3,4,3',4'-diepoxy)bicyclohexyl and compounds represented by Formulae (i-1) to (i-10) below. In Formulae (i-5) and (i-7) below, l and m each represent an integer from 1 to 30. $R^1$ in Formula (i-5) below is an alkylene group having from 1 to 8 carbons, and, among them, a linear or branched alkylene group having from 1 to 3 carbons, such as a methylene group, an ethylene group, a propylene group, or an isopropylene group, is preferred. In Formulae (i-9) and (i-10) below, n1 to n6 each represent an integer from 1 to 30. In addition, examples of the alicyclic epoxy compound represented by Formula (i) above include 2,2-bis(3,4-epoxycyclohexyl)propane, 1,2-bis(3,4-epoxycyclohexyl)ethane, 2,3-bis(3,4-epoxycyclohexyl)oxirane, and bis(3,4-epoxycyclohexylmethyl)ether.

[Chem. 29]

-continued (i-10)

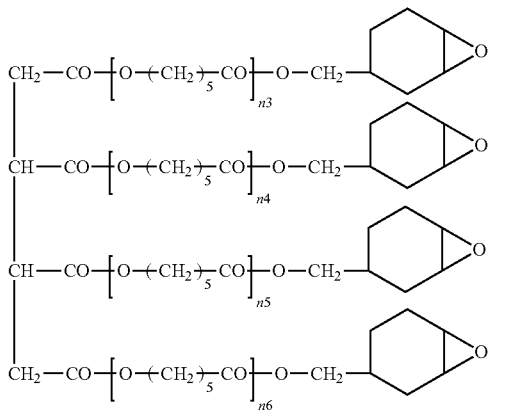

Examples of the compound (2) described above in which an epoxy group is directly bonded to an alicyclic ring via a single bond include a compound represented by Formula (ii) below.

[Chem. 31]

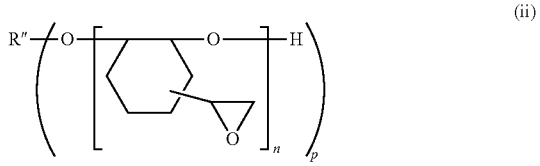

In Formula (ii), R" is a group (p-valent organic group) resulting from elimination of p hydroxyl groups (—OH) from a structural formula of a p-valent alcohol, wherein p and n each represent a natural number. Examples of the p-hydric alcohol [$R''(OH)_p$] include polyhydric alcohols (such as alcohols having from 1 to 15 carbons), such as 2,2-bis(hydroxymethyl)-1-butanol. Here, p is preferably from 1 to 6, and n is preferably from 1 to 30. When p is 2 or greater, n in each group in parentheses (in the outer parentheses) may be the same or different. Examples of the compound represented by Formula (ii) above specifically include 1,2-epoxy-4-(2-oxiranyl)cyclohexane adduct of 2,2-bis(hydroxymethyl)-1-butanol [for example, such as the trade name "EHPE3150" (available from Daicel Corporation)].

Examples of the compound (3) described above including an alicyclic ring and a glycidyl ether group in the molecule include glycidyl ethers of alicyclic alcohols (in particular, alicyclic polyhydric alcohols). More particularly, examples thereof include a compound obtained by hydrogenating a bisphenol A type epoxy compound (a hydrogenated bisphenol A type epoxy compound), such as 2,2-bis[4-(2,3-epoxypropoxy)cyclohexyl]propane and 2,2-bis[3,5-dimethyl-4-(2,3-epoxypropoxy)cyclohexyl]propane; a compound obtained by hydrogenating a bisphenol F type epoxy compound (a hydrogenated bisphenol F type epoxy compound), such as bis[o,o-(2,3-epoxypropoxy)cyclohexyl]methane, bis [o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy)cyclohexyl]methane; a hydrogenated bisphenol type epoxy compound; a hydrogenated phenol novolac type epoxy compound; a hydrogenated cresol novolac type epoxy compound; a hydrogenated cresol novolac type epoxy compound of bisphenol A; a hydrogenated naphthalene type epoxy compound; a hydrogenated epoxy compound of an epoxy compound obtained from trisphenolmethane; and a hydrogenated epoxy compound of an aromatic epoxy compound described below.

Examples of the aromatic epoxy compound include an epibis type glycidyl ether type epoxy resin obtained by a condensation reaction of bisphenols (for example, such as bisphenol A, bisphenol F, bisphenol S, and fluorenebisphenol) and an epihalohydrin; a high molecular weight epibis type glycidyl ether type epoxy resin obtained by further subjecting the above epibis type glycidyl ether type epoxy resin to an addition reaction with the bisphenol described above; a novolac alkyl type glycidyl ether type epoxy resin obtained by subjecting a phenol (for example, such as phenol, cresol, xylenol, resorcin, catechol, bisphenol A, bisphenol F, and bisphenol S) and an aldehyde (for example, such as formaldehyde, acetaldehyde, benzaldehyde, hydroxybenzaldehyde, and salicylaldehyde) to a condensation reaction to obtain a polyhydric alcohol, and then further subjecting the polyhydric alcohol to condensation reaction with epihalohydrin; and an epoxy compound in which two phenol skeletons are bonded at the 9-position of the fluorene ring, and glycidyl groups are each bonded directly or via an alkyleneoxy group to an oxygen atom resulting from eliminating a hydrogen atom from a hydroxyl group of these phenol skeletons.

Examples of the aliphatic epoxy compound include glycidyl ethers of a q-valent alcohol, the alcohol including no cyclic structure (q is a natural number); glycidyl esters of monovalent or polyvalent carboxylic acids (for example, such as acetic acid, propionic acid, butyric acid, stearic acid, adipic acid, sebacic acid, maleic acid, and itaconic acid); epoxidized materials of fats and oils including a double bond, such as epoxidized linseed oil, epoxidized soybean oil, and epoxidized castor oil; and epoxidized materials of polyolefins (including polyalkadienes), such as epoxidized polybutadiene. Here, examples of the q-valent alcohol including no cyclic structure include monohydric alcohols, such as methanol, ethanol, 1-propyl alcohol, isopropyl alcohol, and 1-butanol; dihydric alcohols, such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycol, and polypropylene glycol; and trihydric or higher polyhydric alcohols, such as glycerin, diglycerin, erythritol, trimethylolethane, trimethylolpropane, pentaerythritol, dipentaerythritol, and sorbitol. In addition, the q-hydric alcohol may be a polyether polyol, a polyester polyol, a polycarbonate polyol, a polyolefin polyol, or the like.

The oxetane compound is not particularly limited, and examples include well-known or commonly used compounds having one or more oxetane rings per molecule. Examples thereof include 3,3-bis(vinyloxymethyl)oxetane, 3-ethyl-3-(hydroxymethyl)oxetane, 3-ethyl-3-(2-ethylhexyloxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl(3-oxetanyl)]methyl}ether, 4,4'-bis[(3-ethyl-3-oxetanyl)methoxymethyl]bicyclohexyl, 1,4-bis[(3-ethyl-3-oxetanyl)methoxymethyl] cyclohexane, 1,4-bis {[(3-ethyl-3-oxetanyl)methoxy]methyl}benzene, 3-ethyl-3-{[(3-ethyloxetan-3-yl)methoxy]methyl}oxetane, xylylenebisoxetane, 3-ethyl-3-{[3-(triethoxysilyl)propoxy] methyl}oxetane, oxetanylsilsesquioxane, and phenol novolac oxetane.

The vinyl ether compound is not particularly limited, and a well-known or commonly used compound including one or more vinyl ether groups in the molecule can be used. Examples thereof include 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, 1,4-cyclohexanedimethanol monovinyl ether, 1,4-cyclohexanedimethanol divinyl ether, 1,3-cyclohexanedimethanol monovinyl ether, 1,3-cyclohexanedimethanol divinyl ether, 1,2-cyclohexanedimethanol monovinyl ether, 1,2-cyclohexanedimethanol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, pentaethylene glycol monovinyl ether, pentaethylene glycol divinyl ether, oligoethylene glycol monovinyl ether, oligoethylene glycol divinyl ether, polyethylene glycol monovinyl ether, polyethylene glycol divinyl ether, dipropylene glycol monovinyl ether, dipropylene glycol divinyl ether, tripropylene glycol monovinyl ether, tripropylene glycol divinyl ether, tetrapropylene glycol monovinyl ether, tetrapropylene glycol divinyl ether, pentapropylene glycol monovinyl ether, pentapropylene glycol divinyl ether, oligopropyleneglycol monovinyl ether, oligopropyleneglycol divinyl ether, polypropylene glycol monovinyl ether, polypropylene glycol divinyl ether, isosorbide divinyl ether, oxanorbornene divinyl ether, phenyl vinyl ether, n-butyl vinyl ether, isobutyl vinyl ether, octyl vinyl ether, cyclohexyl vinyl ether, hydroquinone divinyl ether, 1,4-butanediol divinyl ether, cyclohexanedimethanol divinyl ether, trimethylolpropane divinyl ether, trimethylolpropane trivinyl ether, bisphenol A divinyl ether, bisphenol F divinyl ether, hydroxyoxanorbornane methanol divinyl ether, 1,4-cyclohexanediol divinyl ether, pentaerythritol trivinyl ether, pentaerythritol tetravinyl ether, dipentaerythritol pentavinyl ether, and dipentaerythritol hexavinyl ether.

In the curable composition (hard coat agent) according to an embodiment of the present invention, a vinyl ether compound is preferably used as another photocationically curable compound in combination with the polyorganosilsesquioxane according to an embodiment of the present invention. Through this, the weather resistance and scratch resistance of the cured product (coating film) tend to further increase. In particular, when the curable composition (hard coat agent) according to an embodiment of the present invention is cured by radiation with active energy rays (in particular ultraviolet rays), a cured product (coating film) with a very high scratch resistance can be advantageously formed with good productivity even when the radiation dose of the active energy rays is reduced. As a result, the production line speed of the coated metal substrate according to an embodiment of the present invention can be further increased, and the productivity thereof is further improved.

Furthermore, when a vinyl ether compound having one or more hydroxyl groups per molecule is used in particular as another photocationically curable compound, a cured product (coating film) further excelling in scratch resistance and flexibility can be advantageously obtained. As a result, a coated metal substrate covered with a cured product (coating film) that exhibits even higher quality and higher weather resistance is obtained. The number of hydroxyl groups per molecule of the vinyl ether compound having one or more hydroxyl groups per molecule is not particularly limited, but is preferably from 1 to 4, and is more preferably 1 or 2. More specifically, examples of vinyl ether compounds having one or more hydroxyl group per molecule include 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,8-octanediol divinyl ether, 1,4-cyclohexane dimethanol monovinyl ether, 1,3-cyclohexane dimethanol monovinyl ether, 1,2-cyclohexane dimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ether, polyethylene glycol monovinyl ether, tripropylene glycol monovinyl ether, tetrapropylene glycol monovinyl ether, pentapropylene glycol monovinyl ether, oligopropylene glycol monovinyl ether, polypropylene glycol monovinyl ether, pentaerythritol trivinyl ether, and dipentaerythritol pentavinyl ether.

The other photoradically curable compound is not particularly limited, and a well-known or commonly used photoradically curable compound can be used. Examples thereof include compounds having, per molecule, one or more photoradically polymerizable groups such as a (meth)acrylic group, a (meth)acryloxy group, a (meth)acrylamino group, a vinylether group, a vinylaryl group, or a vinyloxy carbonyl group, the compounds being compounds other than the polyorganosilsesquioxane according to an embodiment of the present invention. Here, in the curable composition (hard coat agent) according to an embodiment of the present invention, one type of the other photoradically curable compound may be used alone, or two or more types thereof may be used in combination.

Examples of compounds having one or more (meth) acrylic groups per molecule include 1-buten-3-one, 1-penten-3-one, 1-hexen-3-one, 4-phenyl-1-buten-3-one, 5-phenyl-1-penten-3-one, and derivatives thereof.

Compounds having one or more (meth)acryloxy groups per molecule include monomers or oligomers having one or more (meth)acryloxy groups per molecule.

Examples of compounds having one or more (meth) acryloxy group per molecule include methyl (meth)acrylate, ethyl (meth)acrylate, n-butyl (meth)acrylate, isobutyl (meth) acrylate, t-butyl (meth)acrylate, n-hexyl (meth)acrylate, 2-ethylhexyl (meth)acrylate, isodecyl (meth)acrylate, n-lauryl (meth)acrylate, n-stearyl (meth)acrylate, n-butoxyethyl (meth)acrylate, butoxy diethylene glycol (meth)acrylate, methoxy triethylene glycol (meth)acrylate, methoxy polyethylene glycol (meth)acrylate, cyclohexyl (meth)acrylate, tetrahydrofurfuryl (meth)acrylate, benzyl (meth)acrylate, phenoxyethyl (meth)acrylate, isobornyl (meth)acrylate, 2-hydroxyethyl (meth)acrylate, 2-hydroxypropyl (meth)acrylate, 2-hydroxybutyl (meth)acrylate, dimethylaminoethyl (meth)acrylate, diethylaminoethyl (meth)acrylate, acrylic acid, methacrylic acid, 2-(meth)acryloxyethyl succinate, 2-(meth)acryloxyethyl hexahydrophthalic acid, 2-(meth)acryloxyethyl-2-hydroxypropyl phthalate, glycidyl (meth)acrylate, 2-(meth)acryloxyethyl acid phosphate, ethylene glycol di(meth)acrylate, diethylene glycol di(meth)acrylate, triethylene glycol di(meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth)acrylate, decane di(meth)acrylate, glycerin di(meth)acrylate, 2-hydroxy-3-(meth)acryloyloxypropyl (meth)acrylate, dimethylol tricyclodecane di(meth)acrylate, trifluoroethyl (meth)acrylate, perfluorooctyl ethyl (meth)acrylate, isoamyl (meth)acrylate, isomyristyl (meth)acrylate, γ-(meth)acryloxypropyl trimethoxysilane, 2-(meth)acryloxyethyl isocyanate, 1,1-bis(acryloxy)ethyl isocyanate, 2-(2-(meth)acryloxy ethyloxy)ethyl isocyanate, 3-(meth)acryloxypropyl triethoxysilane, and derivatives thereof.

Examples of the oligomers having one or more (meth)acryloxy groups per molecule include urethane (meth)acrylate oligomers, epoxy (meth)acrylate oligomers, polyether (meth)acrylate oligomers, and polyester (meth)acrylate oligomers.

Examples of urethane (meth)acrylate oligomers include polycarbonate-based urethane (meth)acrylate, polyester-based urethane (meth)acrylate, polyether-based urethane (meth)acrylate, and caprolactone-based urethane (meth)acrylate.

The urethane (meth)acrylate oligomer can be obtained through a reaction between a (meth)acrylate monomer having a hydroxyl group, and an isocyanate compound obtained by reacting a polyol with diisocyanate.

Examples of the polyol include polycarbonate diols, polyester polyols, polyether polyols, and polycaprolactone polyols.

The epoxy (meth)acrylate oligomer is obtained by, for example, an esterification reaction between acrylic acid and an oxirane ring of a low molecular weight bisphenol type epoxy resin or a novolac epoxy resin.

The polyether (meth)acrylate oligomer is obtained by obtaining a polyether oligomer having hydroxyl groups at both ends through a dehydration condensation reaction of a polyol, followed by subjecting the hydroxyl groups at both ends to esterification with acrylic acid.

The polyester (meth)acrylate oligomer is obtained, for example, by obtaining a polyester oligomer having hydroxyl groups at both ends through condensation of a polycarboxylic acid and a polyol, followed by subjecting the hydroxyl groups at both ends to esterification with acrylic acid.

The weight average molecular weight of the oligomer having one or more (meth)acryloxy groups per molecule is preferably 100000 or less and particularly preferably from 500 to 50000.

Examples of compounds having one or more (meth)acrylamino group per molecule include 4-(meth)acrylmorpholine, N,N-dimethyl (meth)acrylamide, N,N-diethyl (meth)acrylamide, N-methyl (meth)acrylamide, N-ethyl (meth)acrylamide, N-propyl (meth)acrylamide, N-isopropyl (meth)acrylamide, N-butyl (meth)acrylamide, N-n-butoxymethyl (meth)acrylamide, N-hexyl (meth)acrylamide, N-octyl (meth)acrylamide, and derivatives thereof.

Examples of compounds having one or more vinyl ether groups per molecule include 3,3-bis(vinyloxymethyl)oxetane, 2-hydroxyethyl vinyl ether, 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,4-cyclohexane dimethanol monovinyl ether, 1,3-cyclohexane dimethanol monovinyl ether, 1,2-cyclohexane dimethanol monovinyl ether, p-xylene glycol monovinyl ether, m-xylene glycol monovinyl ether, o-xylene glycol monovinyl ether, diethylene glycol monovinyl ether, triethylene glycol monovinyl ether, tetraethylene glycol monovinyl ether, pentaethylene glycol monovinyl ether, oligoethylene glycol monovinyl ether, polyethylene glycol monovinyl ether, dipropylene glycol monovinyl ether, tripropylene glycol monovinyl ether, tetrapropylene glycol monovinyl ether, pentapropylene glycol monovinyl ether, oligopropylene glycol monovinyl ether, polypropylene glycol monovinyl ether, and derivatives thereof.

Examples of compounds having one or more vinyl aryl groups per molecule include styrene, divinylbenzene, methoxystyrene, ethoxystyrene, hydroxystyrene, vinyl naphthalene, vinyl anthracene, 4-vinylphenyl acetate, (4-vinylphenyl)dihydroxyborane, N-(4-vinylphenyl)maleimide, and derivatives thereof.

Examples of compounds having one or more vinyloxycarbonyl groups per molecule include isopropenyl formate, isopropenyl acetate, isopropenyl propionate, isopropenyl butyrate, isopropenyl isobutyrate, isopropenyl caproate, isopropenyl valerate, isopropenyl isovalerate, isopropenyl lactate, vinyl acetate, vinyl propionate, vinyl butyrate, vinyl caproate, vinyl caprylate, vinyl laurate, vinyl myristate, vinyl palmitate, vinyl stearate, vinyl cyclohexane carboxylate, vinyl pivalate, vinyl octylate, vinyl monochloroacetate, divinyl adipate, vinyl acrylate, vinyl methacrylate, vinyl crotonate, vinyl sorbate, vinyl benzoate, vinyl cinnamate, and derivatives thereof.

From the perspectives of weather resistance, scratch resistance, and flexibility of the cured product (coating film), and adhesion to the metal substrate, the other active energy ray-curable compound is preferably a photoradically curable compound, and more preferably a compound having one or more (preferably two or more) (meth)acryloxy groups per molecule, and is even more preferably a monomer having one or more (preferably two or more) (meth)acryloxy groups per molecule.

Here, in the curable composition (hard coat agent) according to an embodiment of the present invention, one type of the other active energy ray-curable compound may be used alone, or two or more types thereof may be used in combination.

If the curable composition (hard coat agent) according to an embodiment of the present invention contains another active energy ray-curable compound, the content (blended amount) thereof is not particularly limited, but is preferably from 5 to 50 wt. %, more preferably from 10 to 40 wt. %, and even more preferably from 15 to 30 wt. %, relative to a total amount (100 wt. %; a total amount of the active energy ray-curable compounds) of the polyorganosilsesquioxane according to an embodiment of the present invention and the other active energy ray-curable compound. Setting the content of the other active energy ray-curable compound to 50 wt. % or less tends to further improve the weather resistance, scratch resistance, and flexibility of the cured product (coating film). On the other hand, when the content of the other active energy ray-curable compound is set to 5 wt. % or greater, it may be possible to impart a desired performance (for example, viscosity adjustments and fast curing property with respect to the curable composition (hard coat agent)) to the curable composition (hard coat agent) or cured product (coating film).

If the curable composition (hard coat agent) according to an embodiment of the present invention contains a vinyl ether compound (in particular, a vinyl ether compound having one or more hydroxyl groups per molecule), the content (blended amount) of the vinyl ether compound is not particularly limited, but is preferably from 0.01 to 10 wt. %, more preferably from 0.05 to 9 wt. %, and even more preferably from 1 to 8 wt. %, relative to the total amount (100 wt. %; the total amount of active energy ray-curable compounds) of the polyorganosilsesquioxane according to an embodiment of the present invention and the other active energy ray-curable compound. When the content of the vinyl ether compound is controlled to the aforementioned range, the surface hardness of the cured product (coating film) is further increased, and a cured product (coating film) with a very high surface hardness tends to be obtained even when the radiation dose of the active energy rays (for example, ultraviolet rays) is reduced. In particular, when the content of the vinyl ether compound having one or more hydroxyl groups per molecule is controlled to the aforementioned range, the surface hardness of the cured product (coating film) tends to become particularly high.

The curable composition (hard coat agent) according to an embodiment of the present invention may further contain an ultraviolet absorber. Including an ultraviolet absorber in the curable composition (hard coat agent) according to an embodiment of the present invention tends to further improve the weather resistance of the cured product (coating film).

The ultraviolet absorber is not particularly limited, and a known or commonly used ultraviolet absorber can be used, and examples thereof include triazine-based ultraviolet absorbers, benzotriazole-based ultraviolet absorbers, benzophenone-based ultraviolet absorbers, oxybenzophenone-based ultraviolet absorber, salicylate-based ultraviolet absorbers, and cyanoacrylate-based ultraviolet absorbers. Among these, from the perspective of weather resistance of the cured product (coating film), a triazine-based ultraviolet absorber or a benzotriazole-based ultraviolet absorber is preferable, a benzotriazole-based ultraviolet absorber is more preferable, and the ultraviolet absorber is even more preferably at least one type selected from the group consisting of triazine-based ultraviolet absorbers having no more than two hydroxyl groups per molecule, and benzotriazole-based ultraviolet absorbers having one benzotriazole skeleton per molecule.

Specific examples of triazine-based ultraviolet absorbers having no more than two hydroxyl groups per molecule that can be used include 2,4-bis-[{4-(4-ethylhexyloxy)-4-hydroxy}-phenyl]-6-(4-methoxyphenyl)-1,3,5-triazine (trade name "Tinosorb S", available from BASF); 2,4-bis [2-hydroxy-4-butoxyphenyl)-6-(2,4-dibutoxyphenyl)-1,3,5-triazine (trade name "TINUVIN 460", available from BASF); a reaction product (trade name "TINUVIN 400", available from BASF) between 2-(4,6-bis (2,4-dimethylphenyl)-1,3, 5-triazin-2-yl)-5-hydroxyphenyl and a [($C_{10}$-$C_{16}$ (mainly $C_{12}$-$C_{13}$) alkyloxy)methyl] oxirane; a reaction product (trade name "TINUVIN 405", available from BASF) between 2-[4,6-bis (2,4-dimethylphenyl)-1,3,5-triazin-2-yl]-5-[3-(dodecyloxy)-2-hydroxypropoxy]phenol), 2-(2,4-dihydroxyphenyl)-4,6-bis-(2,4-dimethylphenyl)-1,3,5-triazine and (2-ethylhexyl)-glycidate; 2-(4,6-diphenyl-1,3,5-triazin-2-yl)-5-[(hexyl)oxy]-phenol (trade name "TINUVIN 1577", available from BASF); 2-(4,6-diphenyl-1,3,5-triazin-2-yl)-5-[2-(2-ethylhexanoyloxy)ethoxy]-phenol (trade name "ADK STAB LA46", available from ADEKA Corporation); and 2-(2-hydroxy-4-[1-octyloxycarbonylethoxy]phenyl)-4, 6-bis-(4-phenylphenyl)-1,3,5-triazine (trade name "TINUVIN 479", available from BASF).

Examples of benzotriazole-based ultraviolet absorbers that have one benzotriazole skeleton per molecule and can be used include 2-(2H-benzotriazol-2-yl)-6-(1-methyl-1-phenylethyl)-4-(1,1,3,3-tetramethylbutyl) phenol (trade name "TINUVIN 928", available from BASF); 2-(2-hydroxy-5-tert-butylphenyl)-2H-benzotriazole (trade name "Tinuvin PS, available from BASF); an ester compound (trade name "TINUVIN 384-2", available from BASF) of benzenepropanoic acid and 3-(2H-benzotriazol-2-yl)-5-(1,1-dimethylethyl)-4-hydroxy ($C_7$-9 side chain and a linear alkyl); 2-(2H-benzotriazol-2-yl)-4,6-bis (1-methyl-1-phenylethyl) phenol (trade name "TINUVIN 900", available from BASF); 2-(2H-benzotriazol-2-yl)-6-(1-methyl-1-phenylethyl)-4-(1,1,3,3-tetramethylbutyl) phenol (trade name "TINUVIN 928", available from BASF); a reaction product (trade name "TINUVIN1130" from BASF) of methyl-3-(3-(2H-benzotriazol-2-yl)-5-t-butyl-4-hydroxyphenyl) propionate/polyethylene glycol 300; 2-(2H-benzotriazol-2-yl)-p-cresol (trade name "Tinuvin P", available from BASF); 2-(2H-benzotriazole-2-yl)-4-6-bis(1-methyl-1-phenylethyl) phenol (trade name "TINUVIN 234", available from BASF); 2-[5-chloro(2H)-benzotriazol-2-yl]-4-methyl-6-(tert-butyl) phenol (trade name "TINUVIN 326", available from BASF); 2-(2H-benzotriazol-2-yl)-4,6-di-tert-pentylphenol (trade name "TINUVIN 328", available from BASF); 2-(2H-benzotriazole-2-yl)-4-(1,1,3,3-tetramethylbutyl) phenol (trade name "TINUVIN 329" available from BASF); a reaction product (trade name "TINUVIN 213", available from BASF) between methyl 3-(3-(2H-benzotriazol-2-yl)-5-tert-butyl-4-hydroxyphenyl) propionate and polyethylene glycol 300; 2-(2H-benzotriazol-2-yl)-6-dodecyl-4-methylphenol (trade name "TINUVIN 571" available from BASF); and 2-[2-hydroxy-3-(3,4,5,6-tetrahydrophthalimide methyl)-5-methylphenyl] benzotriazole (trade name "Sumisorb 250", available from Sumitomo Chemical Co., Ltd.).

Examples of the benzophenone-based ultraviolet absorber (benzophenone-based compound) and the oxybenzophenone-based ultraviolet absorber (oxybenzophenone-based compound) include 2,4-dihydroxybenzophenone, 2-hydroxy-4-methoxybenzophenone, 2-hydroxy-4-methoxybenzophenone-5-sulfonic acid (anhydrous and trihydrate), 2-hydroxy-4-octyloxybenzophenone, 4-dodecyloxy-2-hydroxybenzophenone, 4-benzyloxy-2-hydroxybenzophenone 2,2',4,4'-tetrahydroxybenzophenone, and 2,2'-dihydroxy-4,4-dimethoxybenzophenone.

Examples of the salicylate-based ultraviolet absorber (salicylate-based compound) include phenyl-2-acryloxybenzoate, phenyl-2-acryloxy-3-methylbenzoate, phenyl-2-acryloxy-4-methylbenzoate, phenyl-2-acryloxy-5-methylbenzoate, phenyl-2-acryloxy-3-methoxybenzoate, phenyl-2-hydroxybenzoate, phenyl-2-hydroxy-3-methylbenzoate, phenyl-2-hydroxy-4-methylbenzoate, phenyl-2-hydroxy-5-methylbenzoate, phenyl-2-hydroxy-3-methoxybenzoate, and 2,4-di-tert-butylphenyl-3,5-di-tert-butyl-4-hydroxybenzoate (trade name "TINUVIN 120", available from BASF).

Examples of the cyanoacrylate-based ultraviolet absorber (cyanoacrylate-based compound) include alkyl-2-cyanoacrylate, cycloalkyl-2-cyanoacrylate, alkoxyalkyl-2-cyanoacrylate, alkenyl-2-cyanoacrylate, and alkynyl-2-cyanoacrylate.

Note that, in the curable composition (hard coat agent) according to an embodiment of the present invention, one type of the ultraviolet absorber may be used alone, or two or more types may be used in combination.

When the curable composition (hard coat agent) according to an embodiment of the present invention contains an ultraviolet absorber, the content (blended amount) thereof is not particularly limited, but is preferably from 0.1 to 10 parts by weight, and more preferably from 0.5 to 5 parts by weight relative to the total amount (100 parts by weight) of the active energy ray-curable compounds contained in the curable composition according to an embodiment of the present invention. Setting the content of the ultraviolet absorber to within the range described above tends to further improve the weather resistance of the cured product (coating film).

A curable epoxy resin composition according to an embodiment of the present invention may further contain an antioxidant. Including an antioxidant in the curable composition (hard coat agent) according to an embodiment of the present invention tends to further improve the weather resistance of the cured product (coating film).

The antioxidant is not particularly limited, and a well-known or commonly used antioxidant can be used, and examples thereof include phenol-based antioxidants (phenol-based compounds), hindered amine-based antioxidants (hindered amine-based compounds), phosphorus-based antioxidants (phosphorus-based compounds), and sulfur-based antioxidants (sulfur-based compounds).

Examples of the phenol-based antioxidant include monophenols such as 2,6-di-t-butyl-p-cresol, butylated hydroxyanisole, 2,6-di-t-butyl-p-ethylphenol, and stearyl-β-(3,5-di-t-butyl-4-hydroxyphenye propionate; bis-phenols such as 2,2'-methylene-bis(4-methyl-6-t-butylphenol), 2,2'-methylene-bis(4-ethyl-6-t-butylphenol), 4,4'-thio-bis(3-methyl-6-t-butylphenol), 4,4'-butylidene bis(3-methyl-6-t-butylphenol), and 3,9-bis[1,1-dimethyl-2-{β-(3-t-butyl-4-hydroxy-5-methylphenyl)propionyloxy}ethyl] 2,4,8,10-tetraoxaspiro [5.5] undecane; and polymeric phenols such as 1,1,3-tris(2-methyl-4-hydroxy-5-t-butylphenyl) butane, 1,3,5-trimethyl-2,4,6-tris (3,5-di-t-butyl-4-hydroxybenzyl) benzene, tetrakis [methylene-3-(3',5'-di-t-butyl-4'-hydroxyphenyl) propionate] methane, bis [3,3'-bis-(4'-hydroxy-3'-t-butylphenyl)butyric acid] glycol ester, 1,3,5-tris (3',5'-di-t-butyl-4'-hydroxybenzyl)-s-triazine-2,4,6-(1H,3H,5H) trione, and tocophenol.

Examples of the hindered amine-based antioxidants include bis (1,2,2,6,6-pentamethyl-4-piperidyl)[[3,5-bis (1,1-dimethyl ethyl)-4-hydroxyphenyl]methyl]butyl malonate, bis (1,2,2,6,6-pentamethyl-4-piperidyl) sebacate, methyl-1,2,2,6,6-pentamethyl-4-piperidyl sebacate, and 4-benzoyloxy-2,2,6,6-tetramethylpiperidine.

Examples of the phosphorus-based antioxidant include phosphites such as triphenyl phosphite, diphenylisodecyl phosphite, phenyldiisodecyl phosphite, tris (nonylphenyl) phosphite, diisodecyl pentaerythritol phosphite, tris (2,4-di-t-butylphenyl) phosphite, cyclic neopentanetetraylbis (octadecyl) phosphite, cyclic neopentanetetraylbis (2,4-di-t-butylphenyl) phosphite, cyclic neopentanetetraylbis (2,4-di-t-butyl-4-methylphenyl) phosphite, and bis [2-t-butyl-6-methyl-4-{2-(octadecyloxycarbonyl)ethyl}phenyl] hydrogen phosphite; and oxaphosphaphenanthrene oxides such as 9,10-dihydro-9-oxa-10-phosphaphenanthrene-10-oxide, and 10-(3,5-di-t-butyl-4-hydroxybenzyl)-9,10-dihydro-9-oxa-10-phosphaphenanthrene-10-oxide.

Examples of the sulfur-based antioxidant include dodecanethiol, dilauryl-3,3'-thiodipropionate, dimyristyl-3,3'-thiodipropionate, and distearyl-3,3'-thiodipropionate.

Note that, in the curable composition (hard coat agent) according to an embodiment of the present invention, one type of the antioxidant may be used alone, or two or more types may be used in combination. Also, as the antioxidant, examples of commercially available phenol-based antioxidants include products of the trade names "Irganox 1010", "Irganox 1076", "Irganox 1098", "Irganox 1330", "Irganox 245", "Irganox 259", "Irganox 3114", and "Irganox 3790" (the above are available from BASF); and products of the trade names "ADK Stab AO-60", "ADK Stab AO-30", "ADK Stab AO-40", and "ADK Stab AO-80" (the above are available from ADEKA Corporation). Furthermore, examples of commercially available products of phosphorus-based antioxidants include products of the trade names "Irgafos 168," "Irgafos P-EPQ," and "Irgafos 12" (the above are available from BASF); products of the trade names "ADK Stab HP-10", "ADK Stab TPP", "ADK Stab C", "ADK Stab 517", "ADK Stab 3010," "ADK Stab PEP-24G", "ADK Stab PEP-4C," "ADK Stab PEP-36," "ADK Stab PEP-45," "ADK Stab 1178," "ADK Stab 135A", "ADK Stab 1178", "ADK Stab PEP-8", "ADK Stab 329K", "ADK Stab 260", "ADK Stab 522A", and "ADK Stab 1500" (the above are available from ADEKA Corporation); products of the trade names "GSY-P101", "Chelex-OL", and "Chelex-PC" (the above are available from Sakai Chemical Industry Co., Ltd.); products of the trade names "JP302", "JP304", "JPM313", "JP308", "JPP100", "JPS312", "JP318E", "JP333E", "JPH1200", and "HBP" (the above are available from Johoku Chemical Co., Ltd.); and product of the trade name "SANKO-HCA" (available from Sanko Co., Ltd.).

Of these, as the antioxidant, phenol-based antioxidants, phosphorus-based antioxidants, and sulfur-based antioxidants are preferable, and phenol-based antioxidants are particularly preferable.

When the curable composition (hard coat agent) according to an embodiment of the present invention contains an antioxidant, the content (blended amount) thereof is not particularly limited, but is preferably from 0.05 to 5 parts by weight, and more preferably from 0.1 to 3 parts by weight relative to the total amount (100 parts by weight) of the active energy ray-curable compounds contained in the curable composition according to an embodiment of the present invention. If the content of the antioxidant is less than 0.05 parts by weight, weather resistance of the cured product (coating film) may be insufficient. On the other hand, when the content of the antioxidant exceeds 5 parts by weight, the cured product (coating film) may become prone to coloration.

From the perspective of the weather resistance of the cured product (coating film), the curable composition (hard coat agent) according to an embodiment of the present invention preferably includes at least one type selected from the group consisting of the ultraviolet absorbers and the antioxidants described above, and preferably includes both an ultraviolet absorber and an antioxidant.

When the curable composition (hard coat agent) according to an embodiment of the present invention contains both an ultraviolet absorber and an antioxidant, the ratio (ultraviolet absorber/antioxidant) is not particularly limited, but from the perspective of the weather resistance of the cured product (coating film), the ratio thereof is preferably from 100/1 to 1/100, more preferably from 50/1 to 1/50, and even more preferably from 25/1 to 1/25.

When the curable composition (hard coat agent) according to an embodiment of the present invention contains both an ultraviolet absorber and an antioxidant, the content of the total thereof is not particularly limited, but from the perspective of the weather resistance of the cured product (coating film), the content thereof is preferably from 0.1 to 10 parts by weight, and more preferably from 0.5 to 5 parts by weight relative to the total amount (100 parts by weight) of the active energy ray-curable compounds contained in the curable composition according to an embodiment of the present invention.

(Compound Having One or More Thermally-Polymerizable Functional Groups and One or More Photopolymerizable Functional Groups Per Molecule)

The curable composition (hard coat agent) according to an embodiment of the present invention preferably includes a compound (hereinafter, also referred to as a "compound A") having one or more thermally-polymerizable functional groups and one or more photopolymerizable functional groups per molecule. When the curable composition (hard coat agent) according to an embodiment of the present invention includes the compound A together with the polyorganosilsesquioxane according to an embodiment of the present invention, the crosslinking density when the curable composition (hard coat agent) is formed into a cured product can be effectively increased, and a high level of surface hardness and excellent weather resistance are more easily imparted to the cured product (coating film).

The "thermally-polymerizable functional group" of the compound A is not particularly limited as long as it is a functional group that imparts polymerizability through heat to the compound A, and examples thereof include hydroxyl groups, epoxy groups, oxetanyl groups, and vinyl ether groups. However, from the perspective of surface hardness and weather resistance of the coating film according to an embodiment of the present invention, hydroxyl groups and epoxy groups are preferable. Note that when the compound A has two or more thermally-polymerizable functional groups, these thermally-polymerizable functional groups may be each be the same or different.

The "photopolymerizable functional group" of the compound A is not particularly limited as long as it is a functional group that imparts polymerizability through light (for example, ultraviolet light) to the compound A, and examples thereof include (meth)acryloyl groups and vinyl groups. However, from the perspectives of surface hardness and weather resistance of the coating film according to an embodiment of the present invention, a (meth)acryloyl group is preferable. Note that when the compound A has two or more photopolymerizable functional groups, these photopolymerizable functional groups may each be the same or different.

The number of the thermally-polymerizable functional groups per molecule of the compound A is not particularly limited, but for example, is preferably from 1 to 5, more preferably from 1 to 3, and even more preferably 1 or 2. In addition, the number of the photopolymerizable functional groups per molecule of the compound A is not particularly limited, but for example, is preferably from 1 to 5, more preferably from 1 to 3, and even more preferably 1 or 2.

The functional group equivalent of the thermally-polymerizable functional group of the compound A is not particularly limited, but is preferably from 50 to 500, more preferably from 80 to 480, and even more preferably from 120 to 450. If the above-mentioned functional group equivalent is less than 50, the weather resistance of the cured product (coating film) may be insufficient. On the other hand, when the functional group equivalent exceeds 500, the surface hardness of the cured product (coating film) may decrease. Note that the functional group equivalent of the thermally-polymerizable functional group of the compound A can be calculated from the following equation.

[Functional group equivalent of the thermally-polymerizable functional group]=[molecular weight of compound A]/[number of thermally-polymerizable functional groups contained in compound A]

The functional group equivalent of the photopolymerizable functional group of compound A is not particularly limited, but is preferably from 50 to 500, more preferably from 80 to 480, and even more preferably from 120 to 450. If the above-mentioned functional group equivalent is less than 50, the weather resistance of the cured product (coating film) may be insufficient. On the other hand, when the functional group equivalent exceeds 500, the surface hardness of the cured product (coating film) may decrease. Note that the functional group equivalent of the photopolymerizable functional group of compound A can be calculated from the following formula.

[Functional group equivalent of photopolymerizable functional group]=[molecular weight of compound A]/[number of photopolymerizable functional groups contained in compound A]

Specific examples of the compound A include compounds having an epoxy group and/or a hydroxyl group and a (meth)acryloyl group per molecule, such as 3,4-epoxycyclohexylmethyl (meth)acrylate, glycidyl (meth)acrylate, tripropylene glycol diglycidyl ether di(meth)acrylate (a compound obtained by reacting (meth)acrylic acid with both epoxy groups of tripropylene glycol diglycidyl ether), tripropylene glycol diglycidyl ether half (meth)acrylate (a compound obtained by reacting (meth)acrylic acid with one epoxy group of tripropylene glycol diglycidyl ether), bisphenol A epoxy (meth)acrylate (a compound obtained by reacting (meth)acrylic acid with both epoxy groups of bisphenol A diglycidyl ether), bisphenol A epoxy half (meth)acrylate (a compound obtained by reacting (meth)acrylic acid or a derivative thereof with one epoxy group of bisphenol A diglycidyl ether), bisphenol F epoxy di(meth)acrylate, bisphenol F epoxy half (meth)acrylate, bisphenol S epoxy di(meth)acrylate, bisphenol S epoxy half (meth)acrylate; compounds having an oxetanyl group and a (meth)acryloyl group per molecule, such as 3-oxetanyl methyl (meth)acrylate, 3-methyl-3-oxetanyl methyl(meth)acrylate, 3-ethyl-3-oxetanyl methyl (meth)acrylate, 3-butyl-3-oxetanyl methyl (meth)acrylate, 3-hexyl-3-oxetanyl methyl (meth)acrylate; and compounds having a vinyl ether group and a (meth)acryloyl group per molecule, such as 2-vinyloxy ethyl (meth)acrylate, 3-vinyloxy propyl (meth)acrylate, 1-methyl-vinyloxy ethyl (meth)acrylate, 2-vinyloxy propyl (meth)acrylate, 4-vinyloxy butyl (meth)acrylate, 1-methyl-3-vinyloxy propyl (meth)acrylate, 1-vinyloxy methylpropyl (meth)acrylate, 2-methyl-3-vinyloxy propyl (meth)acrylate, 1,1-dimethyl-2-vinyloxy ethyl (meth)acrylate, 3-vinyloxy butyl (meth)acrylate, 1-methyl-2-vinyloxy propyl (meth)acrylate, 2-vinyloxy butyl (meth)acrylate, 4-vinyloxy cyclohexyl (meth)acrylate, 6-vinyloxy hexyl (meth)acrylate, 4-vinyloxy methylcyclohexyl methyl (meth)acrylate, 3-vinyloxy methylcyclohexyl methyl (meth)acrylate, 2-vinyloxy cyclohexyl methyl (meth)acrylate, p-vinyloxy methylphenyl methyl (meth)acrylate, m-vinyloxy methylphenyl methyl (meth)acrylate, o-vinyloxy methylphenyl methyl (meth)acrylate, 2-(vinyloxyethoxy)ethyl (meth)acrylate, 2-(vinyloxyisopropoxy)ethyl (meth)acrylate, 2-(vinyloxyethoxy) propyl (meth)acrylate, 2-(vinyloxyethoxy)isopropyl (meth) acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, polyethylene glycol monovinyl ether (meth)acrylate, and polypropylene glycol monovinyl ether (meth)acrylate.

From the perspective of the weather resistance and surface hardness of the cured product (coating film), the compound A is preferably a compound having, per molecule, an epoxy group and/or hydroxyl group as a thermally-polymerizable functional group and a (meth)acryloyl group as a photopolymerizable functional group, and specifically, 3,4-epoxycyclohexylmethyl (meth)acrylate, glycidyl (meth) acrylate, tripropylene glycol diglycidyl ether half (meth) acrylate, bisphenol A epoxy half (meth)acrylate, bisphenol F epoxy half (meth)acrylate, and bisphenol S epoxy half (meth)acrylate are preferable.

Note that in the curable composition (hard coat agent) according to an embodiment of the present invention, one type of the compound A may be used alone, or two or more types may be used in combination. The compound A can be produced by a known method, and is obtained, for example, by a method of reacting some of the thermally-polymerizable functional groups of a compound having two or more thermally-polymerizable functional groups (for example, epoxy groups or hydroxyl groups) per molecule with a carboxylic acid (for example, acrylic acid or methacrylic acid) having a photopolymerizable functional group, or with a derivative thereof.

Furthermore, commercially available products such as products of the trade names "Light Ester G", "Epoxy Ester 200PA", and "Epoxy Ester 200PA-E5" (the above are available from Kyoeisha Chemical Co., Ltd.), and product of the trade name "NK OLIGO EA1010N" (available from Shin-Nakamura Chemical Co., Ltd.) may also be used as the compound A.

The content (blended amount) of the compound A in the curable composition (hard coat agent) according to an embodiment of the present invention is not particularly limited, but as a solid content, is preferably from 1 to 100 parts by weight, more preferably from 3 to 75 parts by weight, and even more preferably from 5 to 50 parts by weight, relative to the total amount of 100 parts by weight of the polyorganosilsesquioxane according to an embodiment of the present invention and the other active energy ray-curable compounds (the total amount of the active energy ray-curable compounds). Setting the content of the compound A to not less than 1 part by weight tends to further improve the weather resistance of the cured product (coating film). On the other hand, a tendency for being able to maintain the surface hardness of the cured product (coating film) occurs when the content of the compound A is set to not greater than 100 parts by weight.

(Fluorine-Containing Photopolymerizable Resin)

The curable composition (hard coat agent) according to an embodiment of the present invention preferably includes a fluorine-containing photopolymerizable resin. The fluorine-containing photopolymerizable resin is a resin (oligomer) having, per molecule, a fluorine-containing group such as a fluoroaliphatic hydrocarbon skeleton, and a photopolymerizable functional group. When the curable composition (hard coat agent) according to an embodiment of the present invention contains a fluorine-containing photopolymerizable resin along with the compound A and the polyorganosilsesquioxane according to an embodiment of the present invention, the crosslinking density of the coating film surface when the curable composition (hard coat agent) is formed into a cured product can be effectively increased, and properties of improving the appearance such as the smoothness of the surface of the cured product (coating film), and of improving the surface hardness, scratch resistance, weather resistance, and stain repellency are imparted. In particular, this effect is made more significant by blending the fluorine-containing photopolymerizable resin along with the compound A in the curable composition (hard coat agent) according to an embodiment of the present invention.

Examples of the photopolymerizable functional group contained in the fluorine-containing photopolymerizable resin include the same "photopolymerizable functional groups" of the compound A described above, and from the perspective of scratch resistance, weather resistance, and stain repellency of the coating film according to an embodiment of the present invention, the photopolymerizable functional group thereof is preferably a (meth)acryloyl group. Note that when the fluorine-containing photopolymerizable resin has two or more photopolymerizable functional groups, these photopolymerizable functional groups may each be the same or different.

The number of the photopolymerizable functional groups per molecule of the fluorine-containing photopolymerizable resin is not particularly limited, but for example, is preferably from 1 to 5, and more preferably from 1 to 3.

The "fluorine-containing group" contained in the fluorine-containing photopolymerizable resin is not particularly limited as long as it has a fluorine atom, and examples include those having a fluoroaliphatic hydrocarbon skeleton. Examples of the fluoroaliphatic hydrocarbon skeleton include fluoro $C_{1-10}$ alkanes such as fluoromethane, fluoroethane, fluoropropane, fluoroisopropane, fluorobutane, fluoroisobutane, fluoro t-butane, fluoropentane, and fluorohexane.

Any of these fluoroaliphatic hydrocarbon skeletons may be used so long as at least some of the hydrogen atoms therein are substituted by fluorine atoms, but from the perspective of being able to improve the scratch resistance, weather resistance, sliding properties, and stain repellency of the coating film, a perfluoroaliphatic hydrocarbon skeleton in which all of the hydrogen atoms have been substituted by the fluorine atoms is preferable.

Furthermore, the fluoroaliphatic hydrocarbon skeleton may form a polyfluoroalkylene ether skeleton of repeating units via an ether bond. The fluoroaliphatic hydrocarbon group as the repeating unit may be at least one group selected from the group consisting of fluoro $C_{1-4}$ alkylene groups such as fluoromethylene, fluoroethylene, fluoropropylene, and fluoroisopropylene. The number of repetitions of the polyfluoroalkylene ether units (degree of polymerization) is, for example, 10 to 3000, preferably 30 to 1000, more preferably 50 to 500.

The fluorine-containing photopolymerizable resin may have a silicone-containing group in addition to the "photopolymerizable functional group" and "fluorine-containing group" described above. When the fluorine-containing photopolymerizable resin further includes a silicone-containing group, affinity with the polyorganosilsesquioxane according to an embodiment of the present invention is improved, and the surface hardness, scratch resistance, weathering resistance, and stain repellency of the cured product (coating film) tend to be further improved. The silicone-containing group is a group having a polyorganosiloxane skeleton, and any polyorganosiloxane may be used so long as it is formed from an M unit, a D unit, a T unit, or a Q unit. However, typically, a polyorganosiloxane formed from a D unit is preferably used. Typical organic groups used in the polyorganosiloxane include a $C_{1-4}$ alkyl group and aryl group, and a methyl group and a phenyl group (in particular, a methyl group) are commonly used. The number of repetitions of the siloxane units (a degree of polymerization) is, for example, 2 to 3000, preferably 3 to 2000, more preferably 5 to 1000.

Commercially available products can be used as the fluorine-containing photopolymerizable resin described above, and examples thereof include products of the trade names "Megaface RS-56," "Megaface RS-75," "Megaface RS-72-K", "Megaface RS-76-E", "Megaface RS-76-NS", "Megaface RS-78", and "Megaface RS-90" (the above are available from DIC Corporation), and products of the trade names "Ftergent 601AD", "Ftergent 601ADH2", "Ftergent 602A", "Ftergent 650 AC", and "Ftergent 681" (the above are available from Neos Co., Ltd.).

One type of these fluorine-containing photopolymerizable resins may be used alone, or two or more types may be used in combination.

The content (blended amount) of the fluorine-containing photopolymerizable resin in the curable composition (hard coat agent) according to an embodiment of the present invention is not particularly limited, but for example, as a solid content, the fluorine-containing photopolymerizable resin content is from 0.01 to 15 parts by weight, preferably from 0.05 to 10 parts by weight, more preferably from 0.01 to 5 parts by weight, and even more preferably from 0.2 to 3 parts by weight relative to the total amount of 100 parts by weight of the polyorganosilsesquioxane according to an embodiment of the present invention and the other active energy ray-curable compounds (the total amount of the active energy ray-curable compounds). Setting the content of the fluorine-containing photopolymerizable resin to not less than 0.01 part by weight tends to further improve the scratch resistance, weather resistance, and stain repellency of the cured product (coating film).

[Solvent]

The curable composition (hard coat agent) according to an embodiment of the present invention may preferably further contain a solvent. The solvent is not particularly limited as long as the solvent is capable of dissolving the polyorganosilsesquioxane described above and any additives used as necessary, and does not inhibit polymerization.

The solvent is preferably one that can impart fluidity suitable for coating onto a metal substrate and that can be easily removed by heating at a temperature at which the progression of polymerization can be suppressed, and preferably, one or more types of solvents having a boiling point (at 1 ATM) of not higher than 170° C. are used (for example, aromatic solvents such as toluene, xylene, and mesitylene; esters such as butyl acetate; ketones such as methyl isobutyl ketone and cyclohexanone; and ethers such as propylene glycol monomethyl ether and propylene glycol monomethyl ether acetate).

The solvent is preferably used in a range such that the concentration of nonvolatile content included in the curable composition (hard coat agent) is, for example, approximately from 5 to 100 wt. %, preferably from 10 to 80 wt. %, and particularly preferably from 20 to 70 wt. %. However, the addition amount is not limited to the range described above, and an optimal addition amount should be selected to adjust to a viscosity at which an appropriate film thickness can be achieved. That is, when the usage amount of the solvent is in excess, the viscosity of the curable composition (hard coat agent) becomes low, and it tends to be difficult to form a coating film with an appropriate film thickness (for example, approximately 0.5 to 30 µm). On the other hand, if the usage amount of the solvent is too low, the viscosity of the curable composition (hard coat agent) becomes too high, and it tends to be difficult to uniformly apply the curable composition (hard coat agent) onto the metal substrate.

The curable composition (hard coat agent) according to an embodiment of the present invention may further include a commonly used additive as an additional optional component, such as an inorganic filler, such as precipitated silica, wet silica, fumed silica, calcined silica, titanium oxide, alumina, glass, quartz, aluminosilicic acid, iron oxide, zinc oxide, calcium carbonate, carbon black, silicon carbide, silicon nitride, and boron nitride; an inorganic filler obtained by treating the above filler with an organosilicon compound, such as an organohalosilane, organoalkoxysilane, and organosilazane; an organic resin fine powder, such as a silicone resin, an epoxy resin, and a fluororesin; a filler, such as a conductive metal powder of silver, copper, or the like, a curing auxiliary, a solvent (such as an organic solvent), a stabilizer (such as a light-resistant stabilizer, a heat stabilizer, and a heavy metal inactivator), a flame retardant (such as a phosphorus-based flame retardant, a halogen-based flame retardant, and an inorganic flame retardant), a flame retardant auxiliary, a reinforcing material (such as an additional filler), a nucleating agent, a coupling agent (such as a silane coupling agent), a lubricant, a wax, a plasticizer, a releasing agent, an impact modifier, a hue modifier, a transparentizing agent, a rheology modifier (such as a fluidity modifier), a processability modifier, a colorant (such as a dye and a pigment), an antistatic agent, a dispersant, a surface conditioner (an antifoaming agent, a leveling agent, a welling-up prevention agent), a surface modifier (such as a slipping agent), a matting agent, an antifoaming agent, a foam inhibitor, a deforming agent, an antibacterial agent, a preservative, a viscosity modifier, a thickening agent, a photosensitizer, and a foaming agent. One type alone or two or more types of these additives in combination can be used.

The curable composition (hard coat agent) according to an embodiment of the present invention can be prepared by, but not particularly limited to, agitating and mixing each component described above at room temperature or under heating as necessary. Here, the curable composition (hard coat agent) according to an embodiment of the present invention can be used as a one-part composition, which contains each component mixed beforehand and is used as is, or alternatively, can be used as a multi-part (for example, two-part) composition of which two or more components are separately stored and then mixed at a predetermined ratio before use.

The form of the curable composition (hard coat agent) according to an embodiment of the present invention is not particularly limited, but is preferably a liquid at normal temperature (about 25° C.). More specifically, when the curable composition (hard coat agent) according to an embodiment of the present invention is a liquid diluted with a solvent to 20% [in particular, a curable composition (solution) having a ratio of methyl isobutyl ketone of 20 wt. %], the curable composition (hard coat agent) has a viscosity at 25° C. of preferably from 300 to 20000 mPa·s, more preferably from 500 to 10000 mPa·s, and even more preferably from 1000 to 8000 mPa·s. Setting the viscosity of the curable composition (hard coat agent) to 300 mPa·s or higher tends to further improve the weather resistance of the cured product (coating film). On the other hand, setting the viscosity of the curable composition (hard coat agent) to 20000 mPa·s or less facilitates the preparation and handling of the curable composition (hard coat agent), and there is a tendency for bubbles to be less likely to remain in the cured product (coating film). Here, the viscosity of the curable composition (hard coat agent) according to an embodiment of the present invention is measured using a viscometer (trade name "MCR301", available from Anton Paar GmbH) under conditions including a swing angle of 5%, a frequency from 0.1 to 100 (1/s), and a temperature of 25° C.

[Cured Product]

By irradiating with active energy rays and allowing the polymerization reaction of the active energy ray-curable compound (such as the polyorganosilsesquioxane according to an embodiment of the present invention) in the curable composition (hard coat agent) according to an embodiment of the present invention to proceed, the curable composition (hard coat agent) can be cured, and therefore a cured product (may be referred to as a "cured product according to an embodiment of the present invention") can be obtained with good production efficiency. As the active energy rays, for example, any of infrared rays, visible rays, ultraviolet rays, X-rays, an electron beam, an α-ray, a β-ray, and a γ-ray can be used. Among these, ultraviolet rays are preferred in terms of excellent handling.

The conditions when curing the curable composition (hard coat agent) according to an embodiment of the present invention by irradiating with the active energy rays (active energy ray radiation conditions) are not particularly limited and can be appropriately adjusted according to the type and energy of the active energy rays to be irradiated, and the shape and size of the cured product. However, when irradiating with ultraviolet rays, the curing conditions are for example, preferably set to approximately from 1 to 5000 mJ/cm². In addition, for example, a high-pressure mercury lamp, an ultra high-pressure mercury lamp, a xenon lamp, a carbon arc, a metal halide lamp, the sunlight, an LED lamp, and a laser can be used for radiation with active energy rays. After radiation with active energy rays, the curing reaction can be further allowed to proceed by further subjecting to a heat treatment (annealing and aging).

The specific curing conditions are not particularly limited, but for example, the curable composition (hard coat agent) according to an embodiment of the present invention is first subjected to a heat treatment (pre-baking) at a temperature of preferably at least 60° C., more preferably at least 120° C., and even more preferably at least 150° C., for preferably at least 1 minute, more preferably at least 2 minutes, and even more preferably at least 5 minutes, and then irradiated with ultraviolet rays (radiation conditions (radiation dose): preferably 400 mJ/cm² or higher; radiation intensity: 260 mW/cm² or greater), and finally, cured through a heat treatment (aging) at a temperature of preferably 120° C. or higher for preferably 0.5 hours or longer. However, the curing conditions are not limited to this range, and the pre-baking temperature and time, and the aging temperature and time can be selected, as appropriate, according to the solvent that is used, and the ultraviolet radiation conditions can be selected, as appropriate, according to the photocuring catalyst that is used.

As described above, through curing, the curable composition (hard coat agent) according to an embodiment of the present invention can form a cured product that has high weather resistance, scratch resistance, and surface hardness, and excels in flexibility. Therefore, the curable composition (hard coat agent) according to an embodiment of the present invention can be particularly preferably used as a "weather-resistant hard coat composition for a metal" (sometimes referred to as a "curable composition for forming a weather-resistant hard coat layer for a metal" or the like) for forming, on the surface of a metal substrate, a hard coat layer having excellent weather resistance. The curable composition according to an embodiment of the present invention is used as a weather-resistant hard coat composition for a metal, and a coated metal substrate having a coating film (hard coat layer) formed from the composition exhibits excellent flexibility while maintaining high levels of weather resistance, hardness, and scratch resistance, and can be manufactured by various machining processes such as punching or press molding.

The curable composition (hard coat agent) according to an embodiment of the present invention is subjected to a heat treatment (pre-baking) at, for example, a temperature 150° C. for 5 minutes, and then irradiated with ultraviolet rays (radiation conditions (radiation dosage): 400 mJ/cm², radiation intensity: 260 mW/cm²), and then heat treated (aged) at 120° C. for 0.5 hours to obtain a cured product, and the obtained cured product exhibits excellent surface hardness, scratch resistance, and weather resistance. Specifically, the cured product preferably has a pencil hardness of H or greater, more preferably 2H or greater, even more preferably 3H or greater, yet even more preferably 4H or greater, and still even more preferably 5H or greater. In addition, the glossiness retention rate (%) after the cured product has been subjected to 3000 hours of a high luminance xenon weatherometer test of the examples described below is preferably not less than 15%, more preferably not less than 40%, and even more preferably not less than 60%, and the color difference (ΔE) is preferably less than 20, more preferably less than 15, and even more preferably less than 10.

[Coated Metal Substrate]

The coated metal substrate according to an embodiment of the present invention is a coated metal substrate having a metal substrate and a coating film formed on at least one surface of the metal substrate, wherein the coating film is a layer of a cured product (cured product layer of the curable composition according to an embodiment of the present invention) formed from the curable composition (hard coat agent) according to an embodiment of the present invention. Note that in the present specification, the coating film formed by the curable composition (hard coat agent) according to an embodiment of the present invention may be referred to as a "coating film according to an embodiment of the present invention".

Here, with respect to the coated metal substrate according to an embodiment of the present invention, the coating film according to an embodiment of the present invention may be formed on only one surface (one side) of the metal substrate, or may be formed on both surfaces (both sides) thereof.

Furthermore, in the coated metal substrate according to an embodiment of the present invention, the coating film according to an embodiment of the present invention may be formed on only a portion of each surface of the metal substrate, or may be formed over the entirety of each surface thereof.

The metal substrate of the coated metal substrate according to an embodiment of the present invention is a substrate of the coated metal substrate according to an embodiment of the present invention, and refers to a portion configuring a part other than the coating film according to an embodiment of the present invention. The metal substrate is preferably a metal substrate that is used particularly outdoors such as in automobiles, electrical products, and construction members, and examples of various metal substrates that can be used include plated steel sheets such as hot-rolled steel sheets, cold-rolled steel sheets, galvanized steel sheets, electrogalvanized steel sheets, hot-dip galvanized steel sheets, alloyed hot-dip galvanized steel sheets, zinc alloy-plated steel sheets, aluminum-zinc alloy-plated steel sheets, aluminum-plated steel sheets, copper-plated steel sheets, zinc-nickel plated steel sheets, zinc-aluminum plated steel sheets, iron-zinc-plated steel sheets, and tin-plated steel sheets, and also stainless steel sheets, aluminum sheets, copper sheets, aluminum alloy sheets, and electromagnetic steel sheets.

The metal substrate according to an embodiment of the present invention may be coated with a base coat layer or a middle coat layer to improve adhesion with the coating film according to an embodiment of the present invention, and a known primer paint or the like can be used as a paint for forming the base coat layer or the middle coat layer. Examples thereof include an acrylic-based paint, a urethane-based paint, a polyester-based paint, and an epoxy-based paint.

A portion or all of the surface of the metal substrate may be subjected to a well-known or commonly used surface treatment such as a roughening treatment, adhesion-facilitating treatment, antistatic treatment, sand blast treatment (sand mat treatment), corona discharge treatment, plasma treatment, chemical etching treatment, water mat treatment, flame treatment, acid treatment, alkali treatment, oxidation treatment, ultraviolet radiation treatment, and silane coupling agent treatment.

The metal substrate may have a plate-like or spherical shape, or may be a film or sheet that is susceptible to deformation or the like due to the influence of external forces or temperatures, and may have fine recesses and protrusions on the surfaces thereof.

The thickness of the metal substrate is not particularly limited, and can be appropriately selected from a range from 0.01 to 10 mm.

The coating film according to an embodiment of the present invention is a layer that constitutes at least one surface layer of the coated metal substrate according to an embodiment of the present invention, and is a layer (cured product layer) formed from a cured product (resin cured product) obtained by curing the curable composition (hard coat agent) according to an embodiment of the present invention.

The thickness of the coating film according to an embodiment of the present invention (the thickness of each coating film for a case in which a coating film according to an embodiment of the present invention is provided on both sides of the metal substrate) is not particularly limited, but is preferably from 1 to 200 µm, and more preferably from 3 to 150 µm. In particular, even when the coating film according to an embodiment of the present invention is thin (for example, a thickness of 5 µm or less), the coating film can maintain a high level of hardness of the surface (for example, a pencil hardness of H or greater). In addition, even if the coating film is thick (for example, a thickness of 50 µm or greater), defects such as crack generation due to curing shrinkage or the like are unlikely to occur, and therefore the pencil hardness can be significantly increased (for example, the pencil hardness can be set to 2H or greater) by increasing the film thickness.

The coated metal substrate according to an embodiment of the present invention can be produced according to a well-known or commonly used method for producing a coated metal substrate, and the production method thereof is not particularly limited. For example, the coated metal substrate can be produced by coating the curable composition (hard coat agent) according to an embodiment of the present invention onto at least one surface of the metal substrate through a method such as a roll coater method, spray method, dipping method, brush application method, curtain coater method, flow coater method, or immersion method, and as necessary, removing the solvent through drying, and then curing the curable composition (hard coat agent). The conditions when curing the curable composition (hard coat agent) are not particularly limited, and for example, can be appropriately selected from the above-described conditions used when forming the cured product.

The coating film of the coated metal substrate according to an embodiment of the present invention may be a clear hard coat formed on an upper layer of a metal substrate having an existing coating film. In this case, a transparent curable composition (hard coating agent) according to an embodiment of the present invention is coated onto the surface of the existing coating film of the metal substrate using an above-mentioned method, and then cured. Through this, high levels of weather resistance, hardness, and scratch resistance can be imparted while fully utilizing the color of the existing coating film. The existing coating film may be a single layer or multiple layers (for example, a base coating, middle coating, and top coating).

In particular, of the coated metal substrate according to an embodiment of the present invention, the coating film according to an embodiment of the present invention is a coating film formed from the curable composition (hard coat agent) according to an embodiment of the present invention, which can form a cured product with excellent flexibility, and therefore the coated metal substrate according to an embodiment of the present invention can be produced by various machining processes such as punching or press molding, and the productivity thereof can be significantly increased.

The thickness of the coated metal substrate according to an embodiment of the present invention is not particularly limited, and can be appropriately selected from a range from 0.1 to 10 mm.

The pencil hardness of the coating film surface of the coated metal substrate according to an embodiment of the present invention is not particularly limited, but is preferably H or greater, more preferably 2H or greater, even more preferably 3H or greater, yet even more preferably 4H or greater, and still even more preferably 5H or greater. Here, the pencil hardness can be evaluated according to the method described in JIS K5600-5-4.

The coated metal substrate according to an embodiment of the present invention exhibits flexibility while maintaining high levels of weather resistance, hardness, and scratch resistance, and also excels in substrate trackability, and therefore a metal substrate on which a coating film is formed in advance using a curable composition (hard coat agent) according to an embodiment of the present invention is produced, and subsequently, the metal substrate can be molded by punching, press molding, or the like, and thus the coated metal substrate exhibits a high level of quality and excellent productivity. Therefore, the present invention can be preferably used for any application that requires such properties. The coated metal substrate according to an embodiment of the present invention can be suitably used for surface coverings of various types of metal substrates constituting components such as construction members including exterior walls and roofs, civil engineering members such as guardrails, soundproof walls, and drainage ditches, and components for applications such as consumer electronics, industrial machinery, and automobiles.

EXAMPLES

Hereinafter, the present invention will be described in more detail based on examples, but the present invention is not limited by these examples. Molecular weight of a product was measured with an Alliance HPLC system 2695 (available from Waters), a Refractive Index Detector 2414 (available from Waters), columns of Tskgel $GMH_{HR}$-M×2 (available from Tosoh Corporation), a guard column of Tskgel guard column $H_{HR}L$ (available from Tosoh Corporation), a column oven of COLUMN HEATER U-620 (available from Sugai), a solvent of THF, and a measurement condition of 40° C. In addition, the ratio of T2 forms and T3 forms [T3 form/T2 form] in a product was measured through $^{29}$Si-NMR spectrum measurements using a JEOL ECA500 (500 MHz).

Production Example 1: Production of an Epoxy Group-Containing Low-Molecular Weight Polyorganosilsesquioxane 277.2 mmol (68.30 g) of 2-(3,4-epoxycyclohexyl)ethyltrimethoxysilane, 3.0 mmol (0.56 g) of phenyltrimethoxysilane, and 275.4 g of acetone were charged under a nitrogen stream into a 1000 mL flask (reaction vessel) equipped with a thermometer, a stirrer, a reflux condenser, and a nitrogen inlet tube, and the temperature was raised to 50° C. To the mixture thus obtained, 7.74 g of a 5% potassium carbonate aqueous solution (2.8 mmol as potassium carbonate) was added over 5 minutes, after which 2800.0 mmol (50.40 g) of water was added over 20 minutes. Here, no significant temperature increase occurred during the additions. Subsequently, a polycondensation reaction was performed under a nitrogen stream for 5 hours while maintaining the temperature at 50° C.

Next, the reaction solution was cooled, and simultaneously, 137.70 g of methyl isobutyl ketone and 100.60 g of a 5% saline solution were added thereto. The solution was transferred to a 1 L separation funnel, and then 137.70 g of methyl isobutyl ketone was again added, and rinsing with water was performed. After the separation, the water layer was removed, and the lower layer liquid was rinsed with water until the lower layer liquid became neutral. The upper layer liquid was then fractioned, after which the solvent was distilled away from the upper layer liquid under conditions of 1 mmHg and 50° C., and 75.18 g of a colorless, transparent liquid product (an epoxy group-containing low-molecular weight polyorganosilsesquioxane) containing 25.04 wt. % of methyl isobutyl ketone was obtained.

When the product was analyzed, the number average molecular weight was found to be 2235, and the molecular weight dispersity was 1.54. A ratio of T2 forms and T3 forms [T3 forms/T2 forms] calculated from the $^{29}$Si-NMR spectrum of the product was 11.9.

Figure 2:
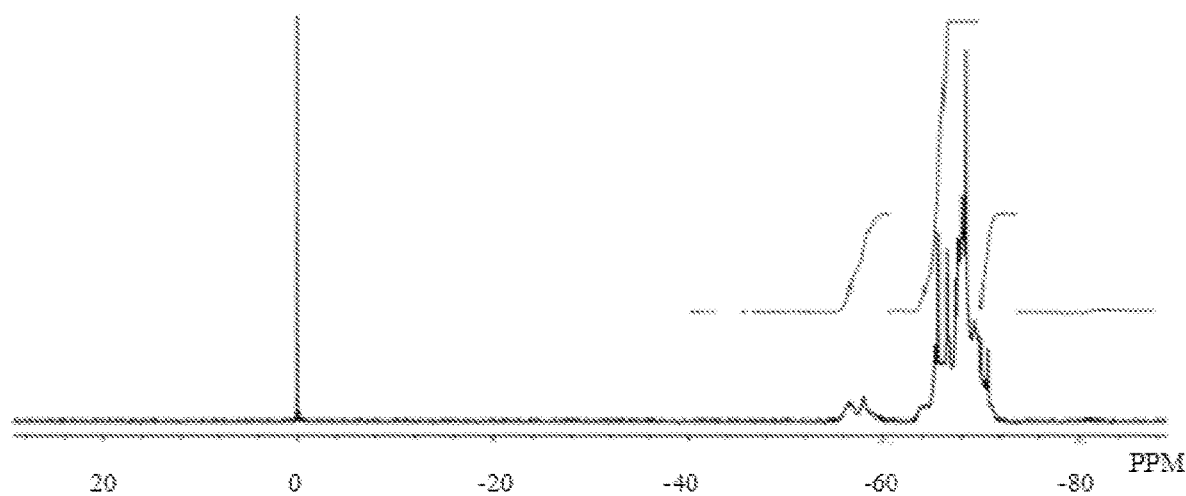
FIG. 2 is a $^{29}$Si-NMR spectrum of the epoxy group-containing low-molecular weight polyorganosilsesquioxane obtained in Production Example 1.

A $^1$H-NMR chart of the obtained epoxy group-containing low-molecular weight polyorganosilsesquioxane is illustrated in FIG. 1, and a $^{29}$Si-NMR chart thereof is illustrated in FIG. 2.

Production Example 2: Production of an Epoxy Group-Containing High-Molecular Weight Polyorganosilsesquioxane (1)

A mixture (75 g) containing the epoxy group-containing low-molecular weight polyorganosilsesquioxane obtained in Production Example 1 was charged under a nitrogen stream into a 1000 mL flask (reaction vessel) equipped with a thermometer, a stirrer, a reflux condenser, and a nitrogen inlet tube. Next, 100 ppm (5.6 mg) of potassium hydroxide and 2000 ppm (112 mg) of water were added to the net content (56.2 g) of the epoxy group-containing low-molecular weight polyorganosilsesquioxane, and the mixture was heated for 18 hours at 80° C., and then the mixture was sampled, and the molecular weight was measured. It was found that the number average molecular weight Mn increased to 6000. Next, the mixture was cooled to room temperature, 300 mL of methyl isobutyl ketone was added, and 300 mL of water was added, and when the alkali component was removed through repeated rinsing with water and the mixture was concentrated, 74.5 g of a colorless, transparent liquid product (epoxy-group containing high-molecular weight polyorganosilsesquioxane 1) containing 25 wt. % of methyl isobutyl ketone was obtained.

When the product was analyzed, the number average molecular weight was found to be 6176, and the molecular weight dispersity was 2.31. A ratio of T2 forms and T3 forms [T3 forms/T2 forms] calculated from the $^{29}$Si-NMR spectrum of the product was 50.2.

Figure 3:
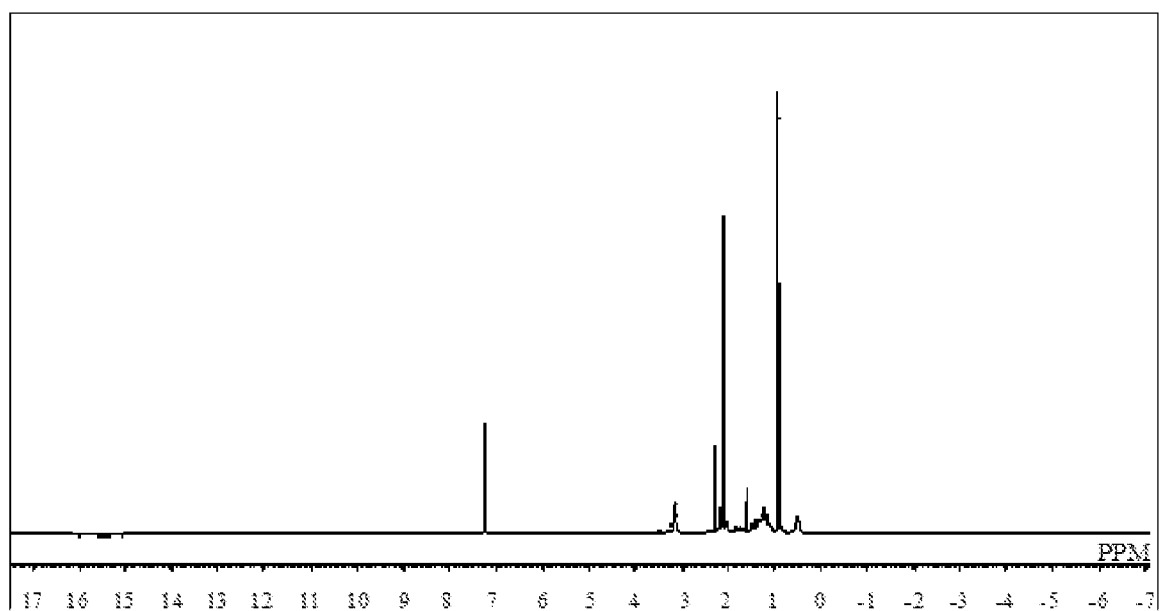
FIG. 3 is a $^1$H-NMR spectrum of an epoxy group-containing high-molecular weight polyorganosilsesquioxane obtained in Production Example 2.
Figure 4:
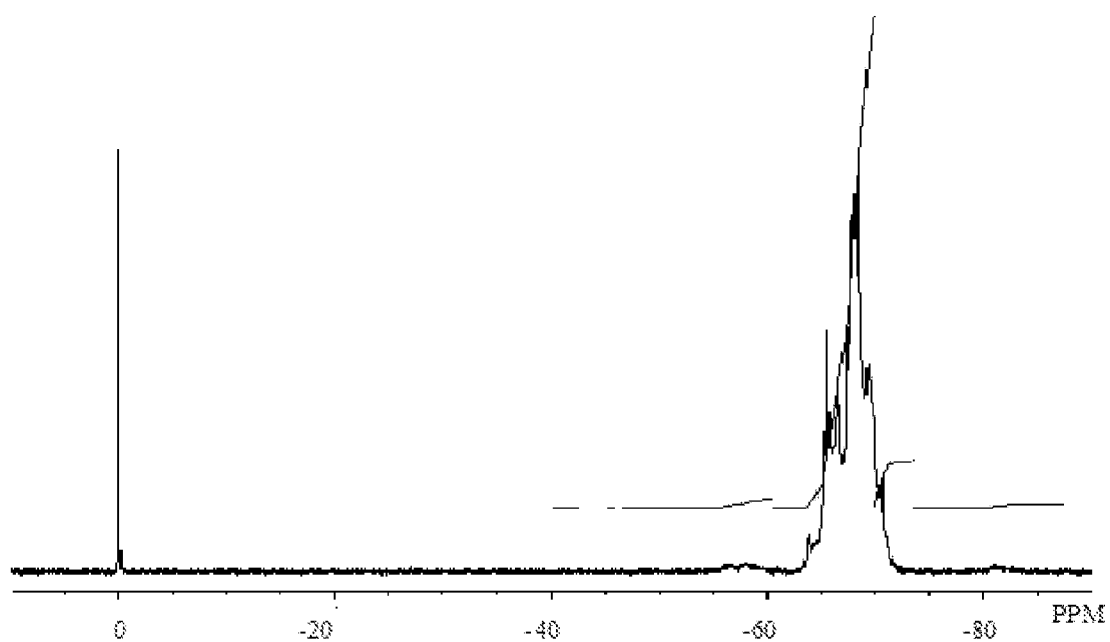
FIG. 4 is a $^{29}$Si-NMR spectrum of the epoxy group-containing high-molecular weight polyorganosilsesquioxane obtained in Production Example 2.

A $^1$H-NMR chart of the obtained epoxy group-containing high-molecular weight polyorganosilsesquioxane 1 is illustrated in FIG. 3, and a $^{29}$Si-NMR chart thereof is illustrated in FIG. 4.

Production Example 3: Production of an Epoxy Group-Containing High-Molecular Weight Polyorganosilsesquioxane (2)

A mixture (75 g) containing an epoxy group-containing low-molecular weight polyorganosilsesquioxane obtained by the same method as that of Production Example 1 was charged under a nitrogen stream into a 1000 mL flask (reaction vessel) equipped with a thermometer, a stirrer, a reflux condenser, and a nitrogen inlet tube. Next, 100 ppm (5.6 mg) of potassium carbonate and 2000 ppm (112 mg) of water were added to the net content (56.2 g) of the epoxy group-containing low-molecular weight polyorganosilsesquioxane, and the mixture was heated for 18 hours at 80° C., and then the mixture was sampled, and the molecular weight was measured. It was found that the number average molecular weight Mn increased to 4800. Next, the mixture was cooled to room temperature, 300 mL of methyl isobutyl ketone was added, and 300 mL of water was added, and when the alkali component was removed through repeated rinsing with water and the mixture was concentrated, 74.5 g of a colorless, transparent liquid product (epoxy-group containing high-molecular weight polyorganosilsesquioxane 2) containing 25 wt. % of methyl isobutyl ketone was obtained.

Production Example 4: Production of an Epoxy Group-Containing High-Molecular Weight Polyorganosilsesquioxane (3)

A mixture (75 g) containing an epoxy group-containing low-molecular weight polyorganosilsesquioxane obtained by the same method as that of Production Example 1 was charged under a nitrogen stream into a 1000 mL flask (reaction vessel) equipped with a thermometer, a stirrer, a reflux condenser, and a nitrogen inlet tube. Next, 100 ppm (5.6 mg) of potassium carbonate and 2000 ppm (112 mg) of water were added to the net content (56.2 g) of the epoxy group-containing low-molecular weight polyorganosilsesquioxane, and the mixture was heated for 3 hours at 80° C., and then the mixture was sampled, and the molecular weight was measured. It was found that the number average molecular weight Mn increased to 3500. Next, the mixture was cooled to room temperature, 300 mL of methyl isobutyl ketone was added, and 300 mL of water was added, and when the alkali component was removed through repeated rinsing with water and the mixture was concentrated, 74.5 g of a colorless, transparent liquid product (epoxy-group containing high-molecular weight polyorganosilsesquioxane 3) containing 25 wt. % of methyl isobutyl ketone was obtained.

When the product was analyzed, the number average molecular weight was found to be 3500, and the molecular weight dispersity was 2.14. A ratio of T2 forms and T3 forms [T3 forms/T2 forms] calculated from the $^{29}$Si-NMR spectrum of the product was 21.

Figure 5:
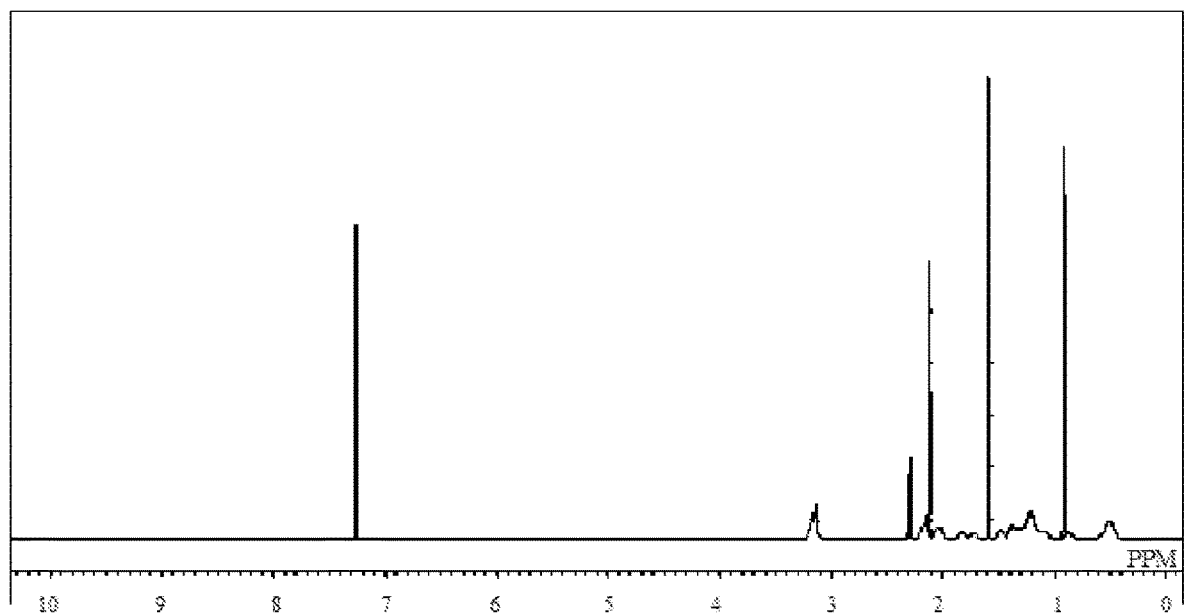
FIG. 5 is a $^1$H-NMR spectrum of an epoxy group-containing high-molecular weight polyorganosilsesquioxane obtained in Production Example 4.
Figure 6:
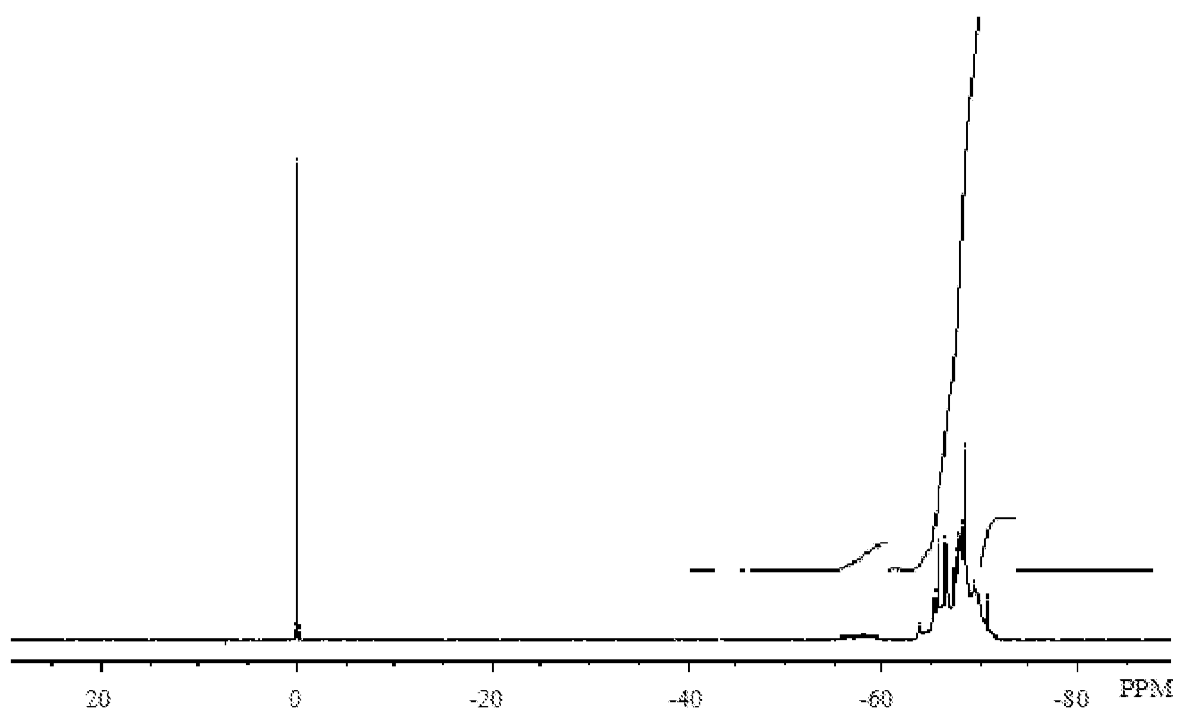
FIG. 6 is a $^{29}$Si-NMR spectrum of the epoxy group-containing high-molecular weight polyorganosilsesquioxane obtained in Production Example 4.

A $^1$H-NMR chart of the obtained epoxy group-containing high-molecular weight polyorganosilsesquioxane 3 is illustrated in FIG. 5, and a $^{29}$Si-NMR chart thereof is illustrated in FIG. 6.

Production Example 5: Production of an Acryl Group-Containing Low-Molecular Weight Polyorganosilsesquioxane 370 mmol (80 g) of 3-(acryloxy)propyltrimethoxysilane, and 320 g of acetone were charged under a nitrogen stream into a 1000 mL flask (reaction vessel) equipped with a thermometer, a stirrer, a reflux condenser, and a nitrogen inlet tube, and the temperature was raised to 50° C. To the mixture thus obtained, 10.144 g of a 5% potassium carbonate aqueous solution (3.67 mmol as potassium carbonate) was added over 5 minutes, after which 3670.0 mmol (66.08 g) of water was added over 20 minutes. Here, no significant temperature increase occurred during the additions. Subsequently, a polycondensation reaction was performed under a nitrogen stream for 2 hours while maintaining the temperature at 50° C.

Next, the reaction solution was cooled, and simultaneously, 160 g of methyl isobutyl ketone and 99.056 g of a 5% saline solution were added thereto. The solution was transferred to a 1 L separation funnel, and then 160 g of methyl isobutyl ketone was again added, and rinsing with water was performed. After the separation, the water layer was removed, and the lower layer liquid was rinsed with water until the lower layer liquid became neutral. The upper layer liquid was then fractioned, after which the solvent was distilled away from the upper layer liquid under conditions of 1 mmHg and 50° C., and 71 g of a colorless, transparent liquid product (an acryl group-containing low-molecular weight polyorganosilsesquioxane) containing 22.5 wt. % of methyl isobutyl ketone was obtained.

When the product was analyzed, the number average molecular weight was found to be 2051, and the molecular weight dispersity was 1.29. A ratio of T2 forms and T3 forms [T3 forms/T2 forms] calculated from the $^{29}$Si-NMR spectrum of the product was 13.4.

Figure 7:
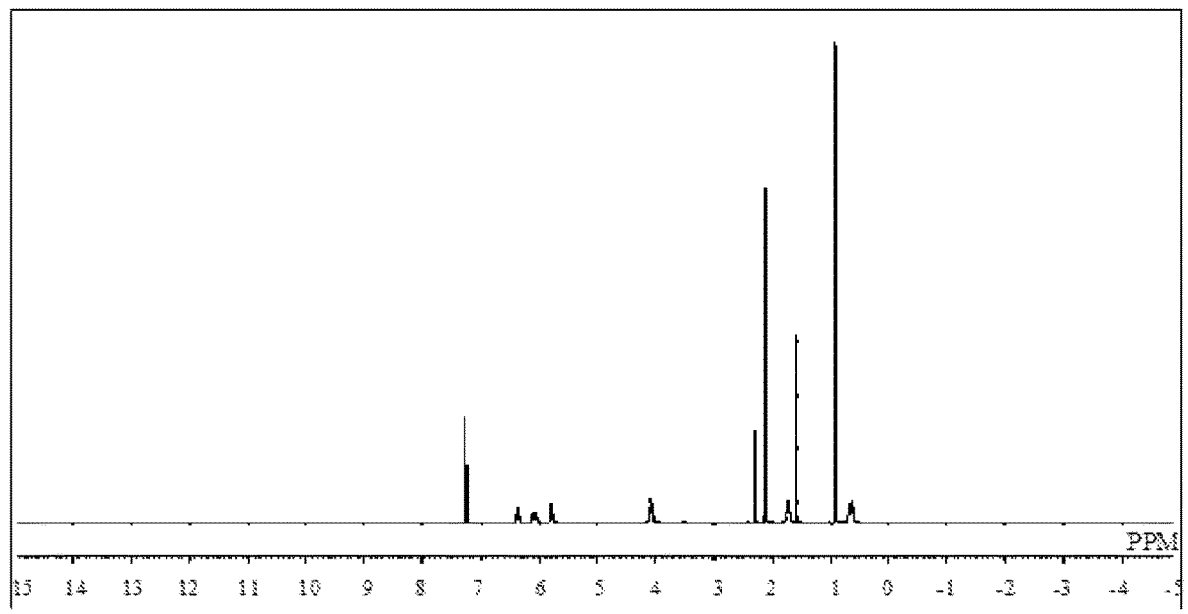
FIG. 7 is a $^{1}$H-NMR spectrum of an acryl group-containing low-molecular weight polyorganosilsesquioxane obtained in Production Example 5.
Figure 8:
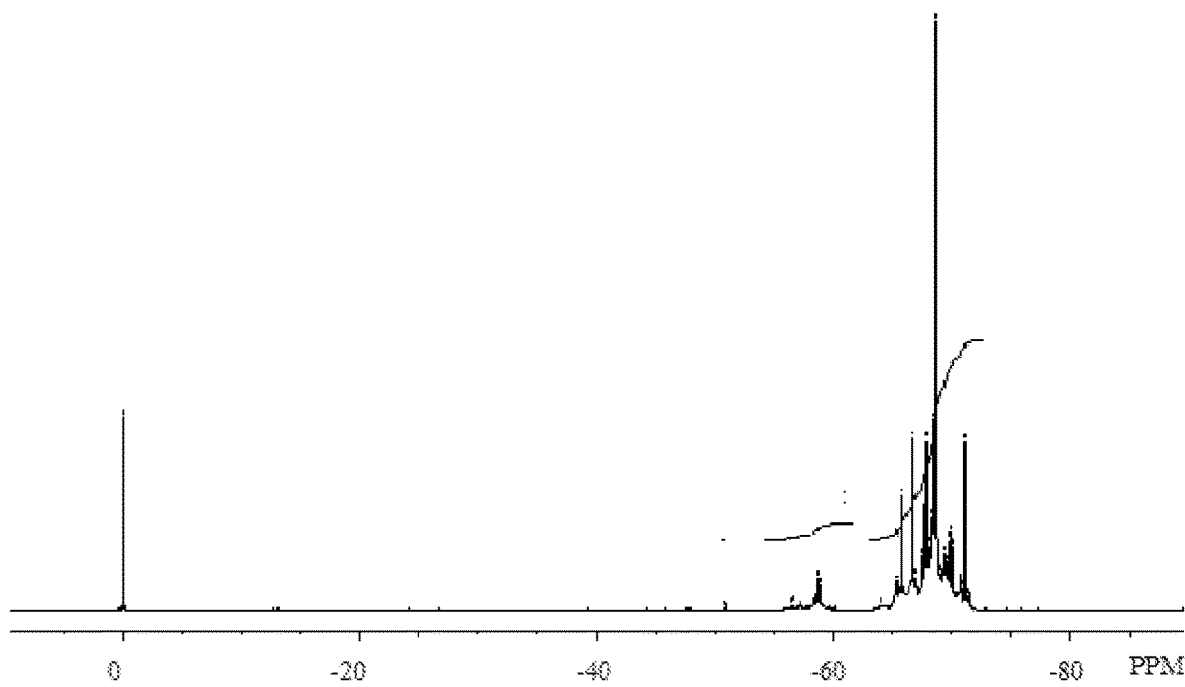
FIG. 8 is a $^{29}$Si-NMR spectrum of the acryl group-containing low-molecular weight polyorganosilsesquioxane obtained in Production Example 5.

A $^1$H-NMR chart of the obtained acryl group-containing low-molecular weight polyorganosilsesquioxane is illustrated in FIG. 7, and a $^{29}$Si-NMR chart thereof is illustrated in FIG. 8.

Production Example 6: Production of an Acryl Group-Containing High-Molecular Weight Polyorganosilsesquioxane (1)

A mixture (71 g) containing the acryl group-containing low-molecular weight polyorganosilsesquioxane obtained in Production Example 5 was charged under a nitrogen stream into a 1000 mL flask (reaction vessel) equipped with a thermometer, a stirring device, a reflux condenser, and a nitrogen inlet tube. Next, 10 ppm (0.55 mg) of potassium hydroxide and 2000 ppm (110 mg) of water were added to a net content (55.0 g) of the acryl group-containing low-molecular weight polyorganosilsesquioxane, and the mixture was heated for 30 hours at 40° C., and then sampled, and the molecular weight was measured. It was found that the number average molecular weight Mn had increased to 5693. Next, the mixture was cooled to room temperature, 300 mL of methyl isobutyl ketone was added, and 300 mL of water was added, and when the alkali component was removed through repeated rinsing with water, and the mixture was concentrated, 71 g of a colorless, transparent, liquid product (acrylic-group containing high-molecular weight polyorganosilsesquioxane) containing 25 wt. % of methyl isobutyl ketone was obtained.

When the product was analyzed, the number average molecular weight was found to be 5693, and the molecular weight dispersity was 2.58. A ratio of T2 forms and T3 forms [T3 forms/T2 forms] calculated from the $^{29}$Si-NMR spectrum of the product was 47.3.

Figure 9:
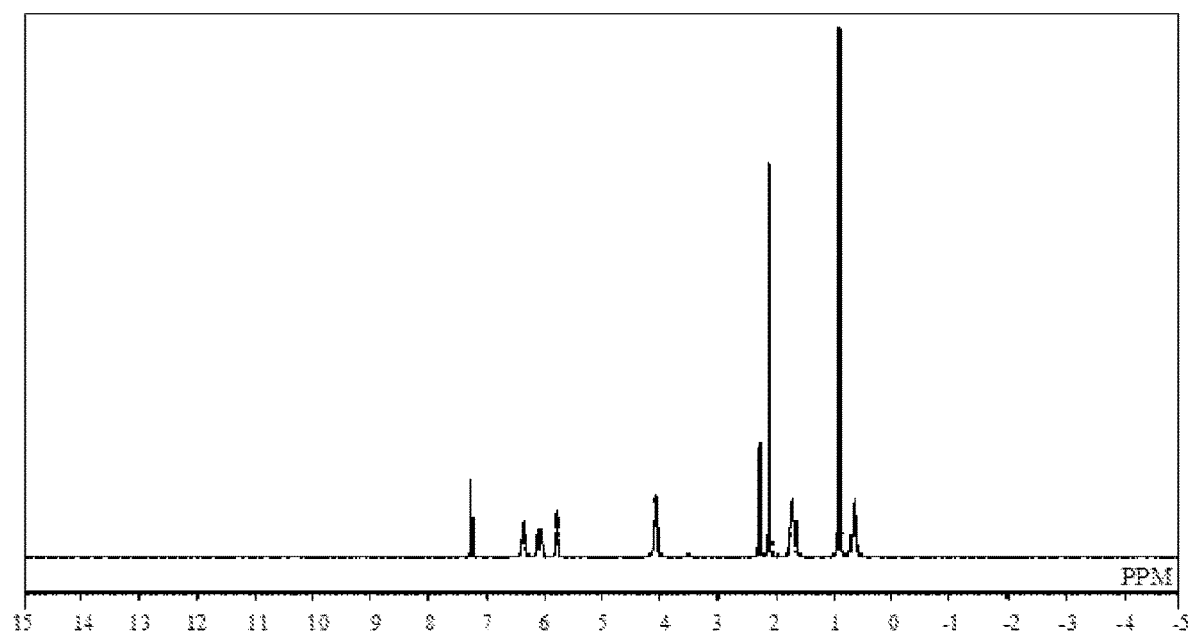
FIG. 9 is a $^{1}$H-NMR spectrum of an acryl group-containing high-molecular weight polyorganosilsesquioxane obtained in Production Example 6.
Figure 10:
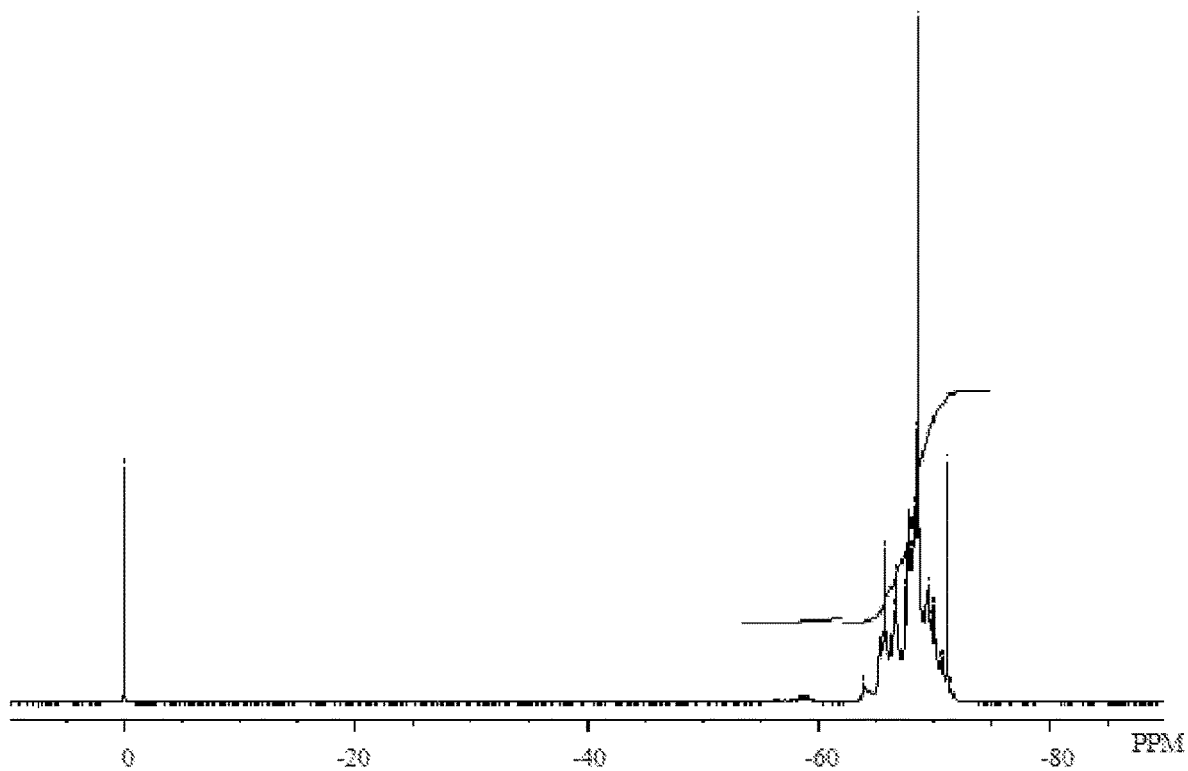
FIG. 10 is a $^{29}$Si-NMR spectrum of the acryl group-containing high-molecular weight polyorganosilsesquioxane obtained in Production Example 6.

A $^1$H-NMR chart of the obtained acryl group-containing high-molecular weight polyorganosilsesquioxane 1 is illustrated in FIG. 9, and a $^{29}$Si-NMR chart thereof is illustrated in FIG. 10.

Example 1: Production of a Hard Coat Agent

A mixed solution of 100 parts by weight of the epoxy group-containing low-molecular weight polyorganosilsesquioxane obtained in Production Example 1 and 1.5 parts by weight of a photocationic polymerization initiator (trade name "CPI-210S", available from San-Apro Ltd.) was prepared, and this mixed solution was used as a hard coat solution (curable composition).

Example 2: Production of a Hard Coat Agent

A mixed solution of 80 parts by weight of the acryl group-containing low-molecular weight polyorganosilsesquioxane obtained in Production Example 5, 20 parts by weight of dimethylol tricyclodecane di(meth)acrylate (trade name "IRR214K", available from Daicel Ornex Co., Ltd.), 3 parts by weight of an ultraviolet absorber (trade name "TINUVIN 1130", available from BASF), and 3 parts by weight of a photoradical polymerization initiator (trade name "Omnirad 184", available from IGM Resins B.V.) was prepared, and this mixed solution was used as a hard coat solution (curable composition).

Example 3: Production of a Hard Coat Agent

A mixed solution of 80 parts by weight of the epoxy group-containing low-molecular weight polyorganosilsesquioxane obtained in Production Example 1, 8 parts by weight of a compound A (a compound having one or more thermally-polymerizable functional groups and one or more photopolymerizable functional groups per molecule) (trade name: "Epoxy Ester 200PA-E5", available from Kyoeisha Chemical Co., Ltd.), 0.6 parts by weight of a fluorine-containing photopolymerizable resin (trade name "Megaface RS-76-E", available from DIC Corporation), 0.2 parts by weight of an antioxidant (trade name "Irganox 1330", available from BASF), 2 parts by weight of an ultraviolet absorber (trade name "TINUVIN 1130", available from BASF), 14 parts by weight of methyl ethyl ketone (available from Fujifilm Wako Pure Chemical Corporation), and 1.1 parts by weight of a photocationic polymerization initiator (trade name "CPI-210S", available from San-Apro Ltd.) was prepared, and this mixed solution was used as a hard coat solution (curable composition).

Comparative Example 1: Production of a Hard Coat Agent

A mixed solution of 80 parts by weight of an aliphatic urethane acrylate (trade name "KRM8667", available from Daicel Ornex Co., Ltd.), 20 parts by weight of dimethylol tricyclodecane di(meth)acrylate (trade name "IRR214K", available from Daicel Ornex Co., Ltd.), and 5 parts by weight of a photoradical polymerization initiator (trade name "Omnirad 1173", available from IGM Resins B.V.) was prepared, and this mixed solution was used as a hard coat solution (curable composition).

Examples 4 to 6 and Comparative Example 2: Production of a Coated Metal Substrate A wire bar was used to flow cast and apply the hard coat solutions obtained in Examples 1 to 3 and Comparative Example 1 onto a 0.4 mm-thick galvanized steel sheet coated in advance with an epoxy primer (primer "Fine Tough C JT-25", available from Nippon Fine Coatings Inc.), the hard coat solutions being applied at an amount to obtain a dry film thickness of 20 μm, after which the coated steel sheet was placed (pre-baked) in an oven at 150° C. for 5 minutes, and then irradiated with ultraviolet rays (radiation conditions (radiation dosage): 400 mJ/cm$^2$, radiation intensity: 260 W/cm$^2$). Finally, the coated steel sheet was heat-treated (aged) at 120° C. for 0.5 hours, and thereby a coated metal substrate having a coating film obtained by curing the applied film of the hard coat solution was produced.

The coated metal substrates obtained as described above were then subjected to various evaluations by the following methods.
(1) Weather Resistance Test (High Luminance Xenon Radiation Test)

The weather resistance (color difference, glossiness retention rate) of the coated metal substrates obtained in Example 4 to 6 and Comparative Example 2 was evaluated under the following conditions. The results are shown in Table 1.
High Luminance Xenon Weatherometer Test
　Test equipment: Xenon Weatherometer Ci4000 (available from ATLAS)
　Test temperature: 63° C.
　Test humidity: RH 50%
　Rain: 18 minutes of rain per 120 minutes
　Radiation illuminance: 100 W/m$^2$ (300 to 400 nm)
　Filter: inside/outside=borosilicate type S/borosilicate type S
　Radiation surface: coating film surface
　Radiation time: 3000 hours
Color Difference Test
　Test instrument: Color meter SE7700 (available from Nippon Denshoku Industries Co., Ltd.)
　Measurement Method: Transmission method
　Light Source: C
　Viewing angle: 2°
　Geometric conditions: (0°/0)
　Number of tests: n=1
　Measurement: The color difference (ΔE) was determined from the initial hue value and the hue of the sample after 3000 hours of radiation.
Glossiness Test
　Test equipment: Gloss Meter VG2000 (available from Nippon Denshoku Industries Co., Ltd.)
　Measurement angle: 20°
　Number of tests: n=1
　Measurement: The glossiness before radiation and the glossiness after radiation each time were measured, and the glossiness retention rate was calculated from the following equation.

Glossiness Retention Rate (%)=(Glossiness after radiation for 3000 hours)/(Glossiness before radiation)×100

TABLE 1

|  | Example 4 | Example 5 | Example 6 | Comparative Example 2 |
|---|---|---|---|---|
| Color Difference (ΔE) | 5 | 19 | 4.2 | 24 |
| Glossiness Retention Rate (%) | 45 | 17 | 87 | 10 |

(2) Surface Hardness (Pencil Hardness)

The pencil hardness of the coating film surface of the coated metal substrates obtained in Example 6 and Comparative Example 2 was evaluated in accordance with JIS K5600-5-4 (750 g load). The results are shown in Table 2.
(3) Scratch Resistance A piece of #0000 steel wool was moved back and forth 1000 times at a load of 500 g/cm$^2$ across the coating film surfaces of the coated metal substrates obtained in Example 6 and Comparative Example 2, the presence or lack of scratches and the quantity thereof on the coating film surface was confirmed, and the scratch resistance was evaluated according to the following criteria. The results are shown in Table 2.

Excellent (Scratch resistance is excellent): Number of scratches was 0.

Good (Scratch resistance is good): 1 to 10 scratches

Poor (Scratch resistance is poor): Number of scratches exceeded 10.
(4) Flexibility (Mandrel Test)

The bendability of the coating film surface of the coated metal substrates obtained in Example 6 and Comparative Example 2 was evaluated in accordance with JIS K5600-5-1 (bending resistance (cylindrical mandrel)). The mandrel used in the evaluation was 4 mm in diameter. The results are shown in Table 2.

Good: No cracking

Poor: Cracking

TABLE 2

| | Example 6 | Comparative Example 2 |
|---|---|---|
| Surface Hardness (Pencil Hardness) | 5H | 2B |
| Scratch Resistance | Excellent | Poor |
| Mandrel Test | Good | Poor |

Variations of embodiments of the present invention described above are additionally described below.

[1] A weather-resistant hard coat composition for a metal, containing a polyorganosilsesquioxane having a constituent unit represented by Formula (1) below.

[Chem. 32]

$$[R^1SiO_{3/2}] \quad (1)$$

[In Formula (1), $R^1$ represents a group containing an active energy ray-curable functional group.]

[2] The weather-resistant hard coat composition for a metal according to [1], wherein the active energy ray-curable functional group is at least one type of photocationically polymerizable functional group selected from the group consisting of an epoxy group, an oxetane group, a vinyl ether group, and a vinyl phenyl group.

[3] The weather-resistant hard coat composition for a metal according to [1], wherein the active energy ray-curable functional group is at least one type of photoradically polymerizable functional group selected from the group consisting of (meth)acryloxy groups, (meth)acrylamide groups, vinyl groups, and vinylthio groups.

[4] The weather-resistant hard coat composition for a metal according to [1], wherein the active energy ray-curable functional group is an epoxy group.

[5] The weather-resistant hard coat composition for a metal according to [4], wherein $R^1$ is a group represented by Formula (1a) above, a group represented by Formula (1b) above, a group represented by Formula (1c) above, or a group represented by the formula (1d) above (preferably a group represented by Formula (1a) above or a group represented by Formula (1c) above, and more preferably a group represented by Formula (1a) above).

[6] The weather-resistant hard coat composition for a metal according to [5], wherein $R^1$ is a group represented by Formula (1a), and $R^{1a}$ is an ethylene group (in particular, a 2-(3',4'-epoxycyclohexyl)ethyl group).

[7] The weather-resistant hard coat composition for a metal according to [1], wherein the active energy ray-curable functional group is a (meth)acryloxy group.

[8] The weather-resistant hard coat composition for a metal according to any one of [1] to [7], wherein the polyorganosilsesquioxane further includes a constituent unit represented by Formula (2).

[9] The weather-resistant hard coat composition for a metal according to [8], wherein $R^2$ of Formula (2) above represents a substituted or unsubstituted aryl group (preferably a phenyl group).

[10] The weather-resistant hard coat composition for a metal according to any one of [1] to [9], wherein the polyorganosilsesquioxane further includes a constituent unit represented by Formula (I), and a constituent unit represented by Formula (II), and a molar ratio of the constituent units represented by Formula (I) to the constituent units represented by Formula (II), that is [(constituent units represented by Formula (I))/(constituent units represented by Formula (II))] (hereinafter, may be referred to as [T3 form/T2 form]), is from 5 to 500.

[11] The weather-resistant hard coat composition for a metal according to [10], wherein a lower limit of the [T3 form/T2 form] ratio is 20 (preferably 21, more preferably 23, and even more preferably 25).

[12] The weather-resistant hard coat composition for a metal according to [11], wherein an upper limit of the [T3 form/T2 form] ratio is 500 (preferably 100, more preferably 50, and even more preferably 40).

[13] The weather-resistant hard coat composition for a metal according to [10], wherein the lower limit of the [T3 form/T2 form] ratio is 5 (preferably 6, and more preferably 7).

[14] The weather-resistant hard coat composition for a metal according to [13], wherein the upper limit of the [T3 form/T2 form] ratio is less than 20 (preferably 18, more preferably 16, and even more preferably 14).

[15] The weather-resistant hard coat composition for a metal according to any one of [1] to [14], wherein the polyorganosilsesquioxane further contains a constituent unit represented by Formula (4), and a ratio of the constituent unit represented by Formula (1) above and the constituent unit represented by Formula (4) above to the total amount (100 mol %) of the siloxane constituent units is from 55 to 100 mol % (preferably, from 65 to 100 mol %, and more preferably from 80 to 99 mol %).

[16] The weather-resistant hard coat composition for a metal according to any one of [8] to [15], wherein the polyorganosilsesquioxane further contains a constituent unit represented by Formula (5), and a ratio of the constituent unit represented by Formula (2) above and the constituent unit represented by Formula (5) above to the total amount (100 mol %) of siloxane constituent units is from 0 to 70 mol % (preferably from 0 to 60 mol %, more preferably from 0 to 40 mol %, and particularly preferably from 1 to 15 mol %).

[17] The weather-resistant hard coat composition for a metal according to [16], wherein a ratio (total amount) of the constituent unit represented by Formula (1) above, the constituent unit represented by Formula (2) above, the constituent unit represented by Formula (4) above, and the constituent unit represented by Formula (5) above to the total amount (100 mol %) of siloxane constituent units is from 60 to 100 mol % (preferably from 70 to 100 mol %, and more preferably from 80 to 100 mol %).

[18] The weather-resistant hard coat composition for a metal according to any one of [1] to [17], wherein a number average molecular weight of the polyorganosilsesquioxane is from 1000 to 50000.

[19] The weather-resistant hard coat composition for a metal according to [18], wherein a lower limit of the number average molecular weight is 2500 (preferably 2800, and more preferably 3000), and an upper limit is 50000 (preferably 10000, and more preferably 8000).

[19] The weather-resistant hard coat composition for a metal according to [18], wherein the lower limit of the number average molecular weight is 1000 (preferably 1100), and the upper limit is 3000 (preferably 2800, and more preferably 2600).

[20] The weather-resistant hard coat composition for a metal according to any one of [1] to [19], wherein a molecular weight dispersity (weight average molecular weight/number average molecular weight) of the polyorganosilsesquioxane is from 1.0 to 4.0.

[21] The weather-resistant hard coat composition for a metal according to [20], wherein a lower limit of the molecular weight dispersity is 1.0 (preferably 1.1, and more preferably 1.2).

[22] The weather-resistant hard coat composition for a metal according to [20] or [21], wherein an upper limit of the molecular weight dispersity is 4.0 (preferably 3.0, and more preferably 2.5).

[23] The weather-resistant hard coat composition for a metal according to [20] or [21], wherein the upper limit of the molecular weight dispersity is 3.0 (preferably 2.0, and more preferably 1.9).

[24] The weather-resistant hard coat composition for a metal according to any one of [1] to [23], wherein a content (blended amount) of the polyorganosilsesquioxane is, relative to a total amount (100 wt. %) of the composition excluding the solvent, 70 wt. % or greater and less than 100 wt. % (preferably from 80 to 99.8 wt. %, and more preferably from 90 to 99.5 wt. %).

[25] The weather-resistant hard coat composition for a metal according to any one of [1] to [24], further containing a photocuring catalyst.

[26] The weather-resistant hard coat composition for a metal according to [25], wherein the photocuring catalyst is a photocationic polymerization initiator.

[27] The weather-resistant hard coat composition for a metal according to [25], wherein the photocuring catalyst is a photoradical polymerization initiator.

[28] The weather-resistant hard coat composition for a metal according to any one of [25] to [27], wherein a content (blended amount) of the curing catalyst relative to a total amount of 100 parts by weight of an active energy ray-curable compound is from 0.01 to 10.0 parts by weight (preferably from 0.05 to 5.0 parts by weight, and more preferably from 0.1 to 3.0 parts by weight).

[29] The weather-resistant hard coat composition for a metal according to any one of [1] to [28], further containing a compound having one or more (preferably two or more) (meth)acryloxy groups per molecule.

[30] The weather-resistant hard coat composition for a metal according to any one of [1] to [29], further containing an ultraviolet absorber.

[31] The weather-resistant hard coat composition for a metal according to [30], wherein the ultraviolet absorber is a benzotriazole-based ultraviolet absorber (preferably a benzotriazole-based ultraviolet absorber having one benzotriazole skeleton per molecule).

[32] The weather-resistant hard coat composition for a metal according to [30] or [31], wherein the content (blended amount) of the ultraviolet absorber is from 0.1 to 10 parts by weight (preferably from 0.5 to 5 parts by weight) relative to a total amount of 100 parts by weight of the active energy ray-curable compounds.

[33] The weather-resistant hard coat composition for a metal according to any one of [1] to [32], further containing an antioxidant.

[34] The weather-resistant hard coat composition for a metal according to [33], wherein the antioxidant is a phenol-based antioxidant.

[35] The weather-resistant hard coat composition for a metal according to [33] or [34], wherein the content (blended amount) of the antioxidant is from 0.05 to 5 parts by weight (preferably from 0.1 to 3 parts by weight) relative to a total amount of 100 parts by weight of the active energy ray-curable compounds.

[36] The weather-resistant hard coat composition for a metal according to any one of [30] to [35], the composition containing both an ultraviolet absorber and an antioxidant.

[37] The weather-resistant hard coat composition for a metal according to [36], wherein a ratio of the ultraviolet absorber to the antioxidant (ultraviolet absorber/antioxidant) is from 100/1 to 1/100 (preferably from 50/1 to 1/50, and more preferably from 25/1 to 1/25).

[38] The weather-resistant hard coat composition for a metal according to [36] or [37], wherein a total content of the ultraviolet absorber and the antioxidant is from 0.1 to 10 parts by weight (preferably from 0.5 to 5 parts by weight) relative to the total amount (100 parts by weight) of the active energy ray-curable compounds.

[39] The weather-resistant hard coat composition for a metal according to any one of [1] to [38], further containing a compound (hereinafter, also referred to as the "compound A") having one or more thermally-polymerizable functional groups and one or more photopolymerizable functional groups per molecule.

[40] The weather-resistant hard coat composition for a metal according to [39], wherein the thermally-polymerizable functional group is at least one type selected from the group consisting of a hydroxyl group, an epoxy group, an oxetanyl group, and a vinyl ether group (preferably at least one type selected from the group consisting of a hydroxyl group and an epoxy group).

[41] The weather-resistant hard coat composition for a metal according to [39] or [40], wherein the photopolymerizable functional group is at least one type selected from the group consisting of a (meth)acryloyl group and a vinyl group (preferably a (meth)acryloyl group).

[42] The weather-resistant hard coat composition for a metal according to any one of [39] to [41], wherein the number of thermally-polymerizable functional groups per molecule of the compound A is from 1 to 5 (preferably from 1 to 3, and more preferably 1 or 2).

[43] The weather-resistant hard coat composition for a metal according to any one of [39] to [42], wherein the number of photopolymerizable functional groups per molecule of the compound A is from 1 to 5 (preferably from 1 to 3, and more preferably 1 or 2).

[44] The weather-resistant hard coat composition for a metal according to any one of [39] to [43], wherein the functional group equivalent of the thermally-polymerizable functional group of the compound A is from 50 to 500 (preferably from 80 to 480, and more preferably from 120 to 450).

[45] The weather-resistant hard coat composition for a metal according to any one of [39] to [44], wherein the functional group equivalent of the photopolymerizable functional group of the compound A is from 50 to 500 (preferably from 80 to 480, and more preferably from 120 to 450).

[46] The weather-resistant hard coat composition for a metal according to any one of [39] to [45], wherein the compound A is a compound having, per molecule, an epoxy group and/or a hydroxyl group, and a (meth)acryloyl group.

[47] The weather-resistant hard coat composition for a metal according to any one of [39] to [46], wherein a content (blended amount) of the compound A is from 1 to 100 parts by weight (preferably from 3 to 75 parts by weight, and more preferably from 5 to 50 parts by weight) relative to the total amount of 100 parts by weight of the active energy ray-curable compounds.

[48] The weather-resistant hard coat composition for a metal according to any one of [1] to [47], further including a fluorine-containing photopolymerizable resin (a resin having a fluorine-containing group and a photopolymerizable functional group in the molecule).

[49] The weather-resistant hard coat composition for a metal according to [48], wherein the photopolymerizable functional group of the fluorine-containing photopolymerizable resin is at least one type selected from the group consisting of a (meth)acryloyl group and a vinyl group (preferably a (meth)acryloyl group).

[50] The weather-resistant hard coat composition for a metal according to [48] or [49], wherein the number of photopolymerizable functional groups per molecule of the fluorine-containing photopolymerizable resin is from 1 to 5 (preferably 1 to 3).

[51] The weather-resistant hard coat composition for a metal according to any one of [48] to [50], wherein the fluorine-containing photopolymerizable resin further has a silicone-containing group.

[52] The weather-resistant hard coat composition for a metal according to any one of [48] to [51], wherein a content (blended amount) of the fluorine-containing photopolymerizable resin is from 0.01 to 15 parts by weight (preferably from 0.05 to 10 parts by weight, more preferably from 0.01 to 5 parts by weight, and even more preferably from 0.2 to 3 parts by weight) relative to a total amount of 100 parts by weight of the active energy ray-curable compounds.

[53] The weather-resistant hard coat composition for a metal according to any one of [1] to [52], wherein the composition is a clear hard coat paint.

[54] The weather-resistant hard coat composition for a metal according to any one of [1] to [52], wherein the metal is at least one type selected from the group consisting of a hot-rolled steel sheet, a cold-rolled steel sheet, a galvanized steel sheet, an electrogalvanized steel sheet, a hot-dip galvanized steel sheet, an alloyed hot-dip galvanized steel sheet, a zinc alloy-plated steel sheet, an aluminum-zinc alloy-plated steel sheet, an aluminum-plated steel sheet, a copper-plated steel sheet, a zinc-nickel plated steel sheet, a zinc-aluminum plated steel sheet, an iron-zinc plated steel sheet, a tin-plated steel sheet, a stainless steel sheet, an aluminum sheet, a copper sheet, an aluminum alloy sheet, and an electromagnetic steel sheet.

[55] A cured product of the weather-resistant hard coat composition for a metal described in any one of [1] to [54].

[56] A coated metal substrate containing a metal substrate and a coating film formed on at least one surface of the metal substrate, wherein the coating film is a layer of the cured product described in [55].

[57] The coated metal substrate according to [56], wherein a thickness of the coating film is from 1 to 200 μm (preferably from 3 to 150 μm).

[58] The coated metal substrate to [56] or [57], wherein the metal substrate is at least one type selected from the group consisting of a hot-rolled steel sheet, a cold-rolled steel sheet, a galvanized steel sheet, an electrogalvanized steel sheet, a hot-dip galvanized steel sheet, an alloyed hot-dip galvanized steel sheet, a zinc alloy-plated steel sheet, an aluminum-zinc alloy-plated steel sheet, an aluminum-plated steel sheet, a copper-plated steel sheet, a zinc-nickel plated steel sheet, a zinc-aluminum plated steel sheet, an iron-zinc plated steel sheet, a tin-plated steel sheet, a stainless steel sheet, an aluminum sheet, a copper sheet, an aluminum alloy sheet, and an electromagnetic steel sheet.

[59] A weather-resistant hard coat composition for a metal substrate, wherein a below-defined pencil hardness of a cured product obtained by curing the composition under the following curing conditions is not less than H (preferably not less than 2H, more preferably not less than 3H, even more preferably not less than 4H, and still even more preferably not less than 5H), a color difference (ΔE) as defined below is less than 20 (preferably less than 15, more preferably less than 10), and a glossiness retention rate as defined below is not less than 15% (preferably not less than 40%, more preferably not less than 60%).

Curing Conditions
  Pre-baking: 5 minutes at 150° C.
  UV radiation: radiation dosage: 400 mJ/cm², radiation intensity: 260 mW/cm²
  Aging: at 120° C. for 0.5 hours
Pencil Hardness
  Measured in accordance with JIS K5600-5-4 (750 g load).
Color Difference (ΔE)
  The color difference (ΔE) is determined from an initial hue value and the hue of the sample after 3000 hours of radiation in a high luminance xenon weatherometer test under the following conditions.
Glossiness Retention Rate (%)
  The glossiness retention rate is calculated from the following equation by measuring the glossiness before radiation and the glossiness after radiation for 3000 hours in the high luminance xenon weatherometer test under the following conditions.

Glossiness Retention Rate (%)=(Glossiness after radiation for 3000 hours)/(Glossiness before radiation)×100

High Luminance Xenon Weatherometer Test
  Test temperature: 63° C.
  Test humidity: RH 50%
  Rain: 18 minutes of rain per 120 minutes
  Radiation illuminance: 100 W/m² (300 to 400 nm)
  Filter: inside/outside=borosilicate type S/borosilicate type S
  Radiation time: 3000 hours

[60] The weather-resistant hard coat composition for a metal substrate according to [59], containing a polyorganosilsesquioxane having a constituent unit represented by Formula (1) below.

[Chem. 33]

$$[R^1SiO_{3/2}] \quad (1)$$

[In Formula (1), $R^1$ represents a group containing an active energy ray-curable functional group.]

[61] A cured product of the weather-resistant hard coat composition for a metal substrate described in [59] or [60], wherein a below-defined pencil hardness is not less than H (preferably not less than 2H, more preferably not less than 3H, even more preferably not less than 4H, and still even more preferably not less than 5H), a color difference (ΔE) as defined below is less than 20 (preferably less than 15, more preferably less than 10), and a glossiness retention rate as defined below is not less than 15% (preferably not less than 40%, more preferably not less than 60%).

Pencil Hardness
  Measured in accordance with JIS K5600-5-4 (750 g load).
Color Difference (ΔE)
  The color difference (ΔE) is determined from an initial hue value and the hue of the sample after 3000 hours of radiation in a high luminance xenon weatherometer test under the following conditions.
Glossiness Retention Rate (%)
  The glossiness retention rate is calculated from the following equation by measuring the glossiness before radiation and the glossiness after radiation for 3000 hours in the high luminance xenon weatherometer test under the following conditions. Glossiness Retention Rate (%)=(Glossiness after radiation for 3000 hours)/(Glossiness before radiation)×100
High Luminance Xenon Weatherometer Test
  Test temperature: 63° C.
  Test humidity: RH 50%

Rain: 18 minutes of rain per 120 minutes
Radiation illuminance: 100 W/m² (300 to 400 nm)
Filter: inside/outside=borosilicate type S/borosilicate type S
Radiation time: 3000 hours

[62] A coated metal substrate containing a metal substrate and a coating film formed on at least one surface of the metal substrate, wherein the coating film is a layer of the cured product described in [61].

[63] Use of a composition containing a polyorganosilsesquioxane having a constituent unit represented by the above-mentioned Formula (1), as a weather-resistant hard coat composition for a metal

[64] A method of producing a weather-resistant hard coat composition for a metal, the method including using a polyorganosilsesquioxane having a constituent unit represented by Formula (1) above.

INDUSTRIAL APPLICABILITY

The weather-resistant hard coat composition for a metal of the present invention can be suitably used as a paint to cover various types of metal substrates constituting components such as construction members including exterior walls and roofs, civil engineering members such as guardrails, soundproof walls, and drainage ditches, and components for applications such as consumer electronics, industrial machinery, and automobiles.

The invention claimed is:

1. A weather-resistant hard coat composition for a metal, the composition comprising a polyorganosilsesquioxane having a constituent unit represented by Formula (1):

[R¹SiO₃/₂]　　(1)

wherein R¹ represents a group containing an active energy ray-curable functional group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom; provided that at least some of the R¹ groups are the groups containing the active energy ray-curable functional group; and
a constituent unit represented by Formula (II):

[R^b SiO₂/₂(OR^c)]　　(II)

wherein R^b represents a group containing an active energy ray-curable functional group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom, and
wherein R^c represents a hydrogen atom or an alkyl group having from 1 to 4 carbons; and
provided that at least some of the R^b groups are the groups containing the active energy ray-curable functional group;
wherein a molar ratio [(constituent unit represented by Formula (I))/(eonstituent unit represented by Formula (II))] of the constituent unit represented by Formula (I) to the constituent unit represented by Formula (11) is from 5 to 500;
wherein a ratio of a total amount of the constituent unit represented by Formula (1) wherein R¹ is the group containing the active energy ray-curable functional group and the constituent unit represented by Formula (II) wherein R^b is the group containing the active energy ray-curable functional group is from 55 to 100 mol % with respect to a total amount (100 mol %) of siloxane constituent units;
wherein the composition further comprises a compound having one or more thermally- polymerizable functional groups and one or more photopolyrnerizable functional groups; and
wherein the compound having one or more thermally-polymerizable functional groups and one or more photopolyrnerizable functional groups per molecule comprises at least one compound selected from the group consisting of tripropylene glycol diglycidyl ether di(meth)acrylate and tripropylene glycol diglycidyl ether half(meth)acrylate,
wherein said tripropylene glycol diglycidyl ether di(meth)acrylate has the following formula:

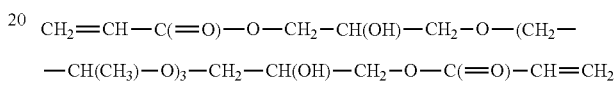
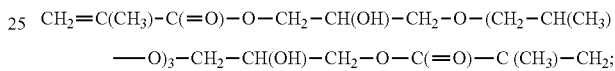

wherein said tripropylene glycol diglycidyl ether half (meth)acrylate has the following formula:

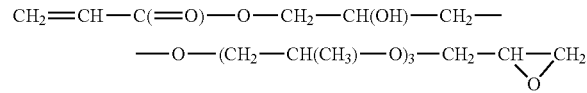
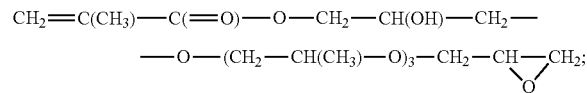

wherein a number average molecular weight of the polyorganosilsesquioxane is from 1000 to 50000;
wherein a molecular weight dispersity (weight average molecular weight/ntunber average molecular weight) of the polyorganosilsesquioxane is from 1.0 to 4 0;
wherein a content of the polyorganosilsesquioxane is 70 wt. % or greater, and less than 100 wt. % relative to a total amount of the weather-resistant hard coat composition excluding solvent;
wherein the active energy ray-curable functional group in R¹ is at least one selected from the group consisting of an epoxy group, an oxetane group, a vinyl ether group, a vinyl phenyl group, a (meth)acryloxy group, a (meth)acrylamide group, a vinyl group, and a vinylthio group;
wherein a content of the compound having one or more thermally-polymerizable functional groups and one or more photopolymerizable functional groups per molecule, as a solid content, is 1 to 100 parts by weight relative to 100 parts by weight of the total amount of active energy ray-curable compounds; and
wherein a first cured product has a pencil hardness of not less than H, a color difference (ΔE) of less than 20, and a glossiness retention rate of not less than 15%;
wherein the first cured product is obtained by curing the weather-resistant hard coat composition under conditions including pre-baking at 150° C. for 5 minutes followed by UV radiation at a dosage of 400 mJ/cm² and a radiation intensity of 260 mW/cm², followed by aging at 120° C. for 0.5 hours;

wherein the pencil hardness is measured in accordance with JIS K5600-5-4 with a 750 g load;

wherein the color difference (ΔE) is determined from an initial hue value from the first cured product and a hue value from a second cured product, and the glossiness retention rate is determined from an initial glossiness value from the first cured product and a glossiness value from the second cured product;

wherein the second cured product is produced by exposing the first cured product to a high luminance xenon weatherometer test;

wherein the color difference (ΔE) is calculated based on the following equation according to CIELAB standard:

ΔE=[(difference in "L" between the first cured product and the second cured product)²+(difference in "a" between the first cured product and the second cured product)²+(difference in "b" between the first cured product and the second cured product)²]^{1/2};

wherein the glossiness retention rate (%) is calculated from the following equation:

Glossiness Retention Rate (%)=(Glossiness of the second cured product)/(Glossiness of the first cured product)×100;

wherein the high luminance xenon weatherometer test is measured at 63° C., 50% RH with 18 minutes of rain per 120 minutes, a radiation illuminance of 100 W/m² at 300 to 400 nm, a radiation time of 3000 hours, and using a wavelength filter where an inside and outside of the wavelength filter are made of borosilicate type S glass;

wherein the rain is in accordance with JIS B 7754 at an atomizing water pressure of 0.1 MPa and a water flow rate of 0.24 L/min;

wherein the inside of the wavelength filter has an outer diameter of 12 mm and a length of 140 mm; and wherein the outside of the wavelength filter made of borosilicato typo S/borosilicato typo has an outer diameter of 24 mm and a length of 180 mm.

2. The weather-resistant hard coat composition for a metal according to claim 1, wherein at least some of the R¹ groups of Formula (1) represent a substituted or unsubstituted aryl group, a substituted or unsubstituted aralkyl group, a substituted or unsubstituted cycloalkyl group, a substituted or unsubstituted alkyl group, or a substituted or unsubstituted alkenyl group.

3. The weather-resistant hard coat composition for a metal according to claim 2, wherein at least some of the R¹ groups represents a substituted or unsubstituted aryl group.

4. The weather-resistant hard coat composition for a metal according to claim 1, wherein the active energy ray-curable functional group is an epoxy group.

5. The weather-resistant hard coat composition for a metal according to claim 1, wherein the active energy ray-curable funcational gropu is:

a group represented by Formula (1a):

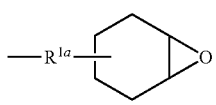

(1a)

where R^{1a} represents a linear or branched alkylene group;

a group represented by Formula (1b):

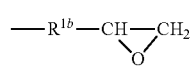

(1b)

where R^{1b} represents a linear or branched alkylene group;

a group represented by Formula (1c):

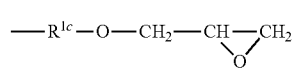

(1c)

where R^{1c} represents a linear or branched alkylene group; or a group represented by Formula (1d):

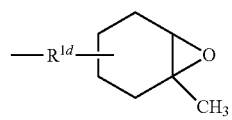

(1d)

where R^{1d} represents a linear or branched alkylene group.

6. The weather-resistant hard coat composition for a metal according to claim 1, wherein the active energy ray-curable functional group is a (meth)acryloxy group.

7. The weather-resistant hard coat composition for a metal according to claim 1, further comprising a photocuring catalyst.

8. The weather-resistant hard coat composition for a metal according to claim 7, wherein the photocuring catalyst is a photocationic polymerization initiator.

9. The weather-resistant hard coat composition for a metal according to according to claim 7, wherein the photocuring catalyst is a photoradical polymerization initiator.

10. The weather-resistant hard coat composition for a metal according to claim 1, further comprising a second compound having one or more (meth)acryloxy group(s) per molecule.

11. The weather-resistant hard coat composition for a metal according to claim 1, further comprising at least one compound selected from the group consisting of ultraviolet absorbers and antioxidants.

12. The weather-resistant hard coat composition for a metal according to claim 1, further comprising a fluorine-containing photopolymerizable resin.

13. The weather-resistant hard coat composition for a metal according to claim 1, wherein the composition is a clear hard coat paint.

14. A cured product of the weather-resistant hard coat composition for a metal according to claim 1.

15. A coated metal substrate comprising a metal substrate and a coating film formed on at least one surface of the metal substrate, wherein the coating film is a layer of the cured product according to claim 14.

16. The coated metal substrate according to claim 15, wherein a thickness of the coating film is from 1 to 200 μm.

17. A cured product of the weather-resistant hard coat composition for a metal substrate according to claim 1, having the pencil hardness of not less than H, the color difference ($\Delta E$) of less than 20, and the glossiness retention rate of not less than 5%.

18. A coated metal substrate comprising a metal substrate and a coating film formed on at least one surface of the metal substrate, wherein the coating film is a layer of the cured product according to claim 17.

* * * * *